United States Patent
Wilson et al.

(10) Patent No.: US 12,147,657 B2
(45) Date of Patent: Nov. 19, 2024

(54) INTERACTIVE USER INTERFACES FOR LOCATION-BASED DATA ANALYSIS

(71) Applicant: Palantir Technologies Inc., Denver, CO (US)

(72) Inventors: Matthew Julius Wilson, London (GB); Tom Alexander, Abu Dhabi (AE); Daniel Cervelli, Mountain View, CA (US); Trevor Fountain, Edinburgh (GB); Quentin Spencer-Harper, London (GB); Daniel Horbatt, London (GB); Guillem Palou Visa, London (GB); Dylan Scott, Palo Alto, CA (US); Trevor Sontag, Palo Alto, CA (US); Kevin Verdieck, Palo Alto, CA (US); Alexander Ryan, Palo Alto, CA (US); Brian Lee, Sunnyvale, CA (US); Charles Shepherd, London (GB); Emily Nguyen, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/168,542

(22) Filed: Feb. 5, 2021

(65) Prior Publication Data
US 2021/0157477 A1 May 27, 2021

Related U.S. Application Data

(63) Continuation of application No. 16/567,540, filed on Sep. 11, 2019, now Pat. No. 10,949,071, which is a
(Continued)

(51) Int. Cl.
*G06F 3/048* (2013.01)
*G06F 3/04817* (2022.01)
(Continued)

(52) U.S. Cl.
CPC ...... *G06F 3/04847* (2013.01); *G06F 3/04817* (2013.01); *G06F 3/04842* (2013.01); *G06F 16/29* (2019.01); *G06T 11/206* (2013.01)

(58) Field of Classification Search
CPC .. G06F 3/04847; G06F 16/29; G06F 3/04817; G06F 3/04842; G06T 11/206
See application file for complete search history.

(56) References Cited

U.S. PATENT DOCUMENTS

| | | |
|---|---|---|
| 4,899,161 A | 2/1990 | Morin et al. |
| 4,958,305 A | 9/1990 | Piazza |

(Continued)

FOREIGN PATENT DOCUMENTS

| | | |
|---|---|---|
| AU | 2012216622 | 5/2015 |
| AU | 2013251186 | 11/2015 |

(Continued)

OTHER PUBLICATIONS

Official Communication for European Patent Application No. 19186114.5 dated Sep. 1, 2021, 5 pages.
(Continued)

*Primary Examiner* — Rashawn N Tillery
(74) *Attorney, Agent, or Firm* — Knobbe, Martens, Olson & Bear, LLP

(57) ABSTRACT

Various systems and methods are provided that display various geographic maps and depth graphs in an interactive user interface in substantially real-time in response to input from a user in order to determine information related to measured data points, depth levels, and geological layers and provide the determined information to the user in the interactive user interface. For example, a computing device may be configured to retrieve data from one or more databases and generate one or more interactive user interfaces. The one or more interactive user interfaces may
(Continued)

display the retrieved data in a geographic map, a heat map, a cross-plot graph, or one or more depth graphs. The user interface may be interactive in that a user may manipulate any of the graphs to identify trends or current or future issues.

14 Claims, 36 Drawing Sheets

Related U.S. Application Data continuation of application No. 15/852,613, filed on Dec. 22, 2017, now Pat. No. 10,459,619, which is a continuation of application No. 15/072,133, filed on Mar. 16, 2016, now Pat. No. 9,891,808.

(60) Provisional application No. 62/200,565, filed on Aug. 3, 2015, provisional application No. 62/133,857, filed on Mar. 16, 2015.

(51) Int. Cl.
*G06F 3/04842* (2022.01)
*G06F 3/04847* (2022.01)
*G06F 16/29* (2019.01)
*G06T 11/20* (2006.01)

(56) References Cited

U.S. PATENT DOCUMENTS

| | | |
|---|---|---|
| 5,109,399 A | 4/1992 | Thompson |
| 5,241,625 A | 8/1993 | Epard et al. |
| 5,283,562 A | 2/1994 | Kaneko et al. |
| 5,329,108 A | 7/1994 | Lamoure |
| 5,444,619 A * | 8/1995 | Hoskins ............... G01V 1/306 702/14 |
| 5,623,590 A | 4/1997 | Becker et al. |
| 5,632,009 A | 5/1997 | Rao et al. |
| 5,670,987 A | 9/1997 | Doi et al. |
| 5,754,182 A | 5/1998 | Kobayashi |
| 5,781,195 A | 7/1998 | Marvin |
| 5,781,704 A | 7/1998 | Rossmo |
| 5,798,769 A | 8/1998 | Chiu et al. |
| 5,845,300 A | 12/1998 | Comer |
| 5,884,217 A | 3/1999 | Koyanagi |
| 5,925,091 A | 7/1999 | Ando |
| 5,936,631 A | 8/1999 | Yano et al. |
| 5,999,911 A | 12/1999 | Berg et al. |
| 6,055,569 A | 4/2000 | O'Brien et al. |
| 6,057,757 A | 5/2000 | Arrowsmith et al. |
| 6,065,026 A | 5/2000 | Cornelia et al. |
| 6,091,956 A | 7/2000 | Hollenberg |
| 6,157,747 A | 12/2000 | Szeliski et al. |
| 6,161,098 A | 12/2000 | Wallman |
| 6,169,552 B1 | 1/2001 | Endo et al. |
| 6,173,067 B1 | 1/2001 | Payton et al. |
| 6,178,432 B1 | 1/2001 | Cook et al. |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,247,019 B1 | 6/2001 | Davies |
| 6,279,018 B1 | 8/2001 | Kudrolli et al. |
| 6,338,066 B1 | 1/2002 | Martin et al. |
| 6,341,310 B1 | 1/2002 | Leshem et al. |
| 6,366,933 B1 | 4/2002 | Ball et al. |
| 6,369,835 B1 | 4/2002 | Lin |
| 6,370,538 B1 | 4/2002 | Lamping et al. |
| 6,389,289 B1 | 5/2002 | Voce et al. |
| 6,414,683 B1 | 7/2002 | Gueziec |
| 6,430,305 B1 | 8/2002 | Decker |
| 6,456,997 B1 | 9/2002 | Shukla |
| 6,483,509 B1 | 11/2002 | Rabenhorst |
| 6,523,019 B1 | 2/2003 | Borthwick |
| 6,529,900 B1 | 3/2003 | Patterson et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,584,498 B2 | 6/2003 | Nguyen |
| 6,594,672 B1 | 7/2003 | Lampson et al. |
| 6,631,496 B1 | 10/2003 | Li et al. |
| 6,642,945 B1 | 11/2003 | Sharpe |
| 6,662,103 B1 | 12/2003 | Skolnick et al. |
| 6,665,683 B1 | 12/2003 | Meltzer |
| 6,674,434 B1 | 1/2004 | Chojnacki et al. |
| 6,714,936 B1 | 3/2004 | Nevin, III |
| 6,742,033 B1 | 5/2004 | Smith et al. |
| 6,757,445 B1 | 6/2004 | Knopp |
| 6,775,675 B1 | 8/2004 | Nwabueze et al. |
| 6,792,422 B1 | 9/2004 | Stride et al. |
| 6,820,135 B1 | 11/2004 | Dingman |
| 6,828,920 B2 | 12/2004 | Owen et al. |
| 6,839,745 B1 | 1/2005 | Dingari et al. |
| 6,850,317 B2 | 2/2005 | Mullins et al. |
| 6,877,137 B1 | 4/2005 | Rivette et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 6,983,203 B1 | 1/2006 | Wako |
| 6,985,950 B1 | 1/2006 | Hanson et al. |
| 7,003,566 B2 | 2/2006 | Codella et al. |
| 7,036,085 B2 | 4/2006 | Barros |
| 7,043,702 B2 | 5/2006 | Chi et al. |
| 7,055,110 B2 | 5/2006 | Kupka et al. |
| 7,086,028 B1 | 8/2006 | Davis et al. |
| 7,103,852 B2 | 9/2006 | Kairis, Jr. |
| 7,139,800 B2 | 11/2006 | Bellotti et al. |
| 7,149,366 B1 | 12/2006 | Sun |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,174,377 B2 | 2/2007 | Bernard et al. |
| 7,194,680 B1 | 3/2007 | Roy et al. |
| 7,213,030 B1 | 5/2007 | Jenkins |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,375,732 B2 | 5/2008 | Arcas |
| 7,379,811 B2 | 5/2008 | Rasmussen et al. |
| 7,379,903 B2 | 5/2008 | Joseph |
| 7,392,254 B1 | 6/2008 | Jenkins |
| 7,426,654 B2 | 9/2008 | Adams et al. |
| 7,441,182 B2 | 10/2008 | Beilinson et al. |
| 7,441,219 B2 | 10/2008 | Perry et al. |
| 7,454,466 B2 | 11/2008 | Bellotti et al. |
| 7,457,706 B2 | 11/2008 | Malero et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,519,470 B2 | 4/2009 | Brasche et al. |
| 7,525,422 B2 | 4/2009 | Bishop et al. |
| 7,529,195 B2 | 5/2009 | Gorman |
| 7,529,727 B2 | 5/2009 | Arning et al. |
| 7,529,734 B2 | 5/2009 | Dirisala |
| 7,539,666 B2 | 5/2009 | Ashworth et al. |
| 7,558,677 B2 | 6/2009 | Jones |
| 7,558,822 B2 | 7/2009 | Fredricksen et al. |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,617,314 B1 | 11/2009 | Bansod et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,653,883 B2 | 1/2010 | Hotelling et al. |

(56) References Cited

U.S. PATENT DOCUMENTS

| | | |
|---|---|---|
| 7,663,621 B1 | 2/2010 | Allen et al. |
| 7,693,816 B2 | 4/2010 | Nemoto et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,747,749 B1 | 6/2010 | Erikson et al. |
| 7,756,843 B1 | 7/2010 | Palmer |
| 7,765,489 B1 | 7/2010 | Shah et al. |
| 7,770,100 B2 | 8/2010 | Chamberlain et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,872,647 B2 | 1/2011 | Mayer et al. |
| 7,877,421 B2 | 1/2011 | Berger et al. |
| 7,880,921 B2 | 2/2011 | Dattilo et al. |
| 7,890,850 B1 | 2/2011 | Bryar et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,941,336 B2 | 5/2011 | Robin-Jan |
| 7,945,852 B1 | 5/2011 | Pilskains |
| 7,949,960 B2 | 5/2011 | Roessler et al. |
| 7,966,199 B1 | 5/2011 | Frasher |
| 7,958,147 B1 | 6/2011 | Turner et al. |
| 7,962,281 B1 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,065,080 B2 | 11/2011 | Koch |
| 8,073,857 B2 | 12/2011 | Sreekanth |
| 8,085,268 B2 | 12/2011 | Carrino et al. |
| 8,095,434 B1 | 1/2012 | Puttick et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,191,005 B2 | 5/2012 | Baier |
| 8,200,676 B2 | 6/2012 | Frank |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,325,178 B1 | 12/2012 | Doyle, Jr. |
| 8,352,881 B2 | 1/2013 | Champion et al. |
| 8,368,695 B2 | 2/2013 | Howell et al. |
| 8,386,377 B1 | 2/2013 | Xiong |
| 8,396,740 B1 | 3/2013 | Watson |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,510,743 B2 | 8/2013 | Hackborn et al. |
| 8,514,082 B2 | 8/2013 | Cova et al. |
| 8,514,229 B2 | 8/2013 | Cervelli et al. |
| 8,515,207 B2 | 8/2013 | Chau |
| 8,527,949 B1 | 9/2013 | Pleis |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,564,596 B2 | 10/2013 | Carrino et al. |
| 8,576,229 B2 * | 11/2013 | Dykes .................. G06T 11/206 345/440.1 |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,599,203 B2 | 12/2013 | Horowitz et al. |
| 8,620,641 B2 | 12/2013 | Farnsworth et al. |
| 8,646,080 B2 | 2/2014 | Williamson et al. |
| 8,639,757 B1 | 3/2014 | Adams et al. |
| 8,676,857 B1 | 3/2014 | Adams et al. |
| 8,682,696 B1 | 3/2014 | Shanmugam |
| 8,688,573 B1 | 4/2014 | Rukonic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,799,799 B1 | 5/2014 | Cervelli et al. |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,313 B2 | 8/2014 | Satlow |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,874 B2 | 1/2015 | Duff et al. |
| 8,937,619 B2 | 1/2015 | Sharma et al. |
| 8,938,434 B2 | 1/2015 | Jain et al. |
| 8,938,686 B1 | 1/2015 | Erenrich et al. |
| 8,949,164 B1 | 2/2015 | Mohler |
| 8,983,494 B1 | 3/2015 | Onnen et al. |
| 8,984,390 B2 | 3/2015 | Aymeloglu et al. |
| 9,009,171 B1 | 4/2015 | Grossman et al. |
| 9,009,177 B2 | 4/2015 | Zheng et al. |
| 9,009,827 B1 | 4/2015 | Albertson et al. |
| 9,021,260 B1 | 4/2015 | Falk et al. |

(56) References Cited

U.S. PATENT DOCUMENTS

| | | |
|---|---|---|
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,100,428 B1 | 8/2015 | Visbal |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,116,975 B2 | 8/2015 | Shankar et al. |
| 9,129,219 B1 | 9/2015 | Robertson et al. |
| 9,146,125 B2 | 9/2015 | Vulcano et al. |
| 9,165,100 B2 | 10/2015 | Begur et al. |
| 9,182,517 B1 * | 11/2015 | Selman ................ E21B 47/022 |
| 9,280,618 B1 | 3/2016 | Bruce et al. |
| 9,501,740 B2 * | 11/2016 | Hiu ........................ G06N 3/06 |
| 9,600,146 B2 | 3/2017 | Cervelli et al. |
| 9,696,442 B2 * | 7/2017 | Li .......................... G01V 1/306 |
| 9,734,217 B2 | 8/2017 | Kara et al. |
| 9,852,373 B2 * | 12/2017 | De Stefano ............. G06N 3/08 |
| 9,891,808 B2 | 2/2018 | Wilson et al. |
| 9,953,445 B2 | 4/2018 | Cervelli et al. |
| 10,444,940 B2 | 10/2019 | Cervelli et al. |
| 10,444,941 B2 | 10/2019 | Cervelli et al. |
| 10,459,619 B2 | 10/2019 | Wilson et al. |
| 10,949,071 B2 | 3/2021 | Wilson et al. |
| 2001/0021936 A1 | 9/2001 | Bertram |
| 2001/0030667 A1 | 10/2001 | Kelts |
| 2002/0003539 A1 | 1/2002 | Abe |
| 2002/0032677 A1 | 3/2002 | Moregenthaler et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2002/0130907 A1 | 9/2002 | Chi et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0036848 A1 | 2/2003 | Sheha et al. |
| 2003/0036927 A1 | 2/2003 | Bowen |
| 2003/0039948 A1 | 2/2003 | Donahue |
| 2003/0052896 A1 | 3/2003 | Higgins et al. |
| 2003/0093755 A1 | 5/2003 | O'Carroll |
| 2003/0103049 A1 | 6/2003 | Kindratenko et al. |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0030492 A1 | 2/2004 | Fox et al. |
| 2004/0032432 A1 | 2/2004 | Baynger |
| 2004/0034570 A1 | 2/2004 | Davis |
| 2004/0039498 A1 | 2/2004 | Ollis et al. |
| 2004/0044648 A1 | 3/2004 | Anfindsen et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0098236 A1 | 5/2004 | Mayer et al. |
| 2004/0111410 A1 | 6/2004 | Burgoon et al. |
| 2004/0111480 A1 | 6/2004 | Yue |
| 2004/0123135 A1 | 6/2004 | Goddard |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | McPherson et al. |
| 2004/0175036 A1 | 9/2004 | Graham |
| 2004/0181554 A1 | 9/2004 | Heckerman et al. |
| 2004/0193600 A1 | 9/2004 | Kaasten et al. |
| 2004/0205492 A1 | 10/2004 | Newsome |
| 2004/0217884 A1 | 11/2004 | Samadani et al. |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0028191 A1 | 2/2005 | Sullivan et al. |
| 2005/0031197 A1 | 2/2005 | Knopp |
| 2005/0034062 A1 | 2/2005 | Bufkin et al. |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182502 A1 | 8/2005 | Iyengar |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0223044 A1 | 10/2005 | Ashworth et al. |
| 2005/0246327 A1 | 11/2005 | Yeung et al. |
| 2005/0251786 A1 | 11/2005 | Citron et al. |
| 2005/0267652 A1 | 12/2005 | Allstadt et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0047804 A1 | 3/2006 | Fredricksen et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080283 A1 | 4/2006 | Shipman |
| 2006/0080619 A1 | 4/2006 | Carlson et al. |
| 2006/0093222 A1 | 5/2006 | Saffer et al. |
| 2006/0129191 A1 | 6/2006 | Sullivan et al. |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0146050 A1 | 7/2006 | Yamauchi |
| 2006/0149596 A1 | 7/2006 | Surpin et al. |
| 2006/0155654 A1 | 7/2006 | Plessis et al. |
| 2006/0178915 A1 | 8/2006 | Chao |
| 2006/0197763 A1 | 9/2006 | Harrison et al. |
| 2006/0200384 A1 | 9/2006 | Arutunian et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0251307 A1 | 11/2006 | Florin et al. |
| 2006/0259527 A1 | 11/2006 | Devarakonda et al. |
| 2006/0265417 A1 | 11/2006 | Amato et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2006/0294223 A1 | 12/2006 | Glasgow et al. |
| 2007/0000999 A1 | 1/2007 | Kubo et al. |
| 2007/0011150 A1 | 1/2007 | Frank |

(56) References Cited

U.S. PATENT DOCUMENTS

| | | |
|---|---|---|
| 2007/0011304 A1 | 1/2007 | Error |
| 2007/0016363 A1 | 1/2007 | Huang et al. |
| 2007/0016435 A1 | 1/2007 | Bevington |
| 2007/0024620 A1 | 2/2007 | Muller-Fischer et al. |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0057966 A1 | 3/2007 | Ohno et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0113164 A1 | 5/2007 | Hansen et al. |
| 2007/0115373 A1 | 5/2007 | Gallagher et al. |
| 2007/0136095 A1 | 6/2007 | Weinstein |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0162454 A1 | 7/2007 | D'Albora |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0185894 A1 | 8/2007 | Swain et al. |
| 2007/0188516 A1 | 8/2007 | Loup et al. |
| 2007/0192122 A1 | 8/2007 | Routson |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0245339 A1 | 10/2007 | Bauman et al. |
| 2007/0258642 A1 | 11/2007 | Thota |
| 2007/0266336 A1 | 11/2007 | Nojima et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0010605 A1 | 1/2008 | Frank |
| 2008/0016155 A1 | 1/2008 | Khalatian |
| 2008/0016216 A1 | 1/2008 | Worley et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0066052 A1 | 3/2008 | Wolfram |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0082578 A1 | 4/2008 | Hogue et al. |
| 2008/0091693 A1 | 4/2008 | Murthy |
| 2008/0098085 A1 | 4/2008 | Krane et al. |
| 2008/0103996 A1 | 5/2008 | Forman et al. |
| 2008/0104019 A1 | 5/2008 | Nath |
| 2008/0109714 A1 | 5/2008 | Kumar et al. |
| 2008/0126951 A1 | 5/2008 | Sood et al. |
| 2008/0133579 A1 | 6/2008 | Lim |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0163073 A1 | 7/2008 | Becker et al. |
| 2008/0172607 A1 | 7/2008 | Baer |
| 2008/0177782 A1 | 7/2008 | Poston et al. |
| 2008/0192053 A1 | 8/2008 | Howell et al. |
| 2008/0195417 A1 | 8/2008 | Surpin et al. |
| 2008/0195474 A1 | 8/2008 | Lau et al. |
| 2008/0195608 A1 | 8/2008 | Clover |
| 2008/0208735 A1 | 8/2008 | Balet |
| 2008/0222295 A1 | 9/2008 | Robinson et al. |
| 2008/0223834 A1 | 9/2008 | Griffiths et al. |
| 2008/0229056 A1 | 9/2008 | Agarwal et al. |
| 2008/0243711 A1 | 10/2008 | Aymeloglu et al. |
| 2008/0249820 A1 | 10/2008 | Pathria et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0012944 A1 | 1/2009 | Rodriguez et al. |
| 2009/0026170 A1 | 1/2009 | Tanaka et al. |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0043801 A1 | 2/2009 | LeClair et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0089651 A1 | 4/2009 | Herberger et al. |
| 2009/0094166 A1 | 4/2009 | Aymeloglu et al. |
| 2009/0094187 A1 | 4/2009 | Miyaki |
| 2009/0094270 A1 | 4/2009 | Alirez |
| 2009/0094558 A1* | 4/2009 | Howard |
| 2009/0100018 A1 | 4/2009 | Roberts |
| 2009/0106178 A1 | 4/2009 | Chu |
| 2009/0112678 A1 | 4/2009 | Luzardo |
| 2009/0112745 A1 | 4/2009 | Stefanescu |
| 2009/0115786 A1 | 5/2009 | Shmiasaki et al. |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0157732 A1 | 6/2009 | Hao et al. |
| 2009/0158185 A1 | 6/2009 | Lacevic et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0199106 A1 | 8/2009 | Jonsson et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0248593 A1 | 10/2009 | Putzolu et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0313418 A1 | 12/2009 | Herz |
| 2009/0319891 A1 | 12/2009 | MacKinlay et al. |
| 2010/0011282 A1 | 1/2010 | Dollard et al. |
| 2010/0016910 A1 | 1/2010 | Sullivan et al. |
| 2010/0030722 A1 | 2/2010 | Goodson et al. |
| 2010/0031141 A1 | 2/2010 | Summers et al. |
| 2010/0031183 A1 | 2/2010 | Kang |
| 2010/0042922 A1 | 2/2010 | Bradateanu et al. |

(56) References Cited

U.S. PATENT DOCUMENTS

| | | |
|---|---|---|
| 2010/0049872 A1 | 2/2010 | Roskind |
| 2010/0057622 A1 | 3/2010 | Faith et al. |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076968 A1 | 3/2010 | Boyns et al. |
| 2010/0088304 A1 | 4/2010 | Jackson |
| 2010/0088398 A1 | 4/2010 | Plamondon |
| 2010/0094548 A1 | 4/2010 | Tadman et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106420 A1 | 4/2010 | Mattikalli et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0185692 A1 | 7/2010 | Zhang et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0223260 A1 | 9/2010 | Wu |
| 2010/0228812 A1 | 9/2010 | Uomini |
| 2010/0235915 A1 | 9/2010 | Memon et al. |
| 2010/0238174 A1 | 9/2010 | Haub et al. |
| 2010/0250412 A1 | 9/2010 | Wagner |
| 2010/0262688 A1 | 10/2010 | Hussain et al. |
| 2010/0262901 A1 | 10/2010 | DiSalvo |
| 2010/0277611 A1 | 11/2010 | Holt et al. |
| 2010/0280851 A1 | 11/2010 | Merkin |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0306722 A1 | 12/2010 | LeHoty |
| 2010/0312837 A1 | 12/2010 | Bodapati et al. |
| 2010/0312858 A1 | 12/2010 | Mickens et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0321871 A1 | 12/2010 | Diebel et al. |
| 2010/0325526 A1 | 12/2010 | Ellis et al. |
| 2010/0325581 A1 | 12/2010 | Finkelstein et al. |
| 2010/0328112 A1 | 12/2010 | Liu |
| 2010/0330801 A1 | 12/2010 | Rouh |
| 2010/0332324 A1 | 12/2010 | Khosravy et al. |
| 2011/0004498 A1 | 1/2011 | Readshaw |
| 2011/0022312 A1 | 1/2011 | McDonough et al. |
| 2011/0029526 A1 | 2/2011 | Knight et al. |
| 2011/0029641 A1 | 2/2011 | Fainberg et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0090085 A1 | 4/2011 | Belz et al. |
| 2011/0090254 A1 | 4/2011 | Carrino et al. |
| 2011/0093327 A1 | 4/2011 | Fordyce, III et al. |
| 2011/0099046 A1 | 4/2011 | Weiss et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0125372 A1 | 5/2011 | Ito |
| 2011/0131232 A1* | 6/2011 | Hill .................. G06Q 10/04 715/810 |
| 2011/0137766 A1 | 6/2011 | Rasmussen et al. |
| 2011/0153368 A1 | 6/2011 | Pierre et al. |
| 2011/0153384 A1 | 6/2011 | Horne et al. |
| 2011/0161096 A1 | 6/2011 | Buehler et al. |
| 2011/0161409 A1 | 6/2011 | Nair et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0238495 A1 | 9/2011 | Kang |
| 2011/0238553 A1 | 9/2011 | Raj et al. |
| 2011/0238690 A1 | 9/2011 | Arrasvuori et al. |
| 2011/0251951 A1 | 10/2011 | Kolkowtiz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004894 A1 | 1/2012 | Butler et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh et al. |
| 2012/0084287 A1 | 4/2012 | Lakshminarayan et al. |
| 2012/0102013 A1 | 4/2012 | Martini |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |
| 2012/0137235 A1 | 5/2012 | Ts et al. |
| 2012/0144325 A1* | 6/2012 | Mital .................. G06F 3/04847 715/763 |
| 2012/0144335 A1 | 6/2012 | Abeln et al. |
| 2012/0158527 A1 | 6/2012 | Cannelongo et al. |
| 2012/0159307 A1 | 6/2012 | Chung et al. |
| 2012/0159362 A1 | 6/2012 | Brown et al. |
| 2012/0159363 A1 | 6/2012 | DeBacker et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovich |
| 2012/0203708 A1 | 8/2012 | Psota et al. |
| 2012/0206469 A1 | 8/2012 | Hulubei et al. |

(56) References Cited

U.S. PATENT DOCUMENTS

| | | |
|---|---|---|
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0021445 A1 | 1/2013 | Cossette-Pacheco et al. |
| 2013/0024268 A1 | 1/2013 | Manickavelu |
| 2013/0035863 A1* | 2/2013 | Selman ............ E21B 43/26 702/9 |
| 2013/0039546 A1* | 2/2013 | Bae ............ H04N 1/0044 382/113 |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0076732 A1 | 3/2013 | Cervelli et al. |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0100134 A1 | 4/2013 | Cervelli et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0132398 A1 | 5/2013 | Pfiefle |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0208565 A1 | 8/2013 | Castellanos et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0254900 A1 | 9/2013 | Sathish et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0282723 A1 | 10/2013 | Petersen et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0298083 A1 | 11/2013 | Bertoldo et al. |
| 2013/0304770 A1 | 11/2013 | Boero et al. |
| 2013/0311375 A1 | 11/2013 | Priebatsch |
| 2013/0339891 A1 | 12/2013 | Blumenberg et al. |
| 2014/0000964 A1* | 1/2014 | Selman ............ E21B 44/00 175/24 |
| 2014/0002489 A1 | 1/2014 | Sauder et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0033120 A1 | 1/2014 | Bental et al. |
| 2014/0036621 A1* | 2/2014 | Lewis ............ G01V 1/30 367/14 |
| 2014/0040371 A1 | 2/2014 | Gurevich et al. |
| 2014/0043337 A1 | 2/2014 | Cardno |
| 2014/0047319 A1 | 2/2014 | Eberlein |
| 2014/0047357 A1 | 2/2014 | Alfaro et al. |
| 2014/0048542 A1 | 2/2014 | Wakita et al. |
| 2014/0058914 A1 | 2/2014 | Song et al. |
| 2014/0059038 A1 | 2/2014 | McPherson et al. |
| 2014/0063020 A1* | 3/2014 | Den Herder ......... G06T 11/206 345/441 |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0129936 A1 | 5/2014 | Richards |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156194 A1* | 6/2014 | Lupin ............ G01V 11/00 702/11 |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214579 A1 | 7/2014 | Shen et al. |
| 2014/0218400 A1 | 8/2014 | O'Toole et al. |
| 2014/0222403 A1 | 8/2014 | Lepage et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244284 A1 | 8/2014 | Smith |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0278106 A1 | 9/2014 | Mallet |
| 2014/0279824 A1 | 9/2014 | Tamayo |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0361899 A1 | 12/2014 | Layson |
| 2014/0365965 A1 | 12/2014 | Bray et al. |

(56) References Cited

U.S. PATENT DOCUMENTS

| | | |
|---|---|---|
| 2014/0366132 A1 | 12/2014 | Stiansen et al. |
| 2015/0019394 A1 | 1/2015 | Unser et al. |
| 2015/0026622 A1 | 1/2015 | Roaldson et al. |
| 2015/0029176 A1 | 1/2015 | Baxter et al. |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0088424 A1* | 3/2015 | Burlakov .............. G01V 99/00 702/6 |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106170 A1 | 4/2015 | Bonica |
| 2015/0106379 A1 | 4/2015 | Elliot et al. |
| 2015/0112963 A1 | 4/2015 | Mojtahedi et al. |
| 2015/0134666 A1 | 5/2015 | Gattiker et al. |
| 2015/0135256 A1 | 5/2015 | Hoy et al. |
| 2015/0169694 A1 | 6/2015 | Longo et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0172396 A1 | 6/2015 | Longo et al. |
| 2015/0178825 A1 | 6/2015 | Huerta |
| 2015/0178877 A1 | 6/2015 | Bogomolov et al. |
| 2015/0186483 A1 | 7/2015 | Tappan |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0188872 A1 | 7/2015 | White |
| 2015/0212663 A1 | 7/2015 | Papale et al. |
| 2015/0227295 A1 | 8/2015 | Meiklejohn et al. |
| 2015/0254220 A1 | 9/2015 | Burr et al. |
| 2015/0262396 A1* | 9/2015 | Devarajan .............. H04L 67/02 345/440.1 |
| 2015/0287117 A1 | 10/2015 | Tan |
| 2015/0309719 A1 | 10/2015 | Ma et al. |
| 2015/0310645 A1 | 10/2015 | Baumecker |
| 2015/0312323 A1 | 10/2015 | Peterson |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0055501 A1 | 2/2016 | Mukherjee et al. |
| 2016/0062555 A1 | 3/2016 | Ward et al. |
| 2016/0124116 A1* | 5/2016 | Souche .............. G01V 99/005 703/2 |
| 2016/0274781 A1 | 9/2016 | Wilson et al. |
| 2017/0052654 A1 | 2/2017 | Cervelli et al. |
| 2017/0052655 A1 | 2/2017 | Cervelli et al. |
| 2017/0052747 A1 | 2/2017 | Cervelli et al. |
| 2018/0136831 A1 | 5/2018 | Wilson et al. |
| 2020/0042163 A1 | 2/2020 | Wilson et al. |

FOREIGN PATENT DOCUMENTS

| | | | |
|---|---|---|---|
| CA | 2753946 A1 * | 9/2010 | ............ G06T 17/05 |
| CN | 102546446 | 7/2012 | |
| CN | 103167093 | 6/2013 | |
| CN | 102054015 | 5/2014 | |
| CN | 113153882 A * | 7/2021 | ............ B05D 5/12 |
| DE | 102014103482 | 9/2014 | |
| DE | 102014204827 | 9/2014 | |
| DE | 102014204830 | 9/2014 | |
| DE | 102014204834 | 9/2014 | |
| DE | 102013222023 | 1/2015 | |
| DE | 102014215621 | 2/2015 | |
| EP | 0763201 | 3/1997 | |
| EP | 1672527 | 6/2006 | |
| EP | 2487610 | 8/2012 | |
| EP | 2551799 | 1/2013 | |
| EP | 2560134 | 2/2013 | |
| EP | 2575107 | 4/2013 | |
| EP | 2778977 | 9/2014 | |
| EP | 2835745 | 2/2015 | |
| EP | 2835770 | 2/2015 | |
| EP | 2838039 | 2/2015 | |
| EP | 2846241 | 3/2015 | |
| EP | 2851852 | 3/2015 | |
| EP | 2858014 | 4/2015 | |
| EP | 2858018 | 4/2015 | |
| EP | 2863326 | 4/2015 | |
| EP | 2863346 | 4/2015 | |
| EP | 2869211 | 5/2015 | |
| EP | 2881868 | 6/2015 | |
| EP | 2884439 | 6/2015 | |
| EP | 2884440 | 6/2015 | |
| EP | 2889814 | 7/2015 | |
| EP | 2891992 | 7/2015 | |
| EP | 2892197 | 7/2015 | |
| EP | 2911078 | 8/2015 | |
| EP | 2911100 | 8/2015 | |
| EP | 2940603 | 11/2015 | |
| EP | 2940609 | 11/2015 | |
| EP | 2963595 | 1/2016 | |
| EP | 2988258 | 2/2016 | |
| EP | 2993595 | 3/2016 | |
| EP | 3070622 | 9/2016 | |
| EP | 3133510 | 2/2017 | |
| EP | 3139333 | 3/2017 | |
| EP | 3611632 | 2/2020 | |
| GB | 2516155 | 1/2015 | |
| GB | 2518745 | 4/2015 | |
| NL | 2012778 | 11/2014 | |
| NL | 2013306 | 2/2015 | |
| NZ | 624557 | 12/2014 | |
| WO | WO 95/032424 | 11/1995 | |
| WO | WO 2000/009529 | 2/2000 | |
| WO | WO 01/025906 | 4/2001 | |
| WO | WO 01/088750 | 11/2001 | |
| WO | WO 2001/098925 | 12/2001 | |
| WO | WO 2002/065353 | 8/2002 | |
| WO | WO 2004/057268 | 7/2004 | |
| WO | WO 2005/013200 | 2/2005 | |
| WO | WO 2005/104736 | 11/2005 | |
| WO | WO 2005/116851 | 12/2005 | |
| WO | WO 2007/133206 | 11/2007 | |
| WO | WO 2008/064207 | 5/2008 | |
| WO | WO 2009/061501 | 5/2009 | |
| WO | WO 2009/123975 | 10/2009 | |
| WO | WO 2010/000014 | 1/2010 | |
| WO | WO 2010/030913 | 3/2010 | |
| WO | WO 2010/030914 | 3/2010 | |
| WO | WO 2011/058507 | 5/2011 | |
| WO | WO 2012/119008 | 9/2012 | |
| WO | WO 2013/010157 | 1/2013 | |
| WO | WO 2013/102892 | 7/2013 | |

OTHER PUBLICATIONS

"A First Look: Predicting Market Demand for Food Retail using a Huff Analysis," TRF Policy Solutions, Jul. 2012, pp. 30.

"A Quick Guide to UniProtKB Swiss-Prot & TrEMBL," Sep. 2011, pp. 2.

"Andy Turner's Gisruk 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.

"GrabUp—What a Timesaver!" http://atlchris.com/191/grabup/, Aug. 11, 2008, pp. 3.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

"Money Laundering Risks and E-Gaming: a European Overview and Assessment," 2009, http://www.cf.ac.uk/socsi/resources/Levi_Final_Money_Laundering_Risks_egaming.pdf.

(56) References Cited

OTHER PUBLICATIONS

"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"The Fasta Program Package," fasta-36.3.4, Mar. 25, 2011, pp. 29.
"Using Whois Based Geolocation and Google Maps API for Support Cybercrime Investigations," http://wseas.us/e-library/conferences/2013/Dubrovnik/TELECIRC/TELECIRC-32.pdf.
"What Was It Again? Ways to Make Feature Tile Layers Interactive," WordPress.com, published Jun. 12, 2011, retrieved from https://whatwasitagain.wordpress.com/2011/06/12/interactive-feature-tile-layers/, 7 pages.
Abbey, Kristen, "Review of Google Docs," May 1, 2007, pp. 2.
About 80 Minutes, "Palantir in a Number of Parts—Part 6—Graph," Mar. 21, 2013, pp. 1-6.
Acklen, Laura, "Absolute Beginner's Guide to Microsoft Word 2003," Dec. 24, 2003, pp. 15-18, 34-41, 308-316.
Adams et al., "Worklets: a Service-Oriented Implementation of Dynamic Flexibility in Workflows," R. Meersman, Z. Tari et al. (Eds.): OTM 2006, LNCS, 4275, pp. 291-308, 2006.
Alur et al., "Chapter 2: IBM InfoSphere DataStage Stages," IBM InfoSphere DataStage Data Flow and Job Design, Jul. 1, 2008, pp. 35-137.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
AskDrexel, "How to: Auto Save a Document Before Printing in Word 2007," http://askdrexel.drexel.edu/app/answers/detail/a_id/2353/~/how-to%3A-auto-save-a-document-before-printing-in-word-2007, Published Nov. 13, 2007, pp. 1.
Barnes et al., "Viewshed Analysis", GIS-ARC/INFO 2001, <www.evsc.virginia.edu/~jhp7e/evsc466/student_pres/Rounds.pdf>.
Bivand et al., "Bindings for the Geospatial Data Abstraction Library—Package 'rgdal'," Mar. 15, 2015, retrieved from the Internet: URL: https://mran.microsoft.com/snapshot/2015-03-29/web/packages/rgdal/rgdal.pdf, 49 pages.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: the Bibliographic Database," The NCBI Handbook, Oct. 2002, pp. 1-10.
Capptain—Pilot Your Apps, <http://www.capptain.com> Printed Jul. 18, 2013 in 6 pages.
Carver et al., "Real-Time Visibility Analysis and Rapid Viewshed Calculation Using a Voxel-Based Modelling Approach," Gisruk 2012 Conference, April 11-13, Lancaster UK, Apr. 13, 2012, pp. 6.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Chen et al., "Bringing Order to the Web: Automatically Categorizing Search Results," CHI 2000, Proceedings of the SIGCHI conference on Human Factors in Computing Systems, Apr. 1-6, 2000, the Hague, the Netherlands, pp. 145-152.
Chung, Chin-Wan, "Dataplex: an Access to Heterogeneous Distributed Databases," Communications of the ACM, Association for Computing Machinery, Inc., vol. 33, No. 1, Jan. 1, 1990, pp. 70-80.
Cohn, et al., "Semi-supervised clustering with user feedback," Constrained Clustering: Advances in Algorithms, Theory, and Applications 4.1 (2003): 17-32.
Conner, Nancy, "Google Apps: the Missing Manual," May 1, 2008, pp. 15.
Countly Mobile Analytics, <http://count.ly/> Printed Jul. 18, 2013 in 9 pages.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Distimo—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Flurry Analytics, <http://www.flurry.com/> Printed Jul. 18, 2013 in 14 pages.
Galliford, Miles, "SnagIt Versus Free Screen Capture Software: Critical Tools for Website Owners," http://www.subhub.com/articles/free-screen-capture-software, Mar. 27, 2008, pp. 11.
Gesher, Ari, "Palantir Screenshots in the Wild: Swing Sightings," The Palantir Blog, Sep. 11, 2007, pp. 1-12.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Golem XIV, "A Word About Banks and the Laundering of Drug Money," Aug. 18, 2012, http://www.golemxiv.co.uk/2012/08/a-word-about-banks-and-the-laundering-of-drug-money/, 21 pages.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Haralick et al., "Image Analysis Using Mathematical Morphology," Pattern Analysis and Machine Intelligence, IEEE Transactions, Jul. 1987, vol. PAMI-9, No. 4, pp. 532-550.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Harville et al., "Mediabeads: an Architecture for Path-Enhanced Media Applications," 2004 IEEE International Conference on Multimedia and Expo, Jun. 27-30, 2004, Taipei, Taiwan, vol. 1, pp. 455-458.
Hibbert et al., "Prediction of Shopping Behavior Using a Huff Model Within a GIS Framework," Healthy Eating in Context, Mar. 18, 2011, pp. 16.

(56) References Cited

OTHER PUBLICATIONS

Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services" HiPC 2006, LNCS 4297, pp. 277-288, 2006.
Huang et al., "Systematic and Integrative Analysis of Large Gene Lists Using David Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
International Search Report and Written Opinion in Application No. PCT/US2009/056703 dated Mar. 15, 2010.
Ipbucker, C., "Inverse Transformation for Several Pseudo-cylindrical Map Projections Using Jacobian Matrix," ICCSA 2009, Part 1 LNCS 5592, pp. 553-564.
Jetscreenshot.com, "Share Screenshots via Internet in Seconds," http://web.archive.org/web/20130807164204/http://www.jetscreenshot.com/, Aug. 7, 2013, pp. 1.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, <http://www.kontagent.com/> Printed Jul. 18, 2013 in 9 pages.
Kwout, http://web.archive.org/web/20080905132448/http://www.kwout.com/ Sep. 5, 2008, pp. 2.
LeSage, "Lecture 2: Mapping in Matlab," Mar. 2004, retrieved from the Internet: URL: http://www4.fe.uc.pt/spatial/doc/lecture2.pdf, 40 pages.
Levine, N., "Crime Mapping and the Crimestat Program," Geographical Analysis, 2006, vol. 38, pp. 41-56.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Lovelace et al., "Introduction to visualizing spatial data in R," Jun. 25, 2014, retrieved from the Internet: URL: https://cran.microsoft.com/snapshot/2014-09-30/doc/contrib/intro-spatial-rl.pdf, 24 pages.
MacWright, Tom, "Announcing MapBOX.JS 1.0 with Leaflet," Mapbox.com blog, Apr. 18, 2013, retrieved from https://www.mapbox.com/blog/mapbox-js-with-leaflet/.
Madden, Tom, "Chapter 16: The Blast Sequence Analysis Tool," The NCBI Handbook, Oct. 2002, pp. 1-15.
Mandagere, Nagapramod, "Buffer Operations in GIS," <http://www-users.cs.umn.edu/~npramod/enc_pdf.pdf> retrieved Jan. 28, 2010, pp. 7.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-US/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Microsoft Windows, "Microsoft Windows Version 2002 Print Out 2," 2002, pp. 1-6.
Microsoft, "Registering an Application to a URI Scheme," http://msdn.microsoft.com/en-us/library/aa767914.aspx, printed Apr. 4, 2009 in 4 pages.
Microsoft, "Using the Clipboard," http://msdn.microsoft.com/en-us/library/ms649016.aspx, printed Jun. 8, 2009 in 20 pages.
Mixpanel—Mobile Analytics, <https://mixpanel.com/> Printed Jul. 18, 2013 in 13 pages.
Mizrachi, Ilene, "Chapter 1: GenBank: the Nuckeotide Sequence Database," the NCBI Handbook, Oct. 2002, pp. 1-14.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Nierman, "Evaluating Structural Similarity in XML Documents", 6 pages, 2002.
Nitro, "Trick: How to Capture a Screenshot as PDF, Annotate, Then Share It," http://blog.nitropdf.com/2008/03/04/trick-how-to-capture-a-screenshot-as-pdf-annotate-it-then-share/, Mar. 4, 2008, pp. 2.
Nolan et al., "McArta: a Malicious Code Automated Run-Time Analysis Framework," Homeland Security, 2012 IEEE Conference on Technologies for, Nov. 13, 2012, pp. 13-17.
Notice of Acceptance for Australian Patent Application No. 2012216622 dated Jan. 6, 2015.
Notice of Acceptance for Australian Patent Application No. 2013251186 dated Nov. 6, 2015.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 12/840,673 dated Apr. 6, 2015.
Notice of Allowance for U.S. Appl. No. 13/728,879 dated Jun. 21, 2016.
Notice of Allowance for U.S. Appl. No. 13/948,859 dated Dec. 10, 2014.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/265,637 dated Feb. 13, 2015.

(56) References Cited

OTHER PUBLICATIONS

Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/319,161 dated May 4, 2015.
Notice of Allowance for U.S. Appl. No. 14/319,765 dated Nov. 25, 2016.
Notice of Allowance for U.S. Appl. No. 14/323,881 dated Jun. 30, 2017.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/616,080 dated Apr. 2, 2015.
Notice of Allowance for U.S. Appl. No. 14/730,123 dated Apr. 12, 2016.
Notice of Allowance for U.S. Appl. No. 14/746,671 dated Jan. 21, 2016.
Notice of Allowance for U.S. Appl. No. 14/934,004 dated Nov. 4, 2016.
Notice of Allowance for U.S. Appl. No. 15/072,133 dated Jun. 23, 2017.
Notice of Allowance for U.S. Appl. No. 15/072,133 dated Sep. 25, 2017.
Notice of Allowance for U.S. Appl. No. 14/323,878 dated Mar. 14, 2019.
Notice of Allowance for U.S. Appl. No. 15/146,841 dated Jun. 21, 2019.
Notice of Allowance for U.S. Appl. No. 15/146,842 dated Jun. 12, 2019.
Official Communication for Australian Patent Application No. 2010227081 dated Mar. 18, 2011.
Official Communication for Australian Patent Application No. 2010257305 dated Apr. 12, 2011.
Official Communication for Australian Patent Application No. 2010257305 dated Sep. 22, 2011.
Official Communication for Australian Patent Application No. 2012216622 dated Jan. 6, 2015.
Official Communication for Australian Patent Application No. 2013251186 dated Mar. 12, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Canadian Patent Application No. 2831660 dated Jun. 9, 2015.
Official Communication for European Patent Application No. 10195798.3 dated May 17, 2011.
Official Communication for European Patent Application No. 12181585.6 dated Sep. 4, 2015.
Official Communication for European Patent Application No. 12186236.1 dated May 17, 2013.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15181419.1 dated Sep. 29, 2015.
Official Communication for European Patent Application No. 15183721.8 dated Nov. 23, 2015.
Official Communication for European Patent Application No. 15184764.7 dated Dec. 14, 2015.
Official Communication for European Patent Application No. 15188106.7 dated Feb. 3, 2016.
Official Communication for European Patent Application No. 15190307.7 dated Feb. 19, 2016.
Official Communication for European Patent Application No. 16160781.7 dated May 27, 2016.
Official Communication for European Patent Application No. 16160781.7 dated Jan. 3, 2019.
Official Communication for European Patent Application No. 16184373.5 dated Jan. 17, 2017.
Official Communication for European Patent Application No. 16184373.5 dated May 28, 2018.

(56) References Cited

OTHER PUBLICATIONS

Official Communication for European Patent Application No. 16186622.3 dated Jan. 18, 2017.
Official Communication for European Patent Application No. 19186114.5 dated Jan. 16, 2020.
Official Communication for Great Britain Patent Application No. 1319225.7 dated May 2, 2014.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.4 dated May 21, 2015.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Great Britain Patent Application No. 1620827.4 dated Jan. 12, 2017.
Official Communication for Great Britain Patent Application No. 1620827.4 dated Nov. 13, 2017.
Official Communication for Great Britain Patent Application No. 1620827.4 dated Sep. 21, 2017.
Official Communication for Great Britain Patent Application No. 1620827.4 dated Jun. 28, 2017.
Official Communication for Netherlands Patent Application No. 2011632 dated Feb. 8, 2016.
Official Communication for Netherlands Patent Application No. 2011729 dated Aug. 13, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2012778 dated Sep. 22, 2015.
Official Communication for Netherlands Patent Application No. 2013306 dated Apr. 24, 2015.
Official Communication for New Zealand Patent Application No. 616167 dated Oct. 10, 2013.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 12/840,673 dated Sep. 17, 2014.
Official Communication for U.S. Appl. No. 12/840,673 dated Jan. 2, 2015.
Official Communication for U.S. Appl. No. 12/840,673 dated Jul. 25, 2012.
Official Communication for U.S. Appl. No. 12/840,673 dated Jan. 4, 2013.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/728,879 dated Aug. 12, 2015.
Official Communication for U.S. Appl. No. 13/728,879 dated Mar. 17, 2015.
Official Communication for U.S. Appl. No. 13/728,879 dated Nov. 20, 2015.
Official Communication for U.S. Appl. No. 13/728,879 dated Jan. 27, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/141,252 dated Oct. 8, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/222,364 dated Dec. 9, 2015.
Official Communication for U.S. Appl. No. 14/225,006 dated Sep. 10, 2014.

(56) References Cited

OTHER PUBLICATIONS

Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/265,637 dated Sep. 26, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,596 dated Aug. 5, 2015.
Official Communication for U.S. Appl. No. 14/289,596 dated May 9, 2016.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Mar. 4, 2016.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,878 dated Jul. 27, 2017.
Official Communication for U.S. Appl. No. 14/323,878 dated Sep. 28, 2017.
Official Communication for U.S. Appl. No. 14/323,878 dated Mar. 30, 2017.
Official Communication for U.S. Appl. No. 14/323,881 dated Nov. 1, 2017.
Official Communication for U.S. Appl. No. 14/323,881 dated Apr. 18, 2017.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated May 12, 2016.
Official Communication for U.S. Appl. No. 14/463,615 dated Nov. 13, 2014.
Official Communication for U.S. Appl. No. 14/463,615 dated Mar. 21, 2016.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/483,527 dated Jun. 22, 2015.

(56) References Cited

OTHER PUBLICATIONS

Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/562,524 dated Feb. 18, 2016.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/715,834 dated Feb. 19, 2016.
Official Communication for U.S. Appl. No. 14/726,353 dated Sep. 10, 2015.
Official Communication for U.S. Appl. No. 14/730,123 dated Sep. 21, 2015.
Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/813,749 dated Sep. 28, 2015.
Official Communication for U.S. Appl. No. 14/841,338 dated Feb. 18, 2016.
Official Communication for U.S. Appl. No. 14/842,734 dated Jun. 1, 2017.
Official Communication for U.S. Appl. No. 14/842,734 dated Nov. 19, 2015.
Official Communication for U.S. Appl. No. 14/842,734 dated Dec. 7, 2017.
Official Communication for U.S. Appl. No. 14/871,465 dated Feb. 9, 2016.
Official Communication for U.S. Appl. No. 14/883,498 dated Mar. 17, 2016.
Official Communication for U.S. Appl. No. 14/883,498 dated Dec. 24, 2015.
Official Communication for U.S. Appl. No. 14/929,584 dated May 25, 2016.
Official Communication for U.S. Appl. No. 14/929,584 dated Feb. 4, 2016.
Official Communication for U.S. Appl. No. 14/934,004 dated Feb. 16, 2016.
Official Communication for U.S. Appl. No. 14/934,004 dated Jul. 29, 2016.
Official Communication for U.S. Appl. No. 15/072,133 dated Nov. 10, 2016.
Official Communication for U.S. Appl. No. 15/072,133 dated Mar. 17, 2017.
Official Communication for U.S. Appl. No. 14/323,878 dated Feb. 28, 2018.
Official Communication for U.S. Appl. No. 14/323,878 dated Sep. 7, 2018.
Official Communication for U.S. Appl. No. 15/146,841 dated Nov. 28, 2018.
Official Communication for U.S. Appl. No. 15/146,841 dated Mar. 8, 2018.
Official Communication for U.S. Appl. No. 15/146,842 dated Nov. 28, 2018.
Official Communication for U.S. Appl. No. 15/146,842 dated Mar. 30, 2018.
Official Communication for U.S. Appl. No. 15/146,842 dated Mar. 7, 2018.
Olanoff, Drew, "Deep Dive with the New Google Maps for Desktop with Google Earth Integration, It's More than Just a Utility," May 15, 2013, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/, 7 pages.
Online Tech Tips, "Clip2Net—Share files, folders and screenshots easily," http://www.online-tech-tips.com/free-software-downloads/share-files-folders-screenshots/, Apr. 2, 2008, pp. 5.
Open Street Map, "Amm's Diary: Unconnected ways and other data quality issues," http://www.openstreetmap.org/user/amm/diary printed Jul. 23, 2012 in 3 pages.
Open Web Analytics (OWA), <http://www.openwebanalytics.com/> Printed Jul. 19, 2013 in 5 pages.
O'Reilly.com, http://oreilly.com/digitalmedia/2006/01/01/mac-os-x-screenshot-secrets.html published Jan. 1, 2006 in 10 pages.
Palantir Technologies, "Palantir Labs_Timeline," Oct. 1, 2010, retrieved from the internet https://www.youtube.com/watch?v=JCgDW5bru9M.
Palantir Technologies, "Palantir Labs-13 Timeline," Oct. 1, 2010, retrieved from the internet https://www.youtube.com/watch?v=JCgDW5bru9M retrieved on Aug. 19, 2015.
Palantir, "Basic Map Searches," YouTube, Sep. 12, 2013, retrieved from https://www.youtube.com/watch?v=UC-1x44xFRO.
Palantir, "Intelligence Integration in Palantir: an Open-Source View of the Afghan Conflict," YouTube, Jul. 5, 2012, retrieved from https://www.youtube.com/watch?v=FXTxs2YqHY4.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
Piwik—Free Web Analytics Software. < http://piwik.org/> Printed Jul. 19, 2013 in18 pages.

(56) References Cited

OTHER PUBLICATIONS

POI Editor, "How to: Create Your Own Points of Interest," <http://www.poieditor.com/articles/how_to_create_your_own_points_of_interest/> printed Jul. 22, 2012 in 4 pages.

Pozzi et al., Vegetation and Population Density in Urban and Suburban Areas in.

Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.

Quest, "Toad for Oracle 11.6—Guide to Using Toad," Sep. 24, 2012, pp. 1-162.

Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.

Reibel et al., "Areal Interpolation of Population Counts Using Pre-classi_ed Land Cover Data," Population Research and Policy Review, 2007, vol. 26, pp. 619-633.

Reibel, M., "Geographic Information Systems and Spatial Data Processing in Demography: a Review," Population Research and Policy Review, 2007, vol. 26, pp. 601-618.

Restriction Requirement for U.S. Appl. No. 13/839,026 dated Apr. 2, 2015.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Rouse, Margaret, "OLAP Cube," <http://searchdatamanagement.techtarget.com/definition/OLAP-cube>, Apr. 28, 2012, pp. 16.

Schroder, Stan, "15 Ways To Create Website Screenshots," http://mashable.com/2007/08/24/web-screenshots/, Aug. 24, 2007, pp. 2.

Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.

Sigrist, et al., "Prosite, a Protein Domain Database for Functional Characterization and Annotation," Nucleic Acids Research, 2010, vol. 38, pp. D161-D166.

Sirotkin et al., "Chapter 13: the Processing of Biological Sequence Data at NCBI," the NCBI Handbook, Oct. 2002, pp. 1-11.

SnagIt, "SnagIt 8.1.0 Print Out 2," Software release date Jun. 15, 2006, pp. 1-3.

SnagIt, "SnagIt 8.1.0 Print Out," Software release date Jun. 15, 2006, pp. 6.

SnagIt, "SnagIt Online Help Guide," http://download.techsmith.com/snagit/docs/onlinehelp/enu/snagit_help.pdf, TechSmith Corp., Version 8.1, printed Feb. 7, 2007, pp. 284.

Snyder, "Map Projections—a Working Manual," U.S. Geological Survey Professional paper 1395, United States Government Printing Office, Washington: 1987, pp. 11-21 and 60-70.

Sonris, "Using the Area of Interest Tools," <http://web.archive.org/web/20061001053327/http://sonris-www.dnr.state.la.US/gis/instruct_files/tutslide12> printed Jan. 3, 2013 in 1 page.

StatCounter—Free Invisible Web Tracker, Hit Counter and Web Stats, <http://statcounter.com/> Printed Jul. 19, 2013 in 17 pages.

Symantec Corporation, "E-Security Begins with Sound Security Policies," Announcement Symantec, Jun. 14, 2001.

Tangelder et al., "Freeform Shape Matching Using Minkowski Operations," The Netherlands, Jun. 1996, pp. 12.

TestFlight—Beta Testing on the Fly, <http://testflightapp.com/> Printed Jul. 18, 2013 in 3 pages.

Thompson, Mick, "Getting Started with GEO," Getting Started with GEO, Jul. 26, 2011.

Trak.io, Analytics For Data Driven Startups, <http://trak.io/> printed Jul. 18, 2013 in 3 pages.

Umagandhi et al., "Search Query Recommendations Using Hybrid User Profile with Query Logs," International Journal of Computer Applications, vol. 80, No. 10, Oct. 1, 2013, pp. 7-18.

Usermetrix, <http://usermetrix.com/android-analytics> printed Jul. 18, 2013 in 3 pages.

Valentini et al., "Ensembles of Learning Machines", M. Marinaro and R. Tagliaferri (Eds.): Wirn Vietri 2002, LNCS 2486, pp. 3-20.

VB Forums, "Buffer a Polygon," Internet Citation, <http://www.vbforums.com/showthread.php?198436-Buffer-a-Polygon>, Specifically Thread #1, #5 & #11 retrieved on May 2, 2013, pp. 8.

Vivid Solutions, "JTS Topology Suite: Technical Specifications," <http://www.vividsolutions.com/jts/bin/JTS%20Technical%20Specs.pdf> Version 1.4, 2003, pp. 36.

Vose et al., "Help File for ModelRisk Version 5," 2007, Vose Software, pp. 349-353. [Uploaded in 2 Parts].

Wang et al., "Research on a Clustering Data De-Duplication Mechanism Based on Bloom Filter," IEEE 2010, 5 pages.

Warren, Christina, "TUAW Faceoff: Screenshot apps on the firing line," http://www.tuaw.com/2008/05/05/tuaw-faceoff-screenshot-apps-on-the-firing-line/, May 5, 2008, pp. 11.

Wikipedia, "Douglas_Peucker-Algorithms," <http://de.wikipedia.org/w/index.php?title=Douglas-Peucker-Algorithmus&oldid=91846042> printed Jul. 2011, pp. 2.

Wikipedia, "Federated Database System," Sep. 7, 2013, retrieved from the internet on Jan. 27, 2015 http://en.wikipedia.org/w/index.php?title=Federated_database_system&oldid=571954221.

Wikipedia, "Multimap," Jan. 1, 2013, https://en.wikipedia.org/w/index.php?title=Multimap&oldid=530800748.

Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.

Wongsuphasawat et al., "Visual Analytics for Transportation Incident Data Sets," Transportation Research Record 2138, 2009, pp. 135-145.

Woodbridge, Stephen, "[geos-devel] Polygon simplification," <http://lists.osgeo.org/pipermail/geos-devel/2011-May/005210.html> dated May 8, 2011, pp. 3.

Wright et al., "Palantir Technologies VAST 2010 Challenge Text Records_Investigations into Arms Dealing," Oct. 29, 2010, pp. 1-10.

Yang et al., "HTML Page Analysis Based on Visual Cues", A129, pp. 859-864, 2001.

Official Communication for European Patent Application No. 19186114.5 dated Sep. 15, 2023.

"Finding Files and Content Within Files", as archived Oct. 1, 2011, https://web.archive.org/web/20111001004604/http://matlab.izmiran.ru/help/techdoc/matlab_env/ws_pat32.html in 2 pages.

* cited by examiner

INTERACTIVE USER INTERFACES FOR LOCATION-BASED DATA ANALYSIS

CROSS-REFERENCE TO RELATED APPLICATIONS

This application is a continuation of U.S. patent application Ser. No. 16/567,540, entitled "Interactive User Interfaces for Location-Based Data Analysis," filed Sep. 11, 2019, which application is a continuation of U.S. patent application Ser. No. 15/852,613, entitled "Interactive User Interfaces for Location-Based Data Analysis," filed Dec. 22, 2017, which application is a continuation of U.S. patent application Ser. No. 15/072,133, entitled "Interactive User Interfaces for Location-Based Data Analysis," filed Mar. 16, 2016, which application claims benefit of U.S. Provisional Patent Application Ser. No. 62/133,857, entitled "Wireline Map and Descent Data Analysis System." filed Mar. 16, 2015, and U.S. Provisional Patent Application Ser. No. 62/200,565, entitled "Displaying Attribute and Event Data Along Paths." filed Aug. 3, 2015, each of which is hereby incorporated by reference in its entirety and for all purposes.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for querying databases and displaying queried data in an interactive user interface.

BACKGROUND

A database may store a large quantity of data. For example, a system may comprise a large number of sensors that each collect measurements at regular intervals, and the measurements may be stored in the database. The measurement data can be supplemented with other data, such as information regarding the locations where measured data was captured, and the supplemental data can also be stored in the database.

In some cases, a user may attempt to analyze a portion of the stored data. For example, the user may attempt to analyze a portion of the stored data that is associated with a specific location. However, as the number of measurements increases over time, it can become very difficult for the user to identify the relevant data and perform the analysis.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for accessing data stored in one or more databases in substantially real-time in response to input from a user in order to determine associations between the data and physical locations and to provide the determined associations to the user in an interactive user interface. For example, the computing device may be configured to project a three-dimensional path onto a two-dimensional plane to generate a two-dimensional path, wherein the three-dimensional path corresponds to a trajectory in physical space and comprises a plurality of locations. In response to a received request specifying one or more attributes or event types associated with the three-dimensional path, wherein an event type is associated with one or more events, the computing system may access a database to retrieve data corresponding to the requested one or more attributes or event types, determine associations between the retrieved data and respective locations on the two-dimensional path, and generate user interface data for rendering an interactive user interface, wherein the user interface data includes the two-dimensional path and indications of at least a portion of the retrieved data at corresponding locations on the two-dimensional path, based upon the associations between the retrieved data and respective locations on the two-dimensional path.

In some embodiments, the three-dimensional path may comprise a three-dimensional model of the trajectory.

In some embodiments, the indications of at least a portion of the retrieved data at corresponding location on the two-dimensional path comprises one or more bars associated with the selected attributes or event types at the corresponding locations on the two-dimensional path, wherein a length of a bar of the one or more bars at a particular location is based at least in part upon a value associated with the attribute or event type associated with the bar at the particular location. For example, the request may specify at least a first attribute or event type and a second attribute or event type, wherein one or more bars associated with the first attribute or event type are overlaid on top of one or more bars associated with the second attribute or event type. In some embodiments, a bar of the one or more bars may correspond to at least two events associated with a path location of the bar, wherein a length of the bar is based at least in part upon an aggregate value associated with the at least two events. In some embodiments, in response to a selection of a bar of the one or more bars, the interactive user interface may display data corresponding to an attribute or event associated with the selected bar. In some embodiments, a bar of the one or more bars is displayed to be substantially perpendicular to a tangent of the path at a location on the two-dimensional path corresponding to the bar.

In some embodiments, determining associations between the retrieved data and respective locations on the two-dimensional path may comprise determining associations between the retrieved data and respective locations on the three-dimensional path, and determining associations between the locations on the three-dimensional path and respective locations on the two-dimensional path.

Another aspect of the disclosure provides a computing system configured to generate user interface data for rendering the interactive user interface on a computing device, the interface user interface including a map corresponding to a physical region. The computing system may further be configured to receive a selection specifying at least one attribute, access the database to identify attribute values associated with the selected at least one attribute, determine one or more associations between the identified attribute values and locations on the map, generate a heatmap corresponding to the map, based at least in part upon the determined one or more associations, and update the user interface data such that the interface user interface includes the heatmap overlaying the map.

In some embodiments, the at least one attribute may comprise a depth attribute or a thickness attribute of a geological layer. The at least one attribute may comprise a measurement value associated with a sensor or structure located on the map.

In some embodiments, the attribute values may comprise an aggregation of two or more different attributes. For example, the two or more different attributes may comprise a first thickness of a first geological layer and a second thickness of a second geological layer, wherein an attribute value associated with a particular location corresponds to a sum of the first thickness and the second thickness at the particular location.

In some embodiments, the computing system may be further configured to calculate one or more predicted attribute values, wherein the predicted attribute values are associated with locations that are not associated with the identified attribute values. Calculating a predicted attribute value may be based at least in part upon a distance between the location associated with the predicted attribute value and a location associated with an identified attribute value.

Another aspect of the disclosure provides a computing system configured to access data stored in one or more databases in substantially real-time in response to input from a user in order to determine information related to measured data points and provide the determined information to the user in an interactive user interface, the computing system comprising: a computer processor; a database storing parameter values associated with a first parameter for a plurality of physical structures; and a computer readable storage medium storing program instructions configured for execution by the computer processor in order to cause the computing system to: generate user interface data for rendering the interactive user interface on a computing device, the interactive user interface including a first container and a second container, wherein the first container comprises a geographic map depicting a location of the plurality of physical structures; receive a selection of the first parameter and a first parameter value; determine one or more physical structures in the plurality of physical structures associated with a parameter value greater than the first parameter value; update the user interface data such that the geographic map depicts a location of the determined one or more physical structures; and update the user interface data such that the second container comprises a histogram identifying a number of the determined one or more physical structures that are associated with a parameter value greater than the first parameter value.

In some embodiments, the computer readable storage medium further stores program instructions that cause the computing system to update the user interface data such that each icon representing the location of the determined one or more physical structures is shaded a color that corresponds with the parameter value associated with the respective physical structure.

In some embodiments, the computer readable storage medium further stores program instructions that cause the computing system to: receive a selection of a first icon in the geographic map representing a location of a first physical structure; receive a selection of a second icon in the geographic map representing a location of a second physical structure after receiving the selection of the first icon; and update the user interface data such that the interactive user interface displays a first depth graph associated with the first physical structure and a second depth graph associated with the second physical structure.

In some embodiments, the first depth graph is located to the left of the second depth graph in the interactive user interface. The first depth graph may comprise a geological layer at a first depth level and the second depth graph comprises a geological layer at a second depth level that is different than the first depth level, such that the geological layer in the first depth graph and the geological layer in the second depth graph are depicted in a different horizontal plane in the interactive user interface. The computer readable storage medium further may store program instructions that cause the computing system to: receive a selection of the geological layer in the first depth graph; and update the user interface data such that the geological layer in the first depth graph and the geological layer in the second depth graph are depicted in a same horizontal plane in the interactive user interface.

In some embodiments, the first depth graph comprises a first attribute graph plotting attribute values measured at different depths associated with the location of the first physical structure. The computer readable storage medium may further store program instructions that cause the computing system to: receive a selection of a second attribute graph plotting attribute values measured at different depths associated with the location of the second physical structure; and update the user interface data such that the first depth graph displays the second attribute graph adjacent to the first attribute graph. In some embodiments, the computer readable storage medium may, in response to a received indication that the second attribute graph is dragged over the first attribute graph, update the user interface data such that the first attribute graph reflects attribute values measured at different depths associated with the location of the first physical structure and the location of the second physical structure. In some embodiments, the first sensor reading graph comprises readings from a first sensor, wherein the second sensor reading graph comprises readings from a second sensor, and wherein the computer readable storage medium further stores program instructions that cause the computing system to: receive an indication that the second sensor reading graph is dragged over the first sensor reading graph; and update the user interface data such that the first sensor reading graph comprises the readings from the first sensor and the readings from the second sensor.

In some embodiments, the computer readable storage medium further stores program instructions that cause the computing system to: receive a selection of a first layer identifier in the geographic map, wherein a first geographic layer is associated with the first layer identifier; and update the user interface data such that the interactive user interface displays the first geographic layer in the geographic map under the depiction of the location of the plurality of physical structures.

Another aspect of the disclosure provides computing system configured to access one or more databases in substantially real-time in response to input from a user provided via an interactive user interface in order to display a preview of a shape in the interactive user interface, the computing system comprising: a computer processor; and a computer readable storage medium storing: a data structure including a plurality of shape files; and program instructions configured for execution by the computer processor to cause the computing system to: receive a search term; identify, in the data structure, a first shape file in the stored shape files that includes the search term, wherein the first shape file comprises a first file name with a first file extension; retrieve one or more shape files in the data structure that comprise the first file name, wherein each retrieved file comprises a file extension different than the first file extension; generate a shape preview based on data in the first shape file and data in the retrieved one or more shape files; and generate user interface data for rendering the interactive user interface on a computing device, the interactive user interface including the shape preview.

In some embodiments, one of metadata of the first file or code in the first file may comprise the search term.

In some embodiments, the computer readable storage medium may further store program instructions that cause the computing system to: receive a request to view a shape associated with the shape preview; and update the user interface data such that the interactive user interface comprises a geographic map and a representation of the shape in the geographic map.

In some embodiments, the shape preview comprises a depiction of a geological layer.

In some embodiments, the computer readable storage medium further stores program instructions that cause the computing system to: receive a request to rotate the shape preview from a first orientation to a second orientation; and update the user interface data such that the interactive user interface displays the shape preview in the second orientation.

In some embodiments, the computer readable storage medium further stores program instructions that cause the computing system to: receive a request to download the first file and each file in the one or more databases that comprises the first file name; and transmit the first file and each file in the one or more databases that comprises the first file name to a user device over a network.

In some embodiments, the computer readable storage medium further stores program instructions that cause the computing system to: receive a request to download the first file and each file in the one or more databases that comprises the first file name; aggregate the first file and each file in the one or more databases that comprises the first file name into a compressed data file; and transmit the compressed data file to the user device over the network.

In some embodiments, the content of each file in the one or more databases that comprises the first file name is not searchable. The shape preview may comprise a three-dimensional shape. The interactive user interface may further include a preview of text present in the first file. In some embodiments, at least a portion of a file name of each of the retrieved files comprises the first file name.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of maps and charts and may enable a user to more quickly and accurately access, navigate, assess, and digest the map and chart data than previous systems.

Further, the interactive and dynamic user interfaces described herein are enabled by innovations in efficient interactions between the user interfaces and underlying systems and components. For example, disclosed herein are improved methods of displaying geographic maps, determining cross-section layer information along paths, generating heatmaps on geographic maps, projecting paths onto a two-dimensional plane, and associating event and/or attribute data with physical locations on a projected path. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data analysis technology is limited in various ways, and various embodiments of the disclosure provide significant improvements over such technology. Additionally, various embodiments of the present disclosure are inextricably tied to computer technology. In particular, various embodiments rely on detection of user inputs via graphical user interfaces, calculation of cross-section data and/or other attribute data based on those user inputs, generation of heatmaps based upon user-selected attributes or aggregations of user-selected attributes, generation of a two-dimensional path projection from a three-dimensional path, automatically displaying indications of attribute values and/or events along the path projected at locations corresponding to the attributes values and/or events. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

Additional embodiments of the disclosure are described below in reference to the appended claims, which may serve as an additional summary of the disclosure.

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

DETAILED DESCRIPTION

Figure 1A:
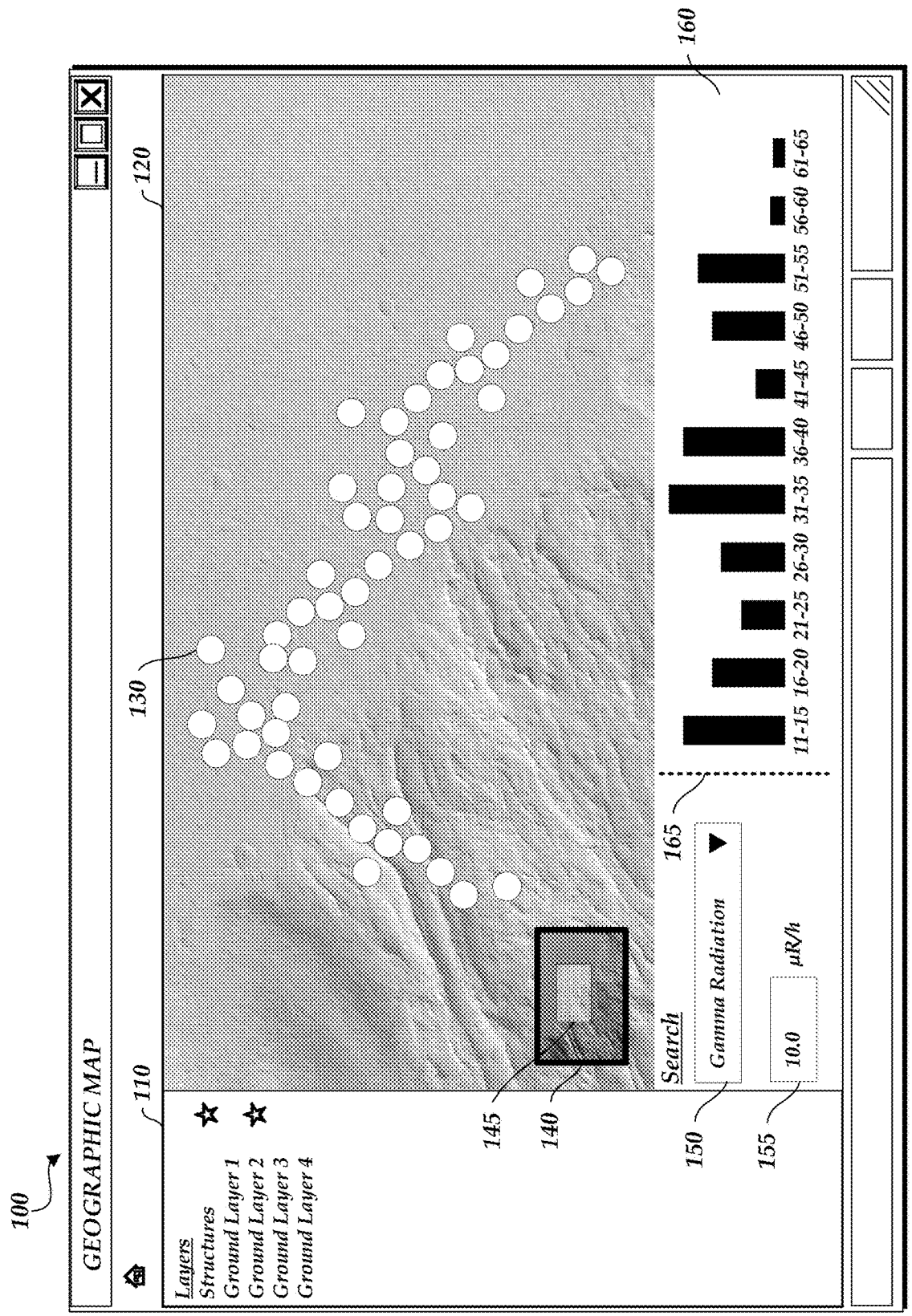
FIGS. 1A-1B illustrate a user interface that displays a location of physical structures in a geographic area.

Overview: Data Analysis Via Interactive User Interfaces

As described above, it can become very difficult for the user to identify relevant data and perform an analysis when a database includes a large amount of data. This may be especially true if the user would like to compare two or more data sets that include measurements captured over various geological layers, where the data sets correspond to measurements taken in physical apparatuses (such as by sensors in oil wells, mines, or geological formations). For example, in the case of structures such as mines or oil wells, users with different specialties (e.g., chemists, physicists, petroleum physicists, etc.) may analyze different portions of the data that correspond with their specialty. These analyses may then be combined and presented to a geologist or other user in a user interface that includes a geographic map. However, the displayed data is static as the analyses have already been performed. It may then be difficult or burdensome for the geologist or other user to try to identify trends in the data and/or isolate current or future issues with the sensors, structures, geological layers, and/or the like.

Accordingly, disclosed herein are various systems and methods for displaying various graphs in an interactive user interface in substantially real-time in response to input from a user in order to determine information related to measured data points and provide the determined information to the user in the interactive user interface. For example, a first computing device may be configured to retrieve data measured by various sensors and compress the retrieved data so that the compressed data can be transported to and stored in one or more databases in an efficient manner. The sensors may be located in various physical structures, such as oil wells, mines, or geological structures or formations, and may be at various depths above and/or below the ground or the ocean surface. The sensors may include any available type of sensor, such as temperature, pressure, humidity, etc. sensors. In one embodiment, a sensor array may be in the form of a cable, such as a fiber optic cable, to provide a distributed acoustic sensing (DAS) system. For example, a single fiber optic cable may become a sensing element that includes hundreds to thousands of sensors that can detect vibrations and/or other physical parameters. As pulsed light is transmitted through the fiber optic cable, the fiber optic cable may act as a distributed interferometer and an optoelectronic device coupled to the fiber optic cable (e.g., Optical Time Domain Reflectometer (OTDR) instrumentation) may monitor a backscatter noise signature (e.g., a coherent Rayleigh backscatter noise signature) in the fiber optic cable. The optoelectronic device may measure the intensity of the reflected light after the light pulse is transmitted and changes in the reflected intensity of successive light pulses from the same region in the fiber optic cable can be determined. The intensity of the reflected light may be dependent on a strain and/or a temperature at various locations around the fiber optic cable. The optoelectronic device may be able to detect variations in the strain and/or temperature simultaneously at all regions in the fiber optic cable. The fiber optic cable may be hundreds of meters long and the sensors may be spaced evenly (or unevenly) throughout. In other embodiments, other types of sensors may be used.

The one or more databases may be located on land and coupled to the sensors via a communication medium, such as a cable or a wireless connection. Each instance of data measured by a sensor may include a plurality of parameters. For example, each instance of measured data may include an amplitude of the measured data, a depth at which the data was measured, a time at which the data was measured, a frequency range of the measured data (which may correspond to an octave in a plurality of octaves), and/or other like parameters.

A second computing device (e.g., the computing system 1700 of FIG. 17 described below) may retrieve the data stored in the one or more databases and generate an interactive user interface to display the data. For example, the interactive user interface may include a geographic map and indication of a location of various system components, such as structures (e.g., mines, oil wells, geological formations, and/or the like) in the examples discussed herein. The user may also be able to cause the system to generate a two-dimensional cross-section of layer data along one or more user-defined paths in the geographic map, and/or generate heatmaps indicating one or more attribute values across the geographic map. The interactive user interface may include various filters that allow a user to view a subset of the available structures. The user interface may be interactive in that the user interface may allow the user to select one or more structures, which causes the user interface to display attribute graphs (e.g., depth graphs) for each of the selected structures in a depth view. The user may be able to manipulate each of the depth graphs to view additional sensor data, identify trends, and/or the like. The user may also be able to view event timelines associated with one or more structures, and/or project a path or trajectory associated with a structures onto a two-dimensional plane, and view attribute values or events associated with locations on the projected path. The interactive user interfaces are described in greater detail below with respect to FIGS. 1A through 16.

The systems and methods described herein may provide several benefits. For example, the systems and methods described herein may improve the usability of the user interface by providing geographic maps and graphs that can be manipulated by a user in a concurrent manner, thereby allowing the user to identify trends or other information associated with the geographic maps and/or graphs. As another example, the systems and methods described herein may reduce the processor load while the user is interacting with the user interfaces by presenting depth graphs in a concurrent manner such that the user may not have to request sensor data associated with different structures separately and have the second computing system use additional processing resources to load and display the sensor data. Thus, the systems and methods described herein may improve the usability of the user interface.

As used herein, a "geological layer" or "zone" can be any stratum (e.g., a layer of sedimentary rock or soil with internally consistent characteristics that are distinguished from the characteristics of other layers) or geological formation (e.g., a combination of strata that may have a comparable lithology, facies, or other similar properties). Examples of a geological layer may include Hastings Beds, Kimmeridge Clay, Oxford Clay, Ferris Formation, and/or the like.

References herein to "databases" may refer to any type of data structure for storing and/or organizing data, including, but not limited to, relational databases (for example, Oracle database, mySQL database, and the like), spreadsheets, XML files, and text files, among others. The various terms "database," "data store," and "data source" may be used interchangeably in the present disclosure.

While the disclosure is described herein with respect to particular applications, such as mining, oil wells, and/or the like, this is not meant to be limiting. For example, the systems and methods described herein may facilitate the display of data captured by or associated with any physical apparatus or structure. Such physical apparatuses or structures may be those that include sensors used to measure physical parameters.

Examples of Manipulating the Geographic Map in an Interactive User Interface

Figure 1B:
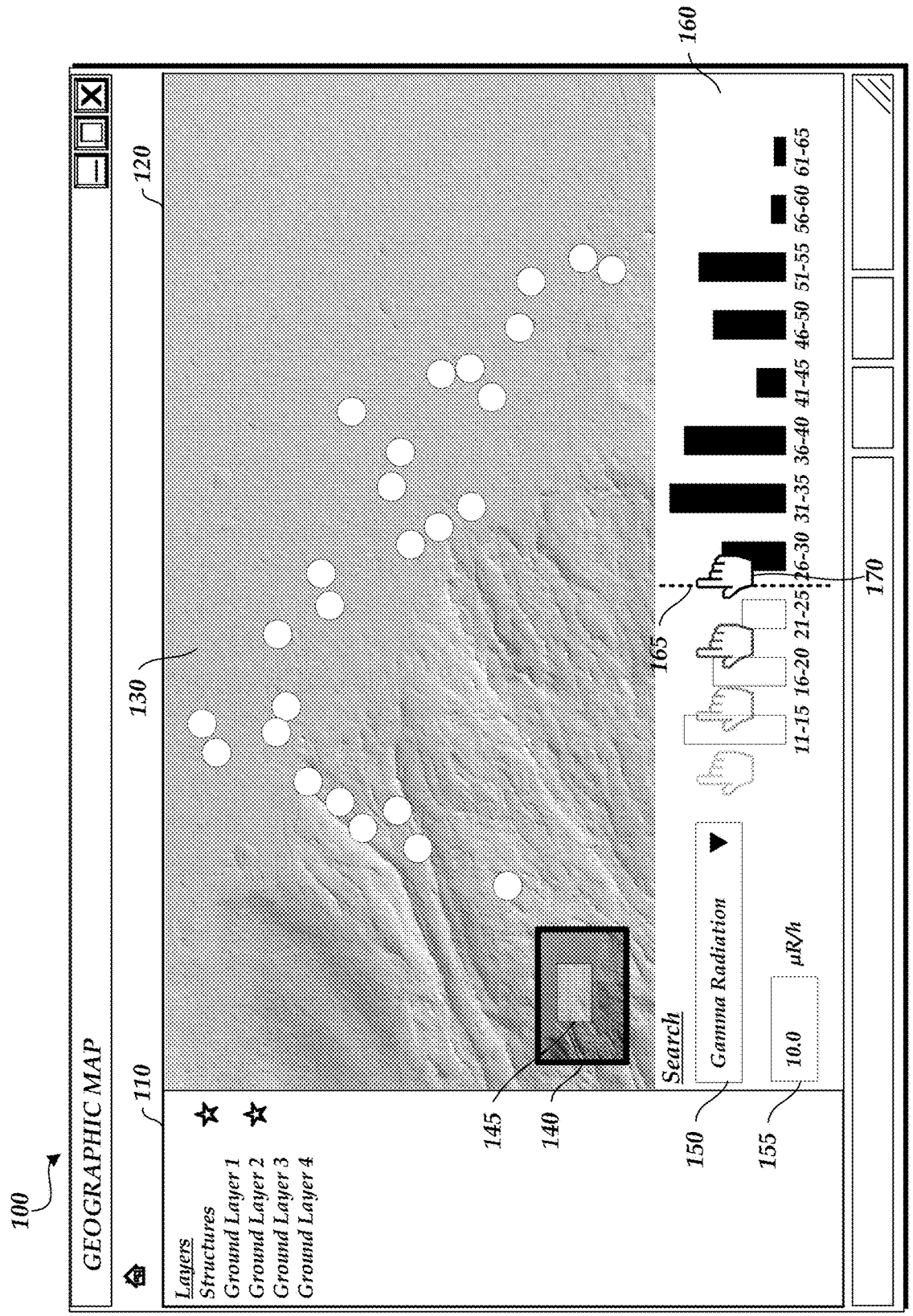

FIGS. 1A and 1B illustrate a user interface 100 that displays a location of physical structures in a geographic area. As illustrated in FIG. 1A, window 120 includes a geographic map with icons or markers that represent the locations of physical structures (e.g., mines, oil wells, geological structures or formations, and/or the like). For example, icon 130 represents the location of a first structure. Window 110 includes a list of selectable layers that, when selected, are displayed in the window 120. The layers may represent physical structures (e.g., mines, oil wells, geological structures or formations, etc.), geological layers, and/or the like. For example, as illustrated in FIG. 1A, a "Structures" layer and a "Ground Layer 2" layer are selected. Thus, the geographic map in the window 120 displays data associated with each layer.

The window 120 may include a mini-map 140 that displays a larger geographic area than is depicted in the window 120 and indication of the portion of the larger geographic area that is depicted in the window 120 (e.g., via box 145). The user may adjust the portion of the larger geographic area that is depicted in the window 120 by moving the box 145 within the mini-map 140.

The user interface 100 may further include filters. For example, the user may select filters in drop-down box 150 and/or values associated with the selected filters to pare the data depicted in the window 120. As illustrated in FIG. 1A, the user has selected the "gamma radiation" filter and entered a gamma radiation value of 10 µR/h in field 155. Thus, the window 120 only displays structures that have a value of the attribute (e.g., gamma radiation) satisfying the filter value (e.g., greater than 10 µR/h). Although not shown, the user may provide additional filters (that are or that are not dependent on a value provided by the user) to further pare the data depicted in the window 120. Other filters may include spontaneous potential, resistivity logs, borehole compensated, formation density compensated, compensated neutron, nuclear magnetic resonance, and/or the like.

The user interface 100 may further include a histogram 160. The histogram 160 may be associated with a selected filter such that the histogram 160 provides a more detailed view of the number of structures that satisfy the selected filter. For example, the histogram 160 indicates a number of structures that have a gamma radiation within different value ranges, such as between 11-15 µR/h, between 16-20 µR/h, between 21-25 µR/h, and so on.

A marker 165 may be displayed adjacent to the histogram 160 and can be used by the user to further filter the number of structures displayed in the window 120. For example, as illustrated in FIG. 1B, the user may move the marker 165 from its initial position to the left of the histogram 160 to a position between the 21-25 µR/h and 26-30 µR/h buckets using cursor 170. By moving the marker 165 to its position in FIG. 1B, any structures associated with a gamma radiation value below 26 µR/h may be hidden from view in the window 120. Thus, the position of the marker 165 may dictate which structures are displayed and which structures are not displayed in the window 120. The position of the marker 165 may or may not also cause an update to the value entered in the box 155 (e.g., the value entered in the box 155 may be updated to read 25 µR/h in some embodiments).

Figure 2:
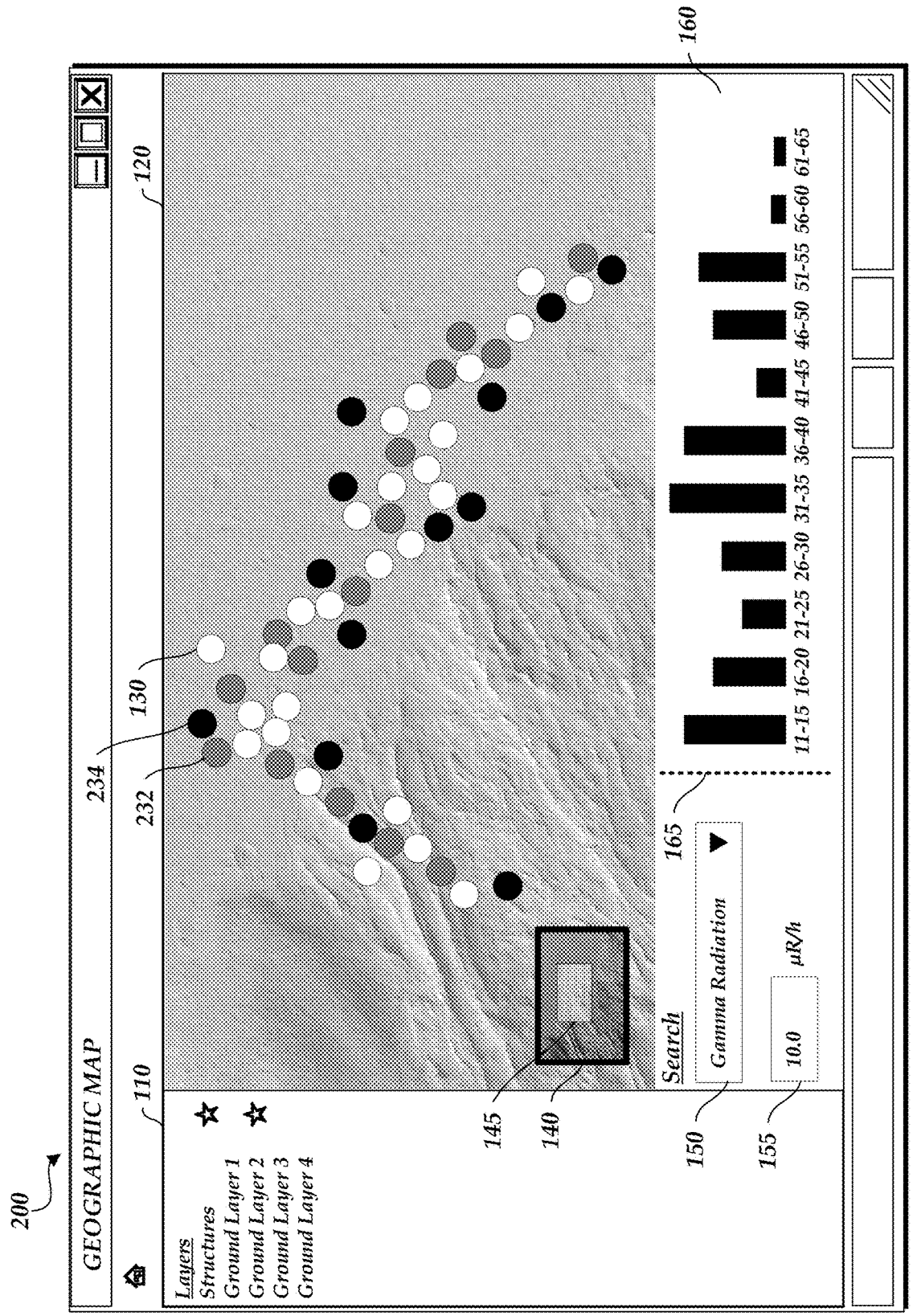
FIG. 2 illustrates another user interface that displays a heat map identifying the relative value of a selected parameter for a plurality of physical structures within a geographic area.

FIG. 2 illustrates another user interface 200 that displays a heat map identifying the relative value of a selected parameter for a plurality of structures within a geographic area. The heat map may be displayed in the window 120 such that the icons representing the structures are color shaded according to the value of the selected parameter associated with the respective structure. Alternatively, the icons may be graphically represented in a different way depending on the value of the selected parameter (e.g., a number associated with the value of the selected parameter may be displayed near or on each icon, each icon may blink at a frequency corresponding to the value of the selected parameter, etc.). The user interface 200 may include a legend to indicate the meaning of the different graphical representations of the icons (not shown).

As illustrated in FIG. 2, the selected parameter is "gamma radiation" as indicated by the drop-down box 150. The icons may be shaded lighter colors to indicate low values of gamma radiation and may be shaded darker colors to indicate high values of gamma radiation. For example, the icon 130 may be associated with a structure that has low gamma radiation levels (e.g., 11 μR/h), icon 232 may be associated with an structure that has medium gamma radiation levels (e.g., 26 μR/h), and icon 234 may be associated with an structure that has high gamma radiation levels (e.g., 41 μR/h). In some embodiments, not shown, the icons are each shaded a color within a color range that has different colors and/or intensity of colors, where the shading is dependent on the value of the selected parameter for the structure associated with the respective icon. The colors may overlap and/or blend between icons that represent structures.

Figure 3A:
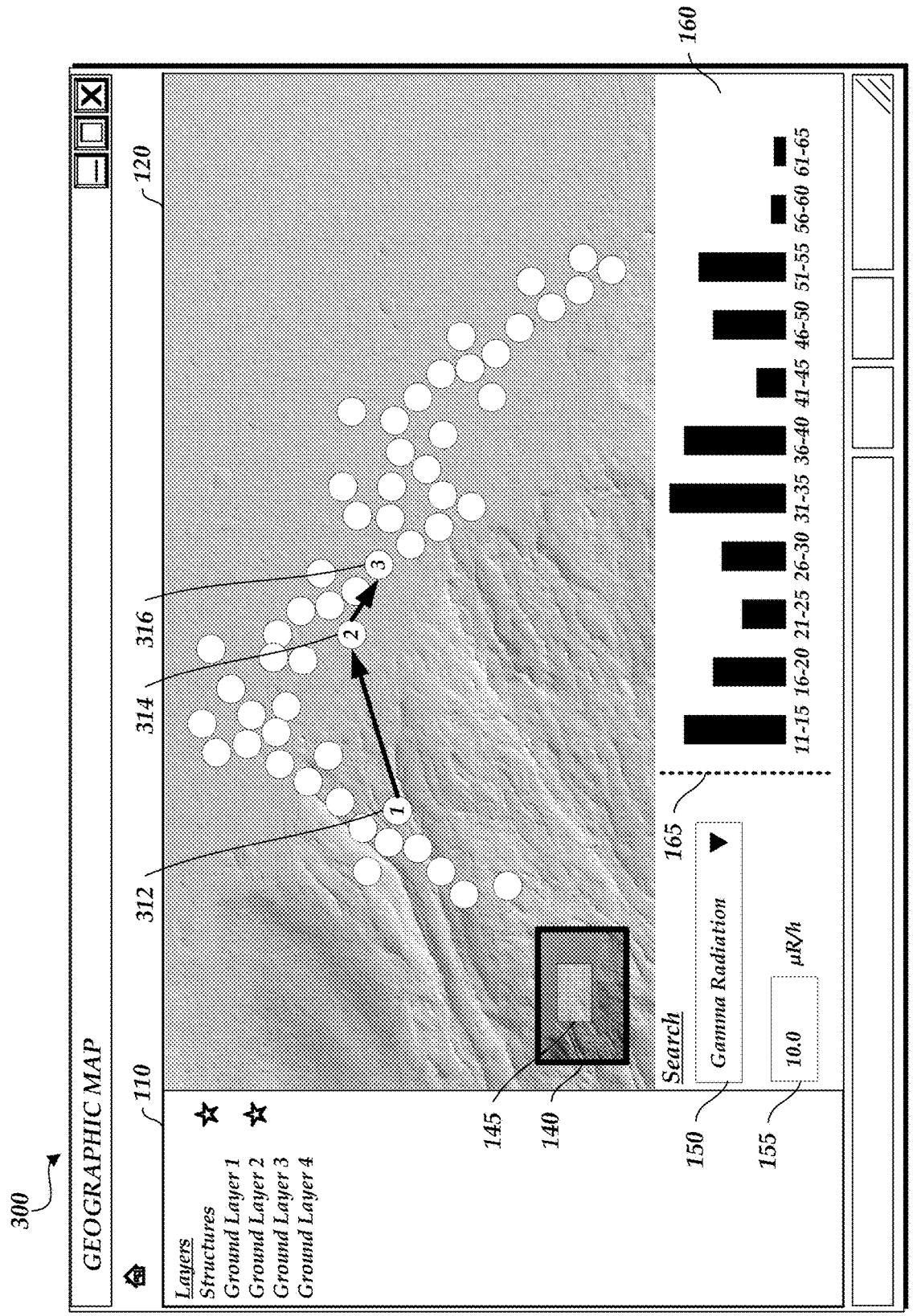
FIG. 3A illustrates another user interface that displays the selection of a plurality of physical structures within a geographic area.

FIG. 3A illustrates another user interface 300 that displays the selection of a plurality of structures within a geographic area. As described herein, any of the icons representing structures can be selected by the user in the window 120. The user may select icons at once or in a specific order. As illustrated in FIG. 3A, the user has selected icon 312 first (corresponding to structure #1), then icon 314 (corresponding to structure #2), and then icon 316 (corresponding to structure #3). The window 120 may include arrows or similar markers to visually provide feedback to the user to indicate the order in which the icons were selected. Selection of an icon representing an structure may cause the user interface 300 to display the depth view, which is described in greater detail below with respect to FIGS. 3B-3C and 5A-7C. Likewise, selection of an icon or button in the depth view may cause the user interface 300 to display one or more structures within a geographic area, as illustrated, for example, in FIG. 3A.

Figure 3B:
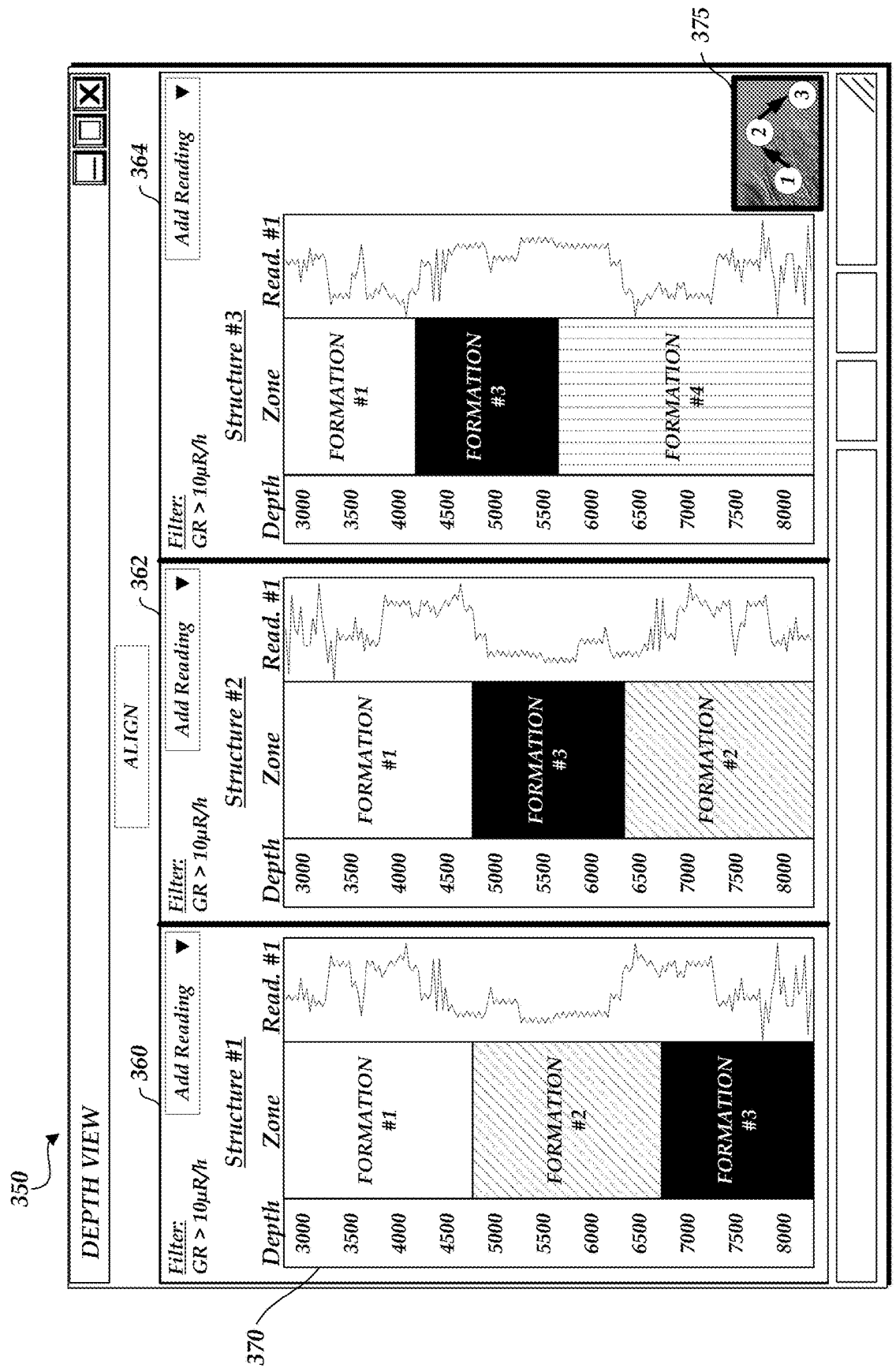
FIGS. 3B-3C illustrate another user interface that displays depth graphs for the selected plurality of physical structures.
Figure 3C:
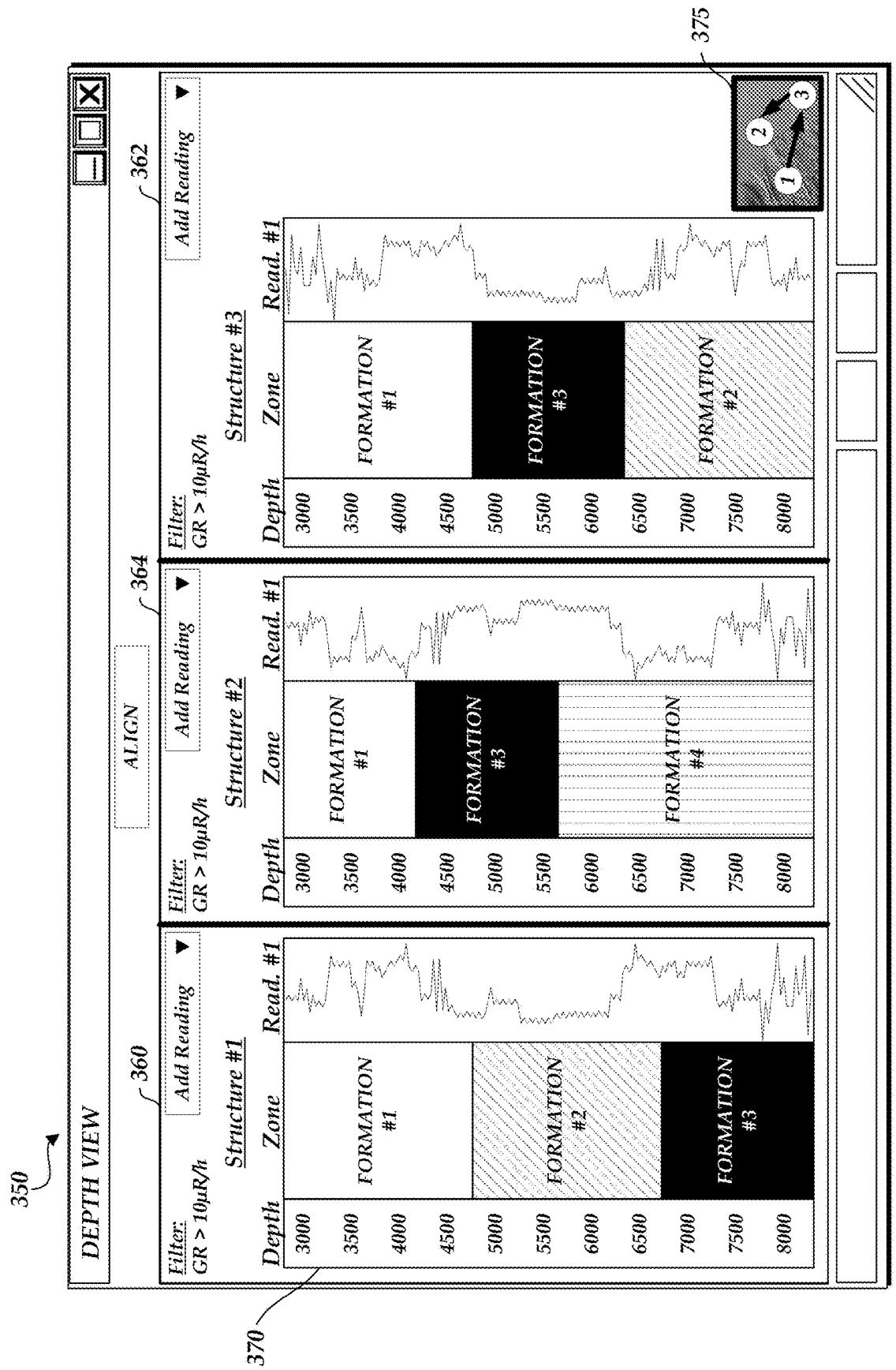

FIGS. 3B and 3C illustrate another user interface 350 that displays depth graphs for the selected plurality of structures. As illustrated in FIG. 3B, the depth view illustrated in the user interface 350 includes a window 360 associated with structure #1, a window 362 associated with structure #2, and a window 364 associated with structure #3. The windows 360, 362, and 364 may be displayed in the user interface 350 in the same order in which the icons 312, 314, and 316 were selected. Each window 360, 362, and 364 may identify the associated structure, any filters that were applied in the user interface 300 of FIG. 3A (e.g., a filter like selecting to only view structures with gamma radiation values above 10 μR/h), the functionality to add additional sensor readings, and a depth graph, such as depth graph 370.

Each depth graph may present a cross-section of the composition of the ground at a location of the respective structure. For example, the depth graph 370 includes a y-axis that that identifies various depth levels and that identifies the depth levels at which various geological layers or zones are located within or surrounding the structure #1. In addition, the depth graph 370 may include a line graph (or other such graph) that plots the values measured from a sensor within the structure #1 at the depth levels indicated along the y-axis. In some embodiments, these graphs that plot attribute values measured along different depth levels may be referred to as "sensor reading graphs" or "reading graphs." The values may be measured from the sensor for a single instance of time. The user may be able to adjust a time-axis such that the depth graph 370 displays values measured from the sensor at different time instances (not shown). As described in greater detail below, the depth graphs are not limited to displaying the readings from one sensor. The user may add additional line graphs that concurrently plot the values measured from other sensors within an structure.

The depth view in the user interface 350 may further include a mini-map 375. The mini-map 375 may include a smaller version of the geographic map illustrated in the window 120 and display the selected icons, as described above with respect to FIG. 3A, with an indication of the order in which the icons were selected.

In an embodiment, the windows 360, 362, and 364 can be manipulated such that the order in which they are displayed in the user interface 350 can be adjusted. For example, windows 362 and 364 can be swapped as illustrated in FIG. 3C. The user may adjust the order in which the windows 360, 362, and/or 364 are displayed by selecting and dragging a window to a new location, by entering a command using an input device (e.g., a keyboard, a mouse, etc.), and/or the like. In response to swapping windows 362 and 364, the mini-map 375 may be updated to reflect the change. For example, the mini-map 375 may adjust the arrows or similar markers to indicate that the order of the selected structures is now structure #1, structure #3, and structure #2.

Displaying information about the structures in the correct order may aid users in identifying trends. For example, a user may wish to determine whether the geographic map is accurate in displaying information about the selected structures, such as whether the location, geological layers, and/or the like are correctly displayed. The order may also be important in viewing the progression in geological topologies, which may aid in identifying trends in the data or current or future issues with the sensors, structures, geological layers, and/or the like.

Figure 4A:
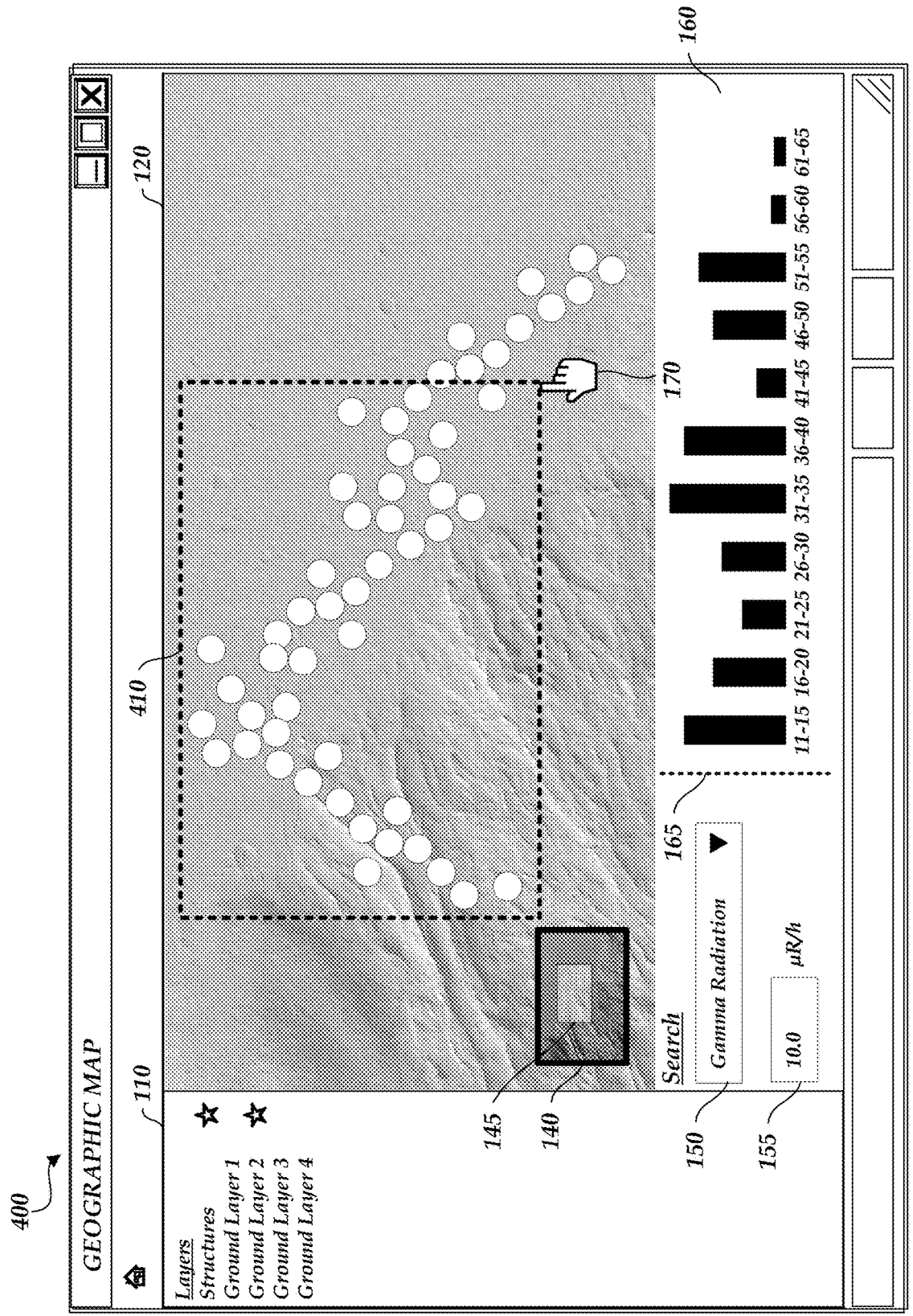
FIG. 4A illustrates another user interface that displays the selection of a plurality of physical structures within a geographic area.

FIG. 4A illustrates another user interface 400 that displays the selection of a plurality of structures within a geographic area. As illustrated in FIG. 4A, the user may select one or more structures by creating a lasso 410 using the cursor 170. Alternatively, the user may select one or more structures in any manner, such as by entering a command into an input device, providing a voice command, and/or the like.

The user may further provide one or more parameters that are associated with structures (e.g., values derived from the sensors of the structures) that are of interest. The user may provide the parameters in any way as described herein.

Figure 4B:
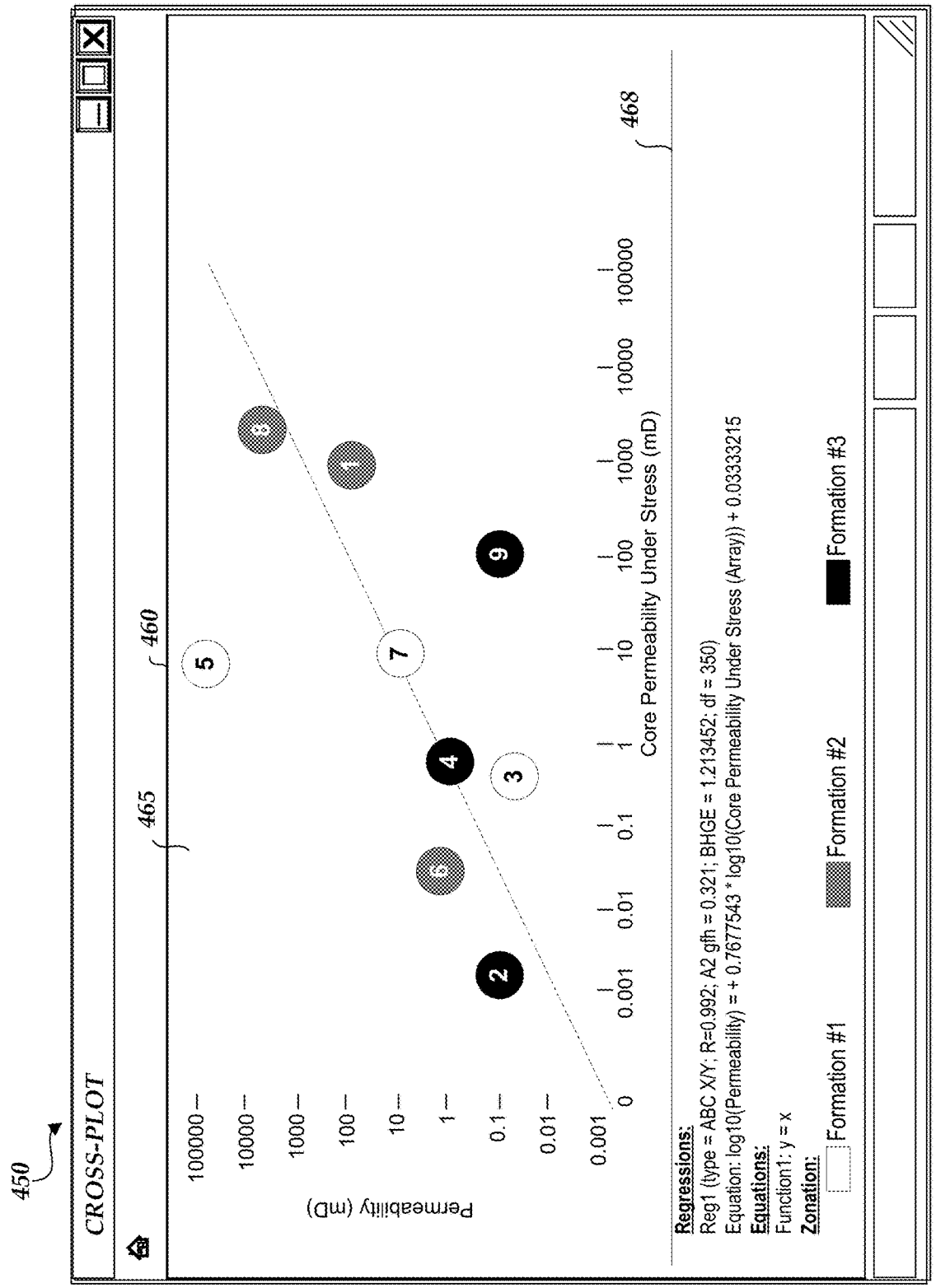
FIG. 4B illustrates another user interface that displays a cross-plot graph of parameters associated with the selected plurality of physical structures.

FIG. 4B illustrates another user interface 450 that displays a cross-plot graph 465 of parameters associated with the selected plurality of structures. For example, the user, using the user interface 400, may select two parameters: "permeability" and "core permeability under stress." Based on the selection of the parameters and the icons representing the structures, the user interface 450 may be displayed that includes a window 460 that includes the cross-plot graph 465 and a box 468 that includes information related to the data in the cross-plot graph 465.

The cross-plot graph 465 may plot the two selected parameters against each other for each selected structure. For example, as illustrated in FIG. 4B, the cross-plot graph 465 plots "permeability" versus "core permeability under stress" for nine structures #1 through #9. For simplicity, only nine structures are depicted. However, the cross-plot graph 465 may plot the parameters for each structure selected in the user interface 400.

In some embodiments, the selected parameters apply to a portion of an structure. For example, the selected parameters may apply to a specific geological layer. Alternatively, the user may actively limit the selected parameters to apply to only a portion of an structure. The icons associated with the structures in the cross-plot graph 465 may be color shaded or otherwise graphically differentiated to indicate the geological layer to which the selected parameters correspond.

The box 468 may display regressions and/or equations used to plot the data in the cross-plot graph 465. The box 468 may further include a legend that identifies the geological layer that corresponds with each color shade (or other graphical differentiation).

Figure 5A:
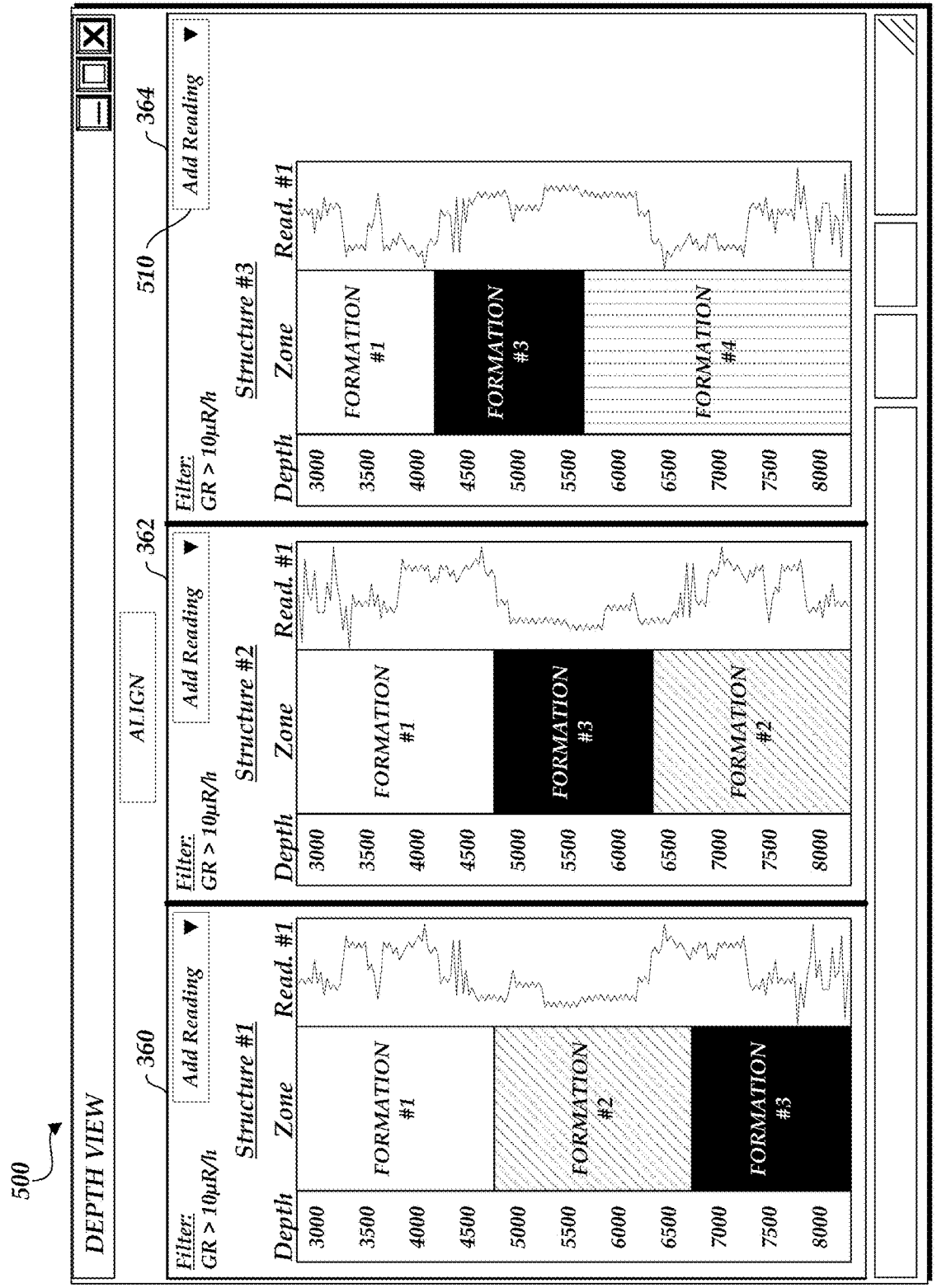
FIGS. 5A-5D illustrate another user interface that displays the addition of a sensor reading to the depth graphs for a plurality of physical structures.

FIGS. 5A-5D illustrate another user interface 500 that displays the addition of a sensor reading to the depth graphs for a plurality of structures. As illustrated in FIG. 5A, in the depth view depicted in the user interface 500, the user may choose to add one or more additional sensor readings for any of the structures identified in the windows 360, 362, and/or 364. For example, the user may select drop-down box 510 to add a new reading to be displayed in association with the structure #3.

Figure 5B:
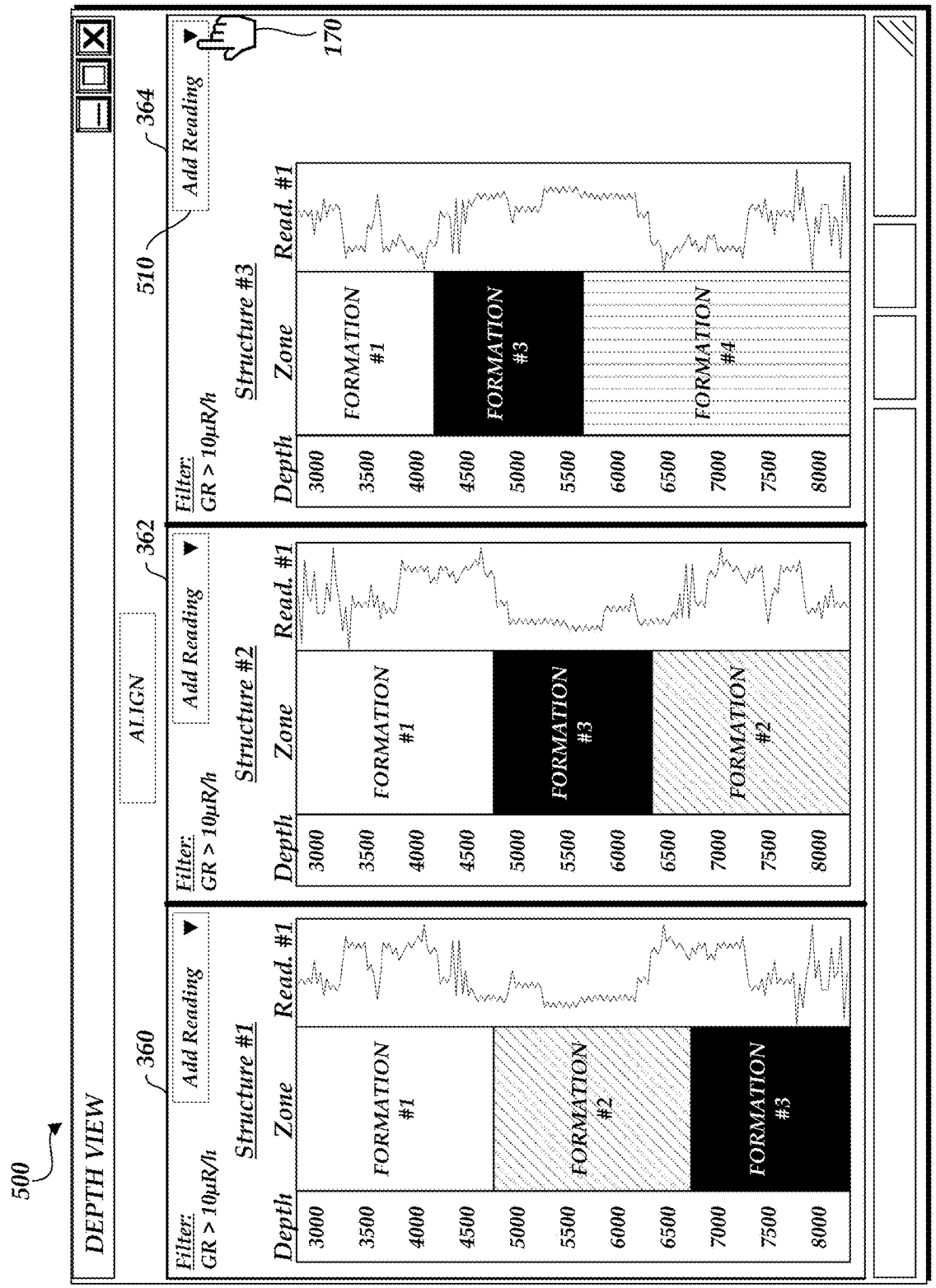
Figure 5C:
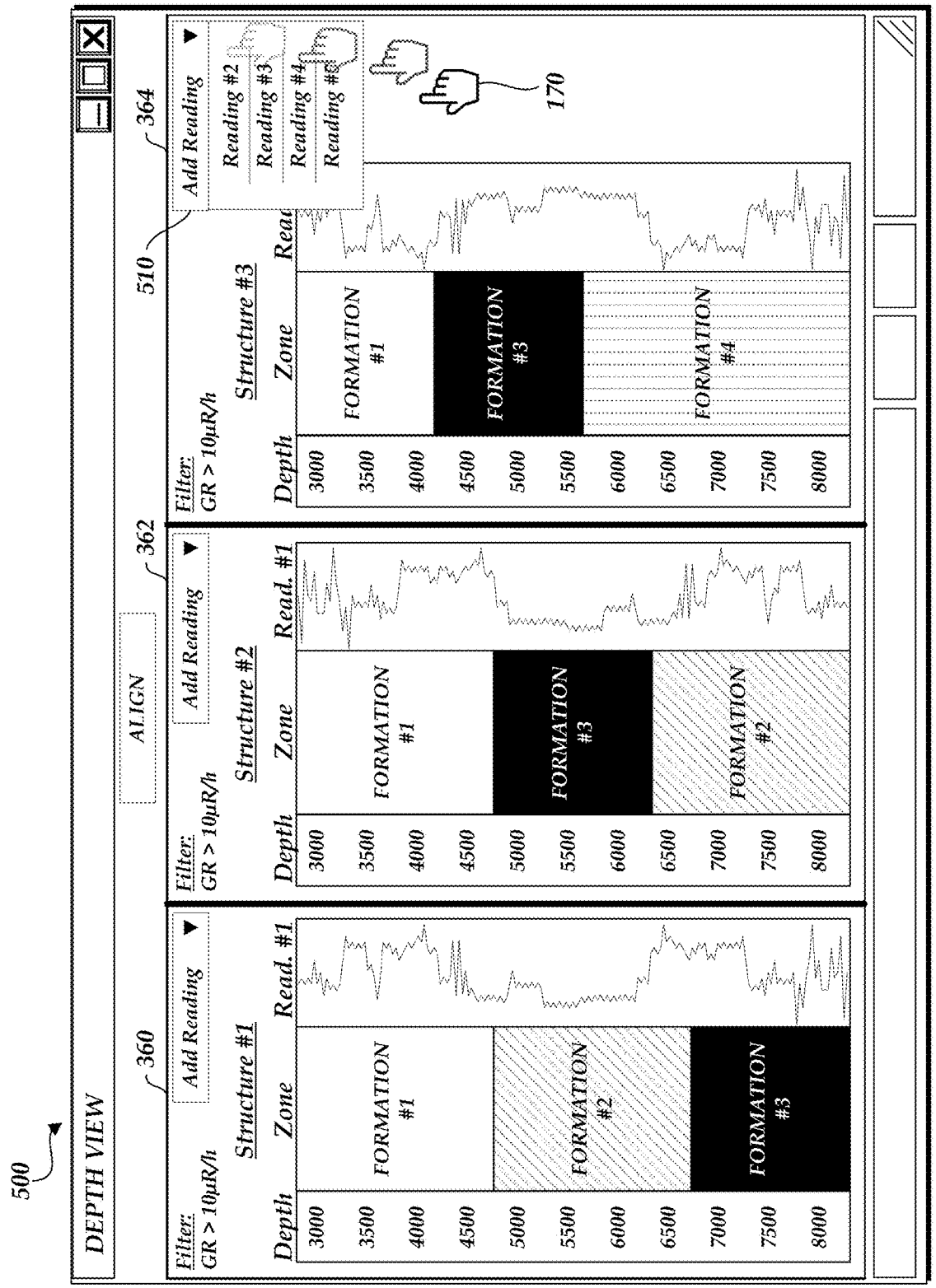

As illustrated in FIG. 5B, the user selects the drop-down box 510 using the cursor 170. In response to selection of the drop-down box 510, the user interface 500 may display a list of available sensor readings associated with the structure #3 (e.g., sensor readings that have been captured by one or more sensors associated with or within the structure #3), as illustrated in FIG. 5C. In an embodiment, to display an additional sensor reading, the user can select and hold a desired sensor reading identifier and drag the identifier to a location within the window 364 and release. Alternatively, not shown, the user may merely click or otherwise select the desired sensor reading identifier and the sensor measurements may be automatically displayed within the window 364.

Figure 5D:
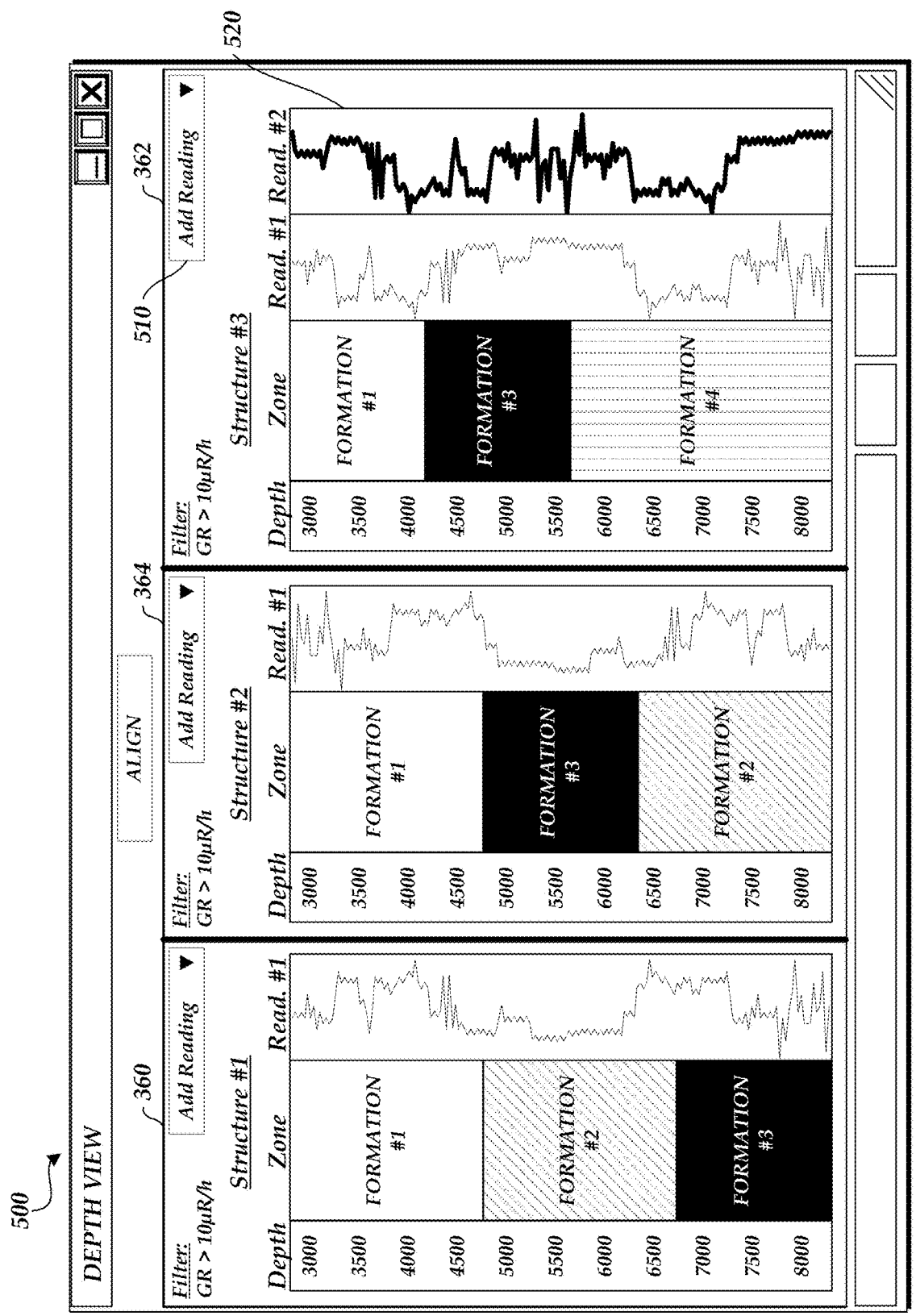

Once the desired sensor reading is selected, the sensor measurements may be displayed within a graph 520 in the window 364 as illustrated in FIG. 5D. In this way, the user interface 500 may allow the user to compare data from two or more sensors (or different sensor readings derived from the same sensor) within the same structure.

Figure 6A:
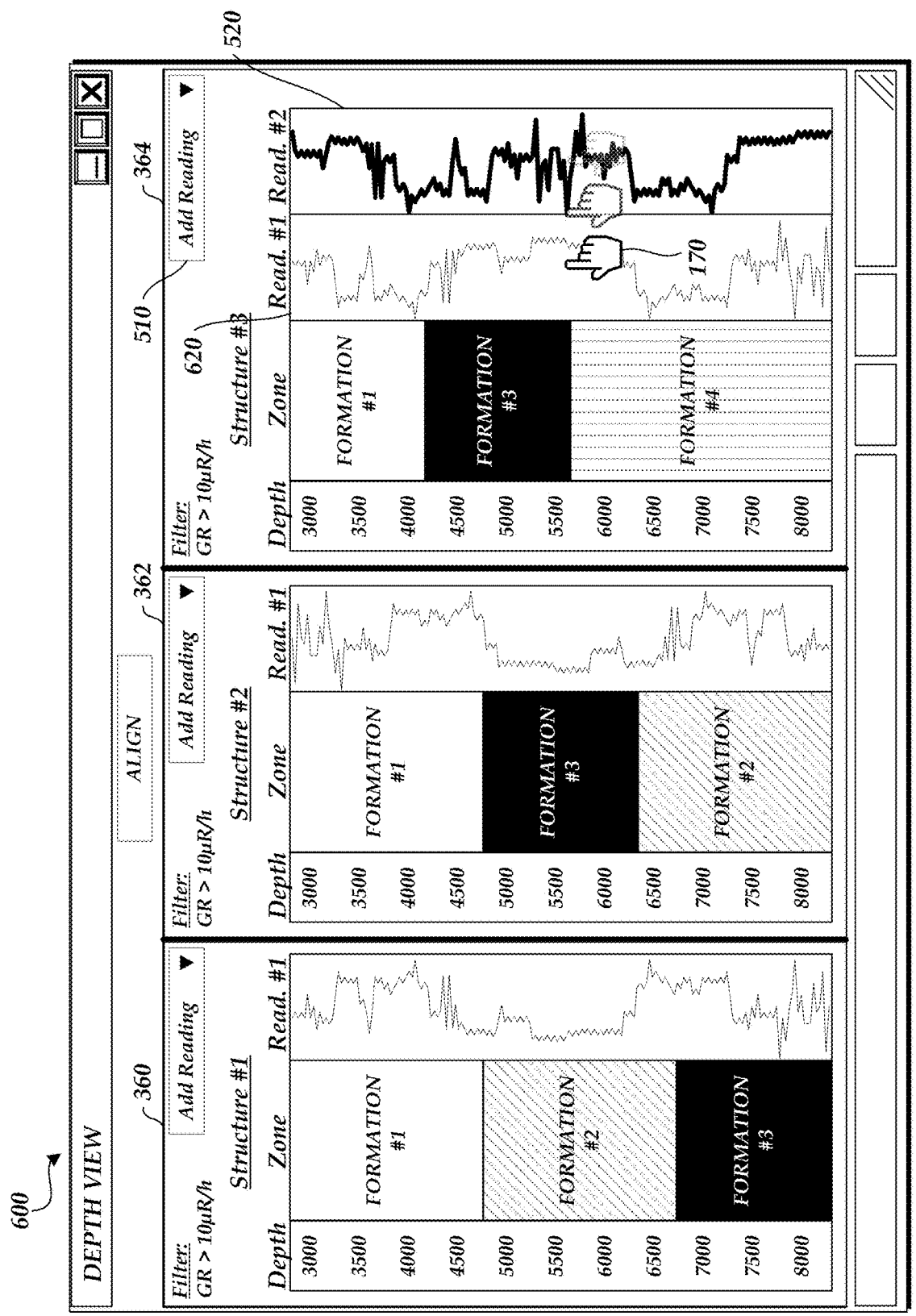
FIGS. 6A-6B illustrate another user interface that displays the overlay of one sensor reading onto another sensor reading in the depth graphs for a plurality of physical structures.
Figure 6B:
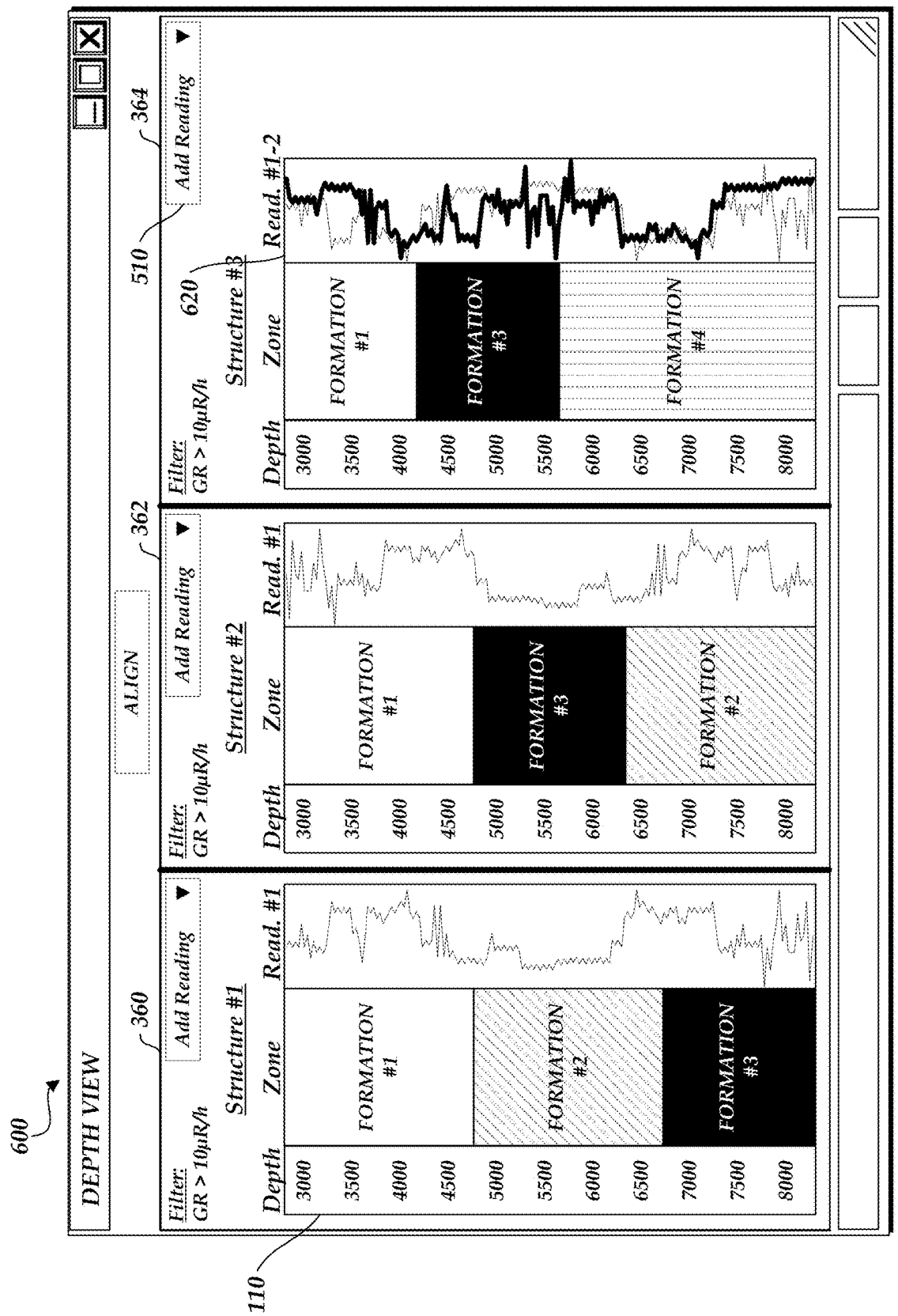

FIGS. 6A-6B illustrate another user interface 600 that displays the overlay of one sensor reading onto another sensor reading in the depth graphs for a plurality of structures. As illustrated in FIG. 6A, using the cursor 170, the user can select the graph 520. By selecting and holding, the graph 520 may be dragged within the window 364. For example, the graph 520 can be dragged over graph 620 by moving the cursor 170 over the graph 620.

As illustrated in FIG. 6B, if the cursor 170 is released while the graph 520 overlays the graph 620, then the sensor data plotted in the graph 520 may be plotted in the graph 620 in conjunction with the sensor data already plotted in the graph 620. Thus, the graph 620 may include two different sensor readings.

Figure 7A:
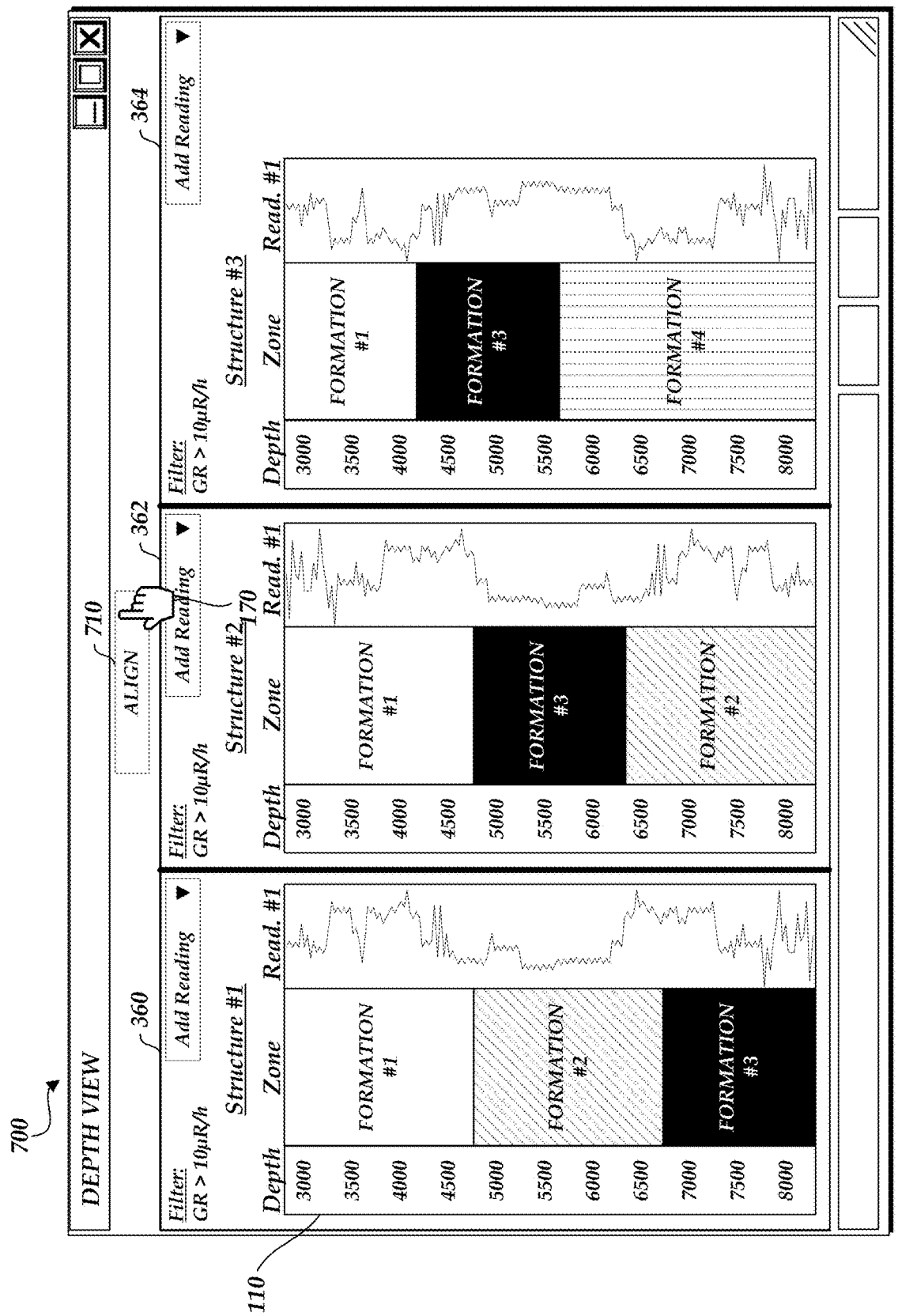
FIGS. 7A-7C illustrate another user interface that displays the alignment of depth graphs.
Figure 7B:
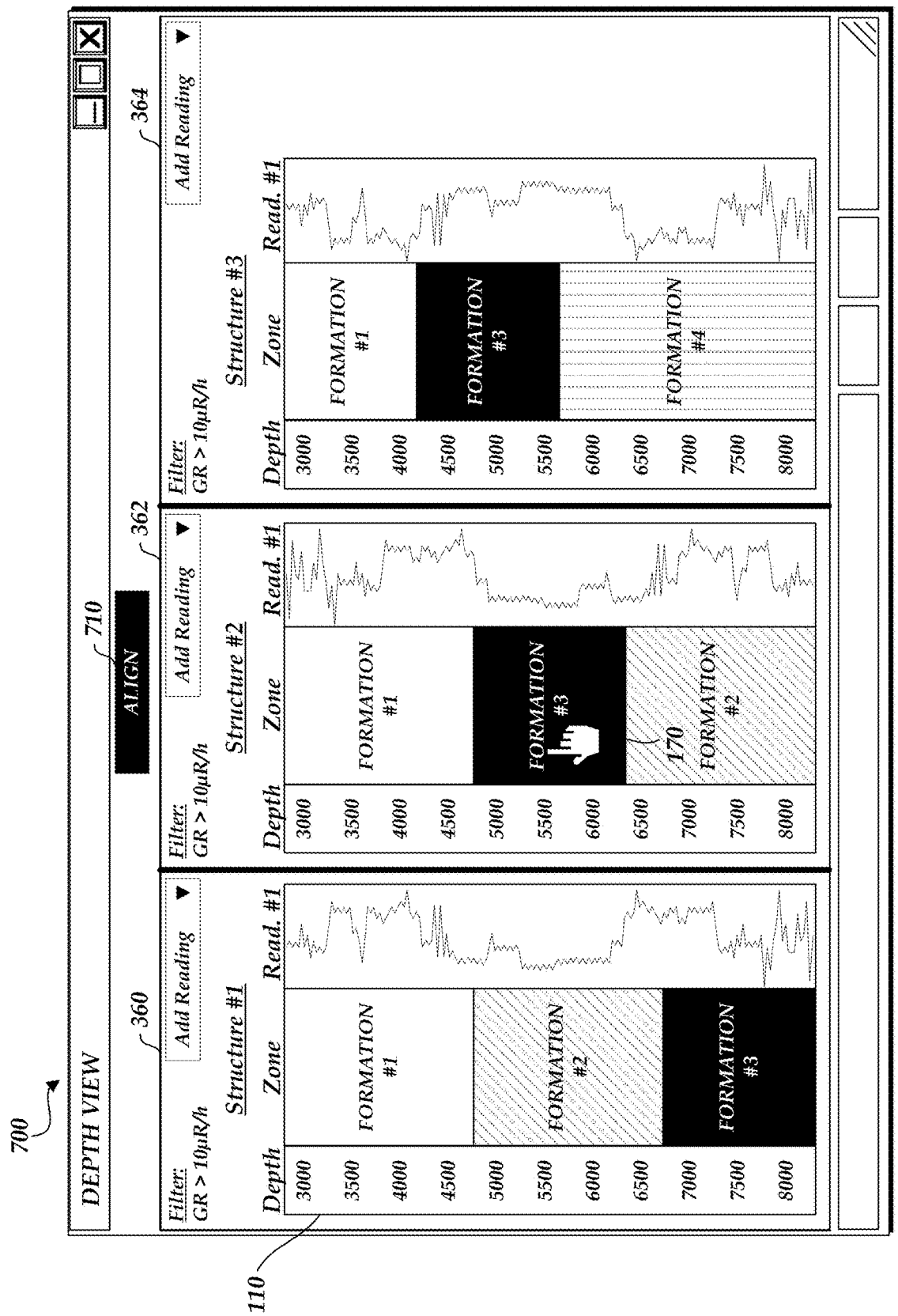
Figure 7C:
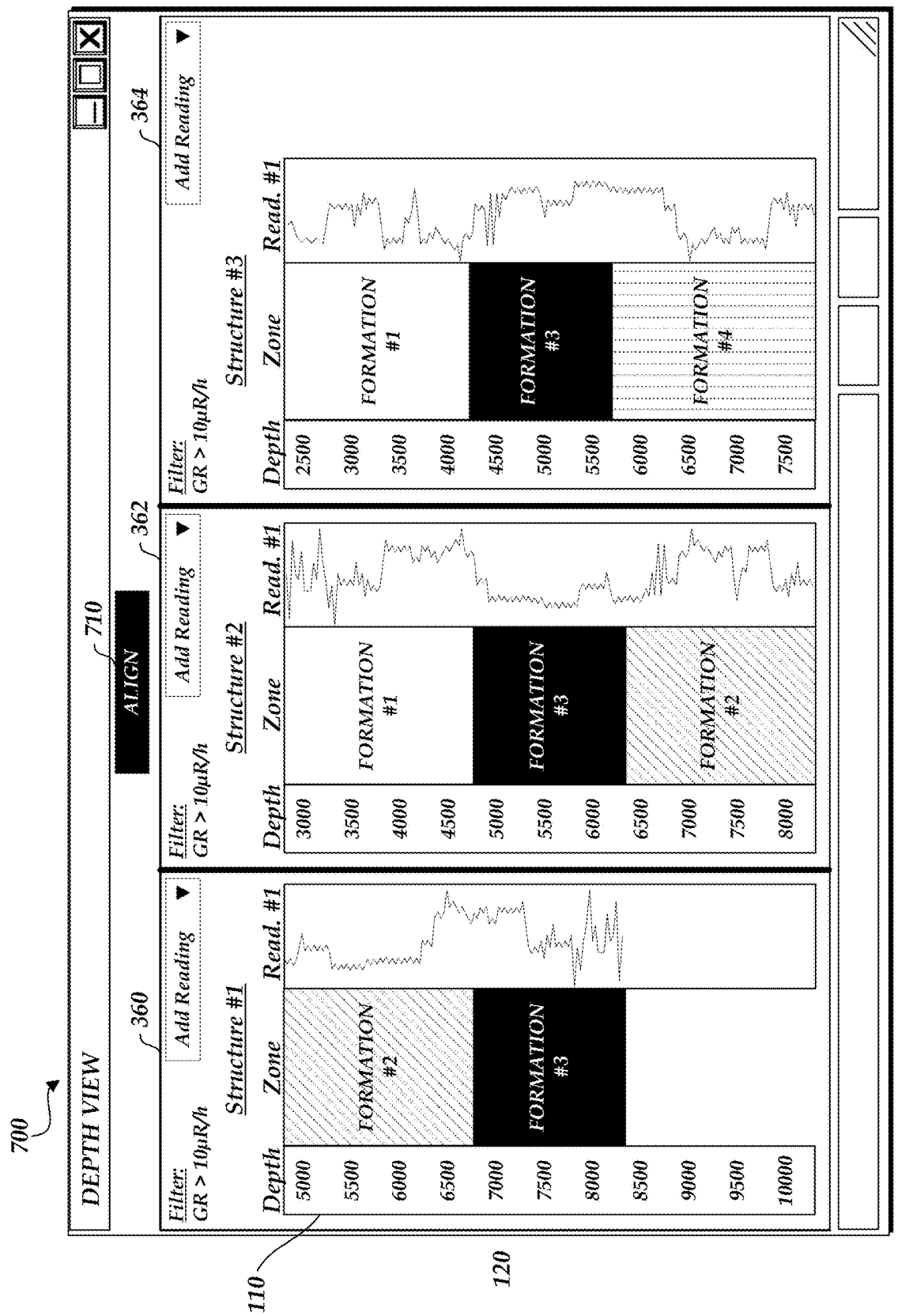

FIGS. 7A-7C illustrate another user interface 700 that displays the alignment of depth graphs. As illustrated in FIG. 7A, the user interface 700 may include an align button 710. Selection of the align button 710 using the cursor 170 may allow the user to align a selected geological layer in the same horizontal plane across one or more of the windows 360, 362, and/or 364.

For example, after the align button 710 is selected using the cursor 170, the geological layer "formation #3" may be selected using the cursor 170, as illustrated in FIG. 7B. Selection of the geological layer "formation #3" may cause the user interface 700 to align the geological layer "formation #3" in the windows 360, 362, and 364. The sensor readings and the depth level indications in each window 360, 362, and 364 may be adjusted accordingly. If an structure associated with a displayed window is not associated with the selected geological layer, the window associated with the structure may be removed from the user interface 700. In alternate embodiments, not shown, a geological layer may be aligned across the windows 360, 362, and 364 by double-clicking a desired geological layer.

The data used to populate the user interfaces depicted in FIGS. 1A through 7C may be retrieved from one or more databases that each receive data from one or more sources (e.g., sensors, structures, etc.). The one or more databases may be located locally and/or externally to the computing system (e.g., the computing system 1700) that generates the user interface.

In further embodiments, not shown, the user may select a button or link in the geographic map and/or the depth view that causes the generation of a report (e.g., in a PDF format) that provides information on a selected structure. Such information may include the displayed sensor readings, depths levels of the structure, geological layers within or surrounding the structure, one or more other attributes relating to the structure (e.g., physical attributes, production attributes, etc.), historical information regarding these attributes, and/or the like.

In further embodiments, the user may include annotations in the windows 360, 362, and/or 364. For example, an annotation may include text that is associated with the structure (e.g., for an oil well structure, that there is a drilling inconsistency at a certain depth level) associated with the window in which the annotation is placed. The annotation may be specific to a sensor reading, depth level, and/or geological layer. The annotation may be stored in a database such that the annotation is displayed each time the structure is selected in the future.

Overview: Document Search

As described above, a shape or formation, such as a three-dimensional shape or formation, may be rendered and displayed in a user interface based on data present in a plurality of files with different file extensions. One or more of the files in the plurality may include text; however, such text may not be searchable using standard operating system file system search applications. For example, the files may not be searchable because they are in a non-standard and/or proprietary format. The files may also be stored in different databases that are coupled to the same network or share drive. Thus, it may be difficult to identify a desired shape or formation without accessing the databases and individually opening each stored file.

Accordingly, disclosed herein are various systems and methods for accessing one or more databases in substantially real-time in response to input from a user provided in an interactive user interface in order to display a preview of a shape in the interactive user interface. For example, the user can enter a search term. One or more databases may be parsed to identify one or more files that match or closely match the search term. Once a file is identified, the one or more databases may be parsed again to identify one or more files that share the same name as the identified file, but that may have different file extensions. The identified files may be processed to generate a preview of a shape or other .formation and the interactive user interface may display the preview. The user interface may be interactive in that the user can manipulate the preview (e.g., by rotating the shape or other formation), select to download the files used to generate the preview, and/or select to view the shape or formation within a geographic map.

The systems and methods described herein may provide several benefits. For example, the systems and methods described herein may improve the user experience by allowing the user to identify a desired shape or formation without having to open specific files until the shape or formation is located. As another example, the systems and methods described herein may reduce the processor load because the user may not be continuously requested and opening complex data files during the search for the desired shape or formation.

Example Process Flow and Search for a Shape in an Interactive User Interface

Figure 8A:
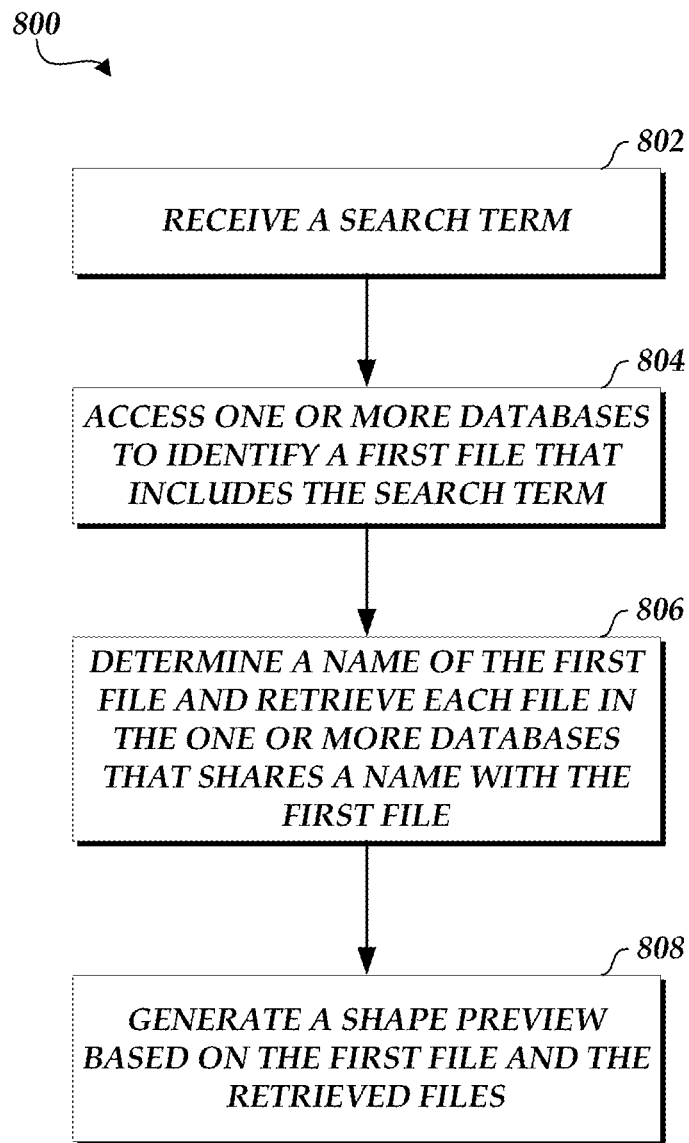
FIG. 8A is a flowchart depicting an illustrative operation of accessing one or more databases in substantially real-time in response to input from a user provided in an interactive user interface in order to display a preview of a shape in the interactive user interface.
Figure 8B:
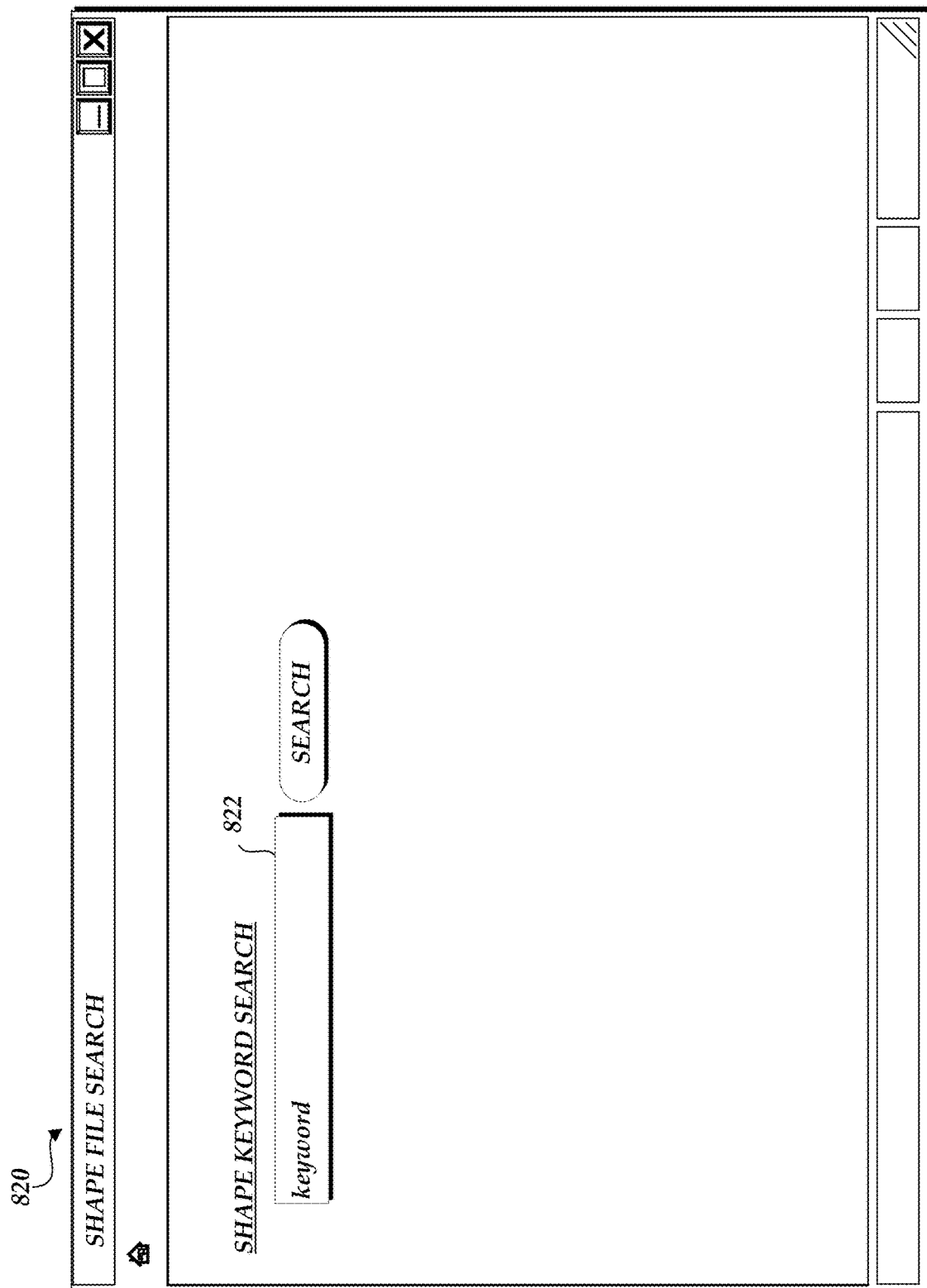
FIGS. 8B-8C illustrate another user interface that displays a preview of a shape.

FIG. 8A is a flowchart 800 depicting an illustrative operation of accessing one or more databases in substantially real-time in response to input from a user provided in an interactive user interface in order to display a preview of a shape in the interactive user interface. The preview may be of a shape or formation, such as a geological layer, a structure such as a mine or an oil well, and/or any other physical or imaginary structure or shape that can be represented geometrically. Depending on the embodiment, the method of FIG. 8A may be performed by various computing devices, such as by the computing system 1700 described below. Depending on the embodiment, the method of FIG. 8A may include fewer and/or additional blocks and the blocks may be performed in an order different than illustrated.

In block 802, a search term is received. For example, as illustrated in user interface 820 of FIG. 8B, a user can enter a search term in field 822. As an example, the user may enter the search term "keyword."

In block 804, one or more databases are accessed to identify a first file that includes the search term. For example, the payload or metadata associated with files of a certain file extension (e.g., .dbf) may be searched in the one or more databases to identify one or more files that include the search term somewhere in the file data.

In block 806, a name of the located file is determined and each file in the one or more databases that shares that name (or at least a relevant portion of the name) with the first file is retrieved. For example, files with different file extensions may otherwise share the same file name. Files with the same file name may include data that can be used to generate a shape or formation. In some embodiments, 5 files with different file extensions share the same name.

Figure 8C:
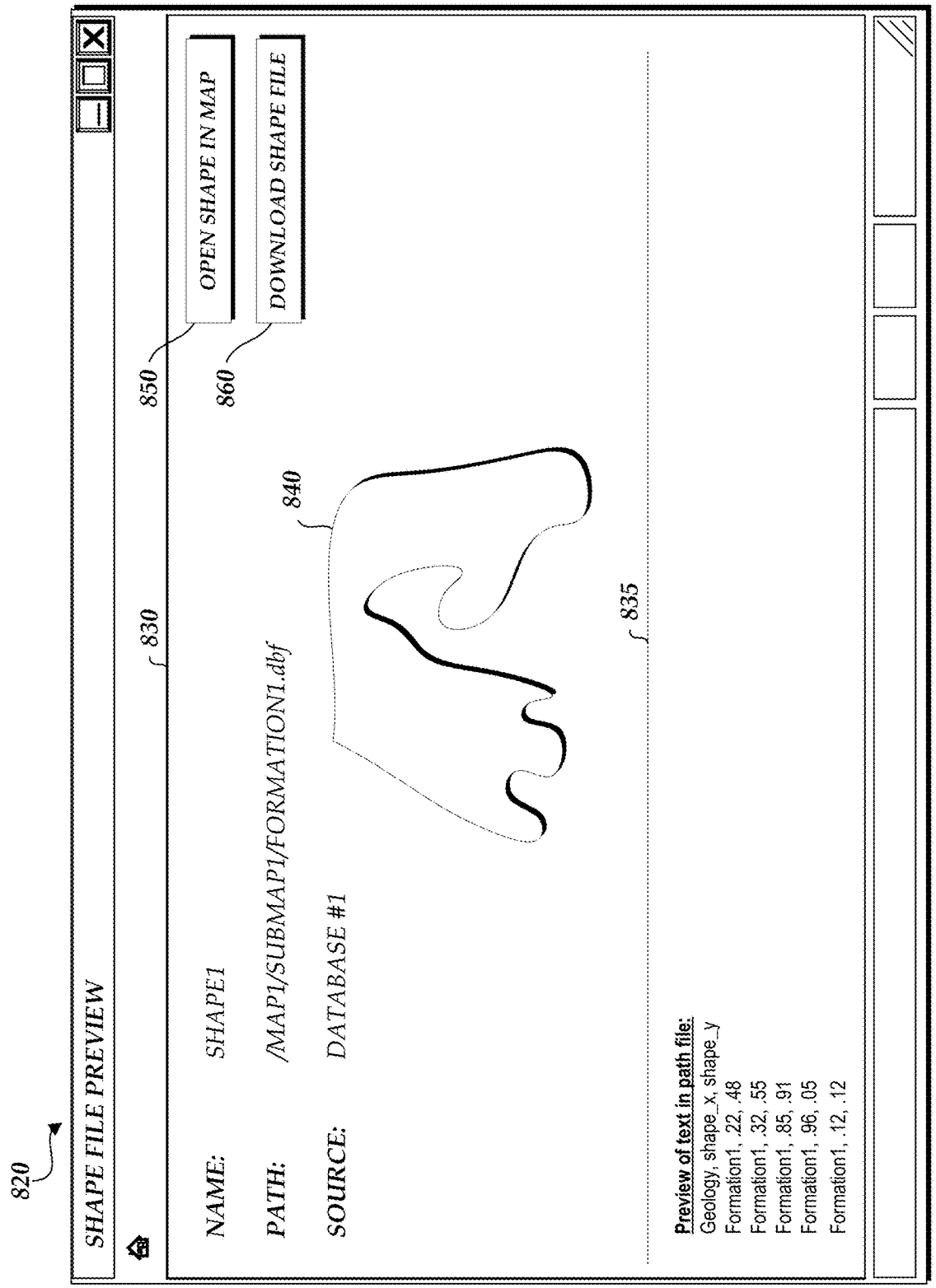

In block 808, a shape preview is generated based on the first file and the retrieved files. For example, a shape preview 840 may be displayed in a window 830 within the user interface 820, as illustrated in FIG. 8C. The user interface 820 may further include a box 835 that previews the text present in the first file (e.g., the file with the .dbf file extension) and/or in the retrieved files (e.g., the other 4 files that share the same name as the first file).

The window 830 may further include information about the shape, such as the name, path, source, etc., and two buttons: an open shape button 850 and a download shape button 860. The open shape button 850 may, when selected by a user using the cursor 170, may open the shape corresponding to the shape preview 840 in a geographic map or other similar graph. The download shape button 860 may, when selected by a user using the cursor 170, zip or otherwise aggregate the first file and the retrieved files (e.g., into a folder) and transmit the zipped or aggregated files to the user's computing device.

Cross Section Paths

It is often desirable to be able to effectively analyze how different values may vary across different locations. For example, it can be useful to view the values of particular attributes along one or more paths, in order to analyze how the attribute value changes over different locations, and to predict attribute values at particular locations. For example, due to the expense of drilling new mines or oil wells, deciding where to drill a new mine or well can be a very important decision. In order to make informed decisions regarding how and where to drill, it is often important to effectively analyze the cross-section composition indicating depth levels of various geological layers or zones at or around potential well locations. For example, it may be beneficial to view cross-section information along one or more paths, in order to analyze the cross-section composition changes over different locations. Although the techniques disclosed herein are described using particular contexts, such as mining or drilling oil wells, it is understood that they may also be applied to other applications, such as geological surveys, market analysis, and/or any application involving data associated with geographic locations. In addition, while the present specification may refer to cross-section information, it is understood that the techniques discloses herein may be applied to other types of attributes having values that vary by location (e.g., precipitation levels, population density, and/or the like).

Figure 9A:
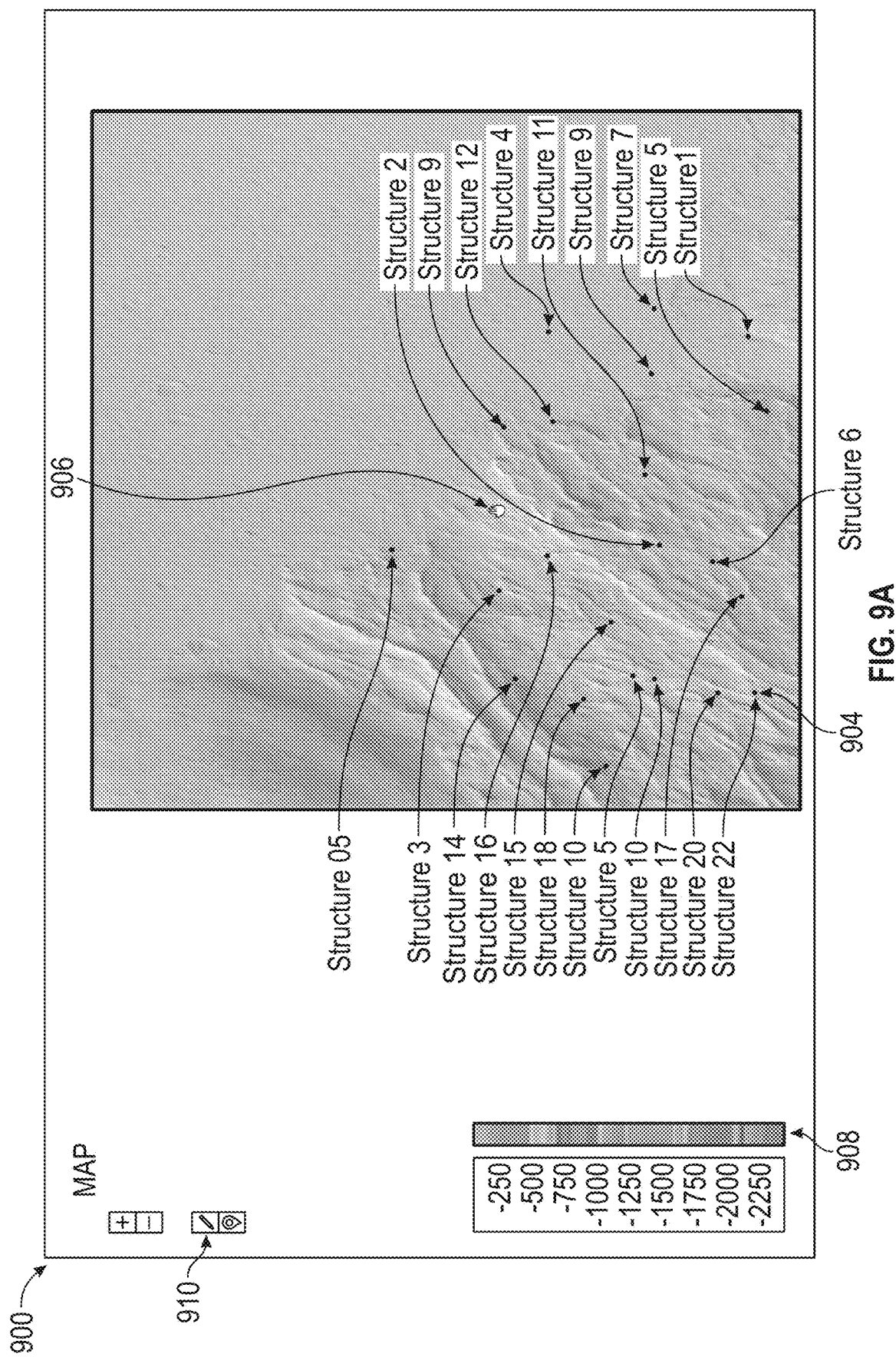
FIGS. 9A-9C illustrate a user interface that displays cross-section information corresponding to selected paths on a map, in accordance with some embodiments.
Figure 9B:
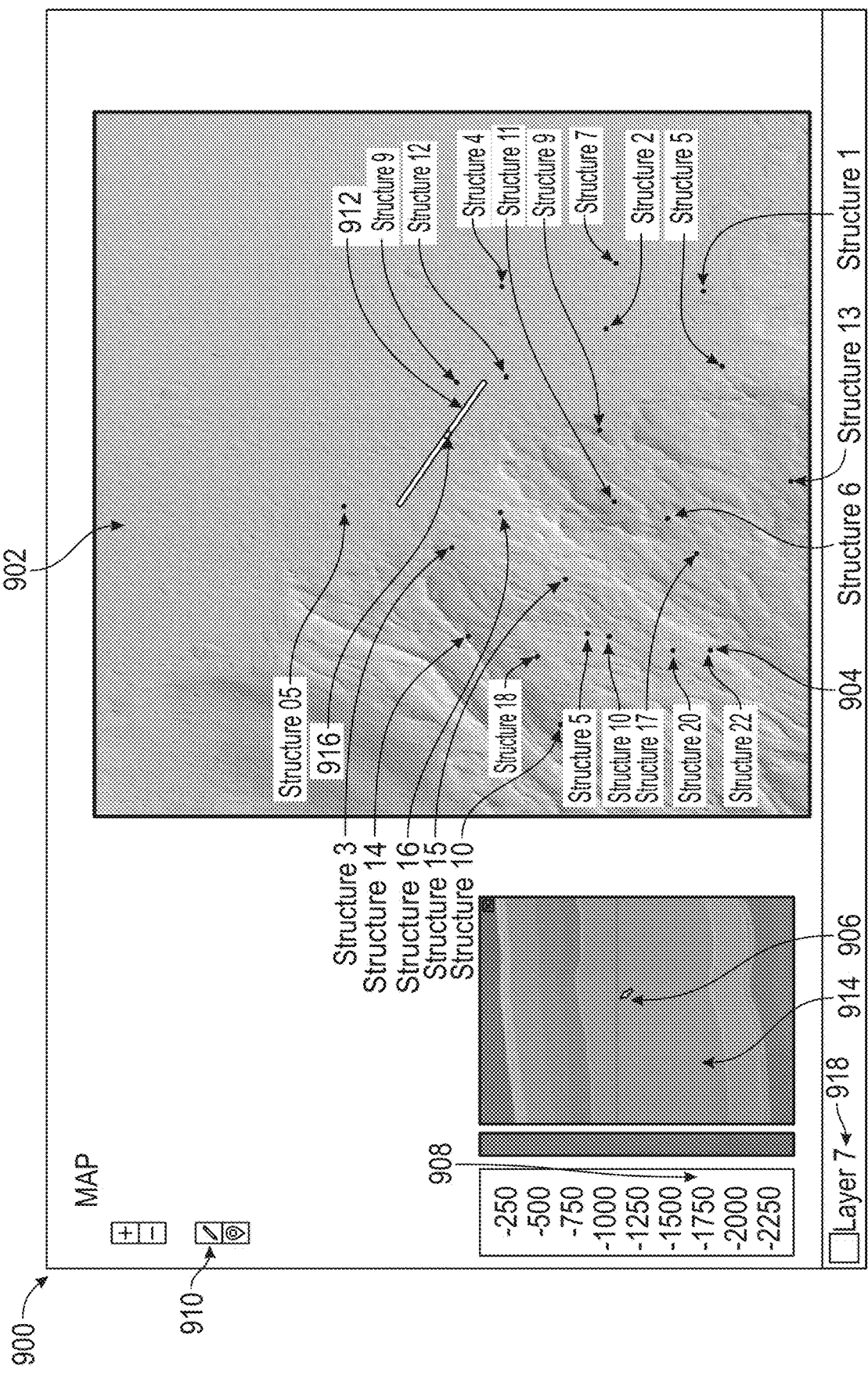
Figure 9C:
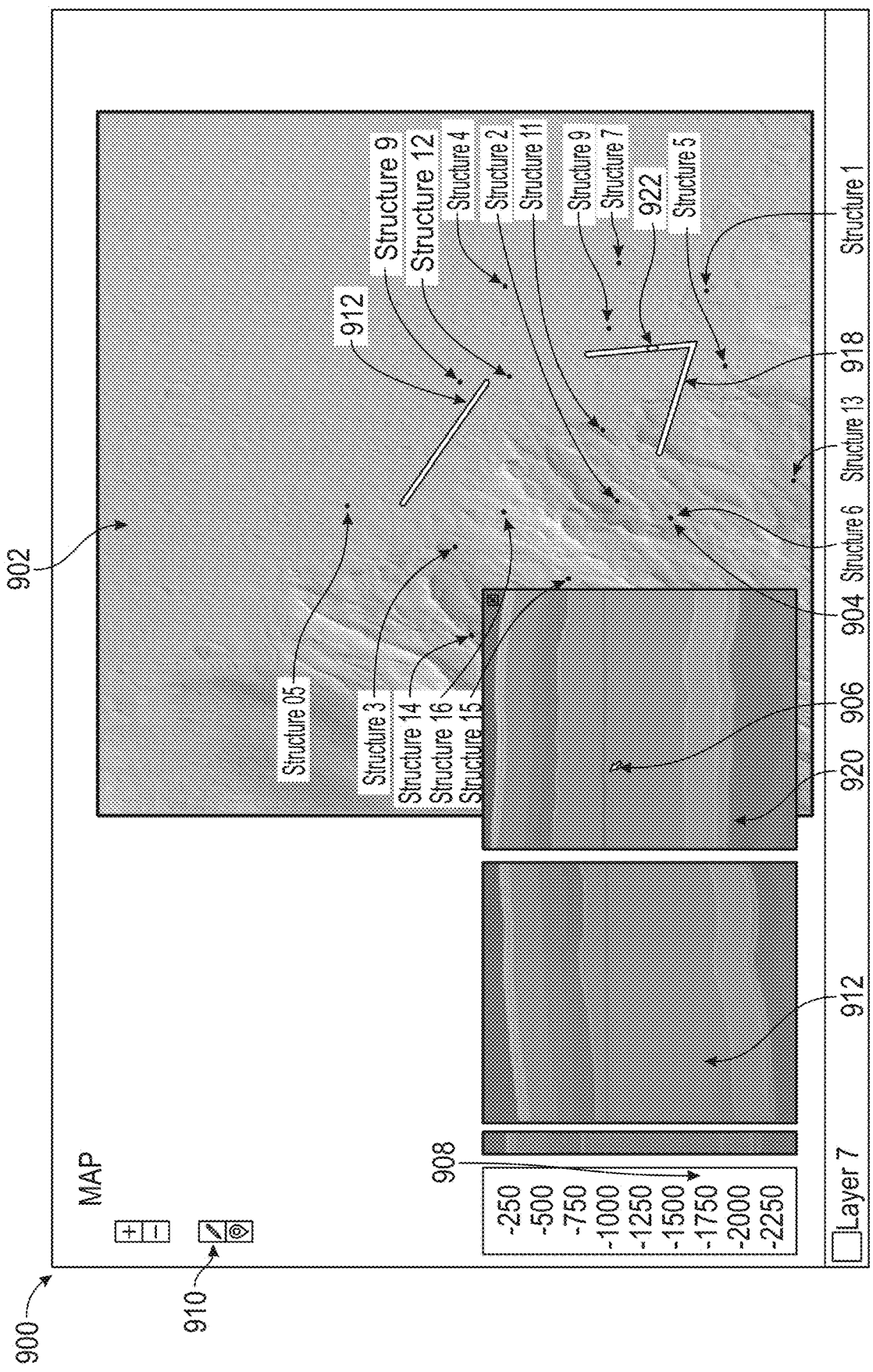

FIGS. 9A-9C illustrate a user interface 900 that displays a location of various structures (e.g. oil wells, mines, or any other types of physical structures) in a geographic area, in accordance with some embodiments. As illustrated in FIG. 9A, user interface 900 includes a geographic map 902 with icons or markers 904 that represent the locations of objects. Attributes or properties to be analyzed, such as the depth levels of various geological layers or zones (hereinafter also referred to as "cross-section layer data"), may vary depending upon a location on map 902. In some embodiments, a three-dimensional layer model (also referred to as a "layer cake model" or a "layer model") may be used to model the cross-section layer data associated with the geographic region corresponding to map 902. The layer model may be based upon seismic surveys, drilling data, such as from existing wells, satellite imagery, data from other types of sensors, prediction models, and/or the like. When a user places a cursor 906 over a portion of map 902, a cross-section 908 may be displayed illustrating the various geological layers present at the location of the map indicated by cursor 906. In some embodiments, as the user moves cursor 906 over different parts of map 902, cross-section 908 may be updated to reflect the layers at the current location of cursor 906. In some embodiments, cross-section 908 may be updated in response to a detected movement of cursor 906, while in other embodiments, cross-section 908 may be updated only when the user clicks on cursor 906 to specify a location on map 902.

In some applications, it may not be sufficient to view the layer cross-section at single points on the map. Instead, it may be desirable to be able to view cross-section information along a line or path (e.g., to be able view how the thicknesses and/or depths of the layers vary by location). FIG. 9B illustrates user interface 900 being used to view and analyze layer information along a path, in accordance with some embodiments. For example, as illustrated in the figure, a user may draw a path 912 on map 902, indicating a path along which the user wishes to view cross-section layer data. In some embodiments, in order to draw path 912, the user first activates a pen tool (e.g., by clicking on a pen tool button 910 or other interface element) before drawing the path 912 on map 902. For example, the user may click on a first location on map 902 to designate a first endpoint, and then a second location on map 902 to designate a second endpoint, wherein path 912 comprises a line between the first and second endpoints.

Once path 912 has been defined, a cross-section panel 914 is displayed showing cross-section layer data along path 912. In some embodiments, a width of cross-section panel 914 may be based upon a length of path 912, while in other embodiments, cross-section panel 914 may have a predetermined width.

When the user moves cursor 906 over cross-section panel 914, the position of cursor 906 relative to cross-section panel 914 (e.g., a horizontal position and/or a vertical position) may be noted. In some embodiments, in response to the user moving cursor 906 over cross-section panel 914, a marker 916 may be displayed on path 912 indicating a corresponding location on path 912, based upon a horizontal position of cursor 906 relative to cross-section panel 914. For example, the left side of cross-section 914 may correspond with the left side endpoint of path 912, while the right side of cross-section 914 may correspond with the right side endpoint of path 912. If cursor 906 is placed halfway between the left and right sides of cross-section panel 914, marker 916 may be displayed halfway along path 912 (e.g., in the middle of the line that makes up path 912). If the user moves cursor 906 to be 25% the width of cross-section panel 914 away from the left edge of cross-section panel 914, marker 916 may be moved to be 25% of the length of path 912 away from the left side endpoint of path 912. In some embodiments, the left edge of cross-section panel 914 may correspond with the first endpoint of path 912 defined by the user, while the right edge of cross-section panel 914 may correspond with the last endpoint of path 912 defined by the user.

In some embodiments, when the cursor 906 is placed over cross-section panel 914, a layer of the cross-section that the cursor 906 is placed over may be determined. In some embodiments, a layer panel 918 may be displayed, indicating to the user the current layer that cursor 906 is placed over. Layer panel 918 may contain an indication of a color associated with the layer by cross-section panel 914, layer name, and/or other layer data.

In some embodiments, a user may draw multiple paths on map 902 For example, FIG. 9C illustrates user interface 900 wherein the user has drawn multiple paths, in accordance with some embodiments. As illustrated in the figure, in addition to drawing a first path 912, the user has also drawn a second path 918. In some embodiments, a path may comprise more than one line. For example, second path 918 as illustrated in FIG. 9C comprises two lines connected in a "V" shape. In some embodiments, the user may select a plurality of endpoints on map 902 using a pen tool, wherein the path comprises one or more lines connecting the plurality of endpoints. In some embodiments, a path may comprise one or more curved lines.

In response to the user defining a second path 918, a second cross-section panel 920 may be displayed showing cross-section layer data along second path 918. In some embodiments, cross-section panel 920 is displayed as a two dimensional plane even when second path 918 comprises multiple lines and/or curved lines that are not on the same plane. In some embodiments, in response to cursor 906 being placed over second cross-section panel 920, marker 922 may be displayed along second path 918, indicating a location on second 918 corresponding to the relative horizontal position of cursor 906 over second cross-section panel 920. For example, if cursor 906 is located 30% the width of second cross-section panel 920 away from the left edge of second cross-section panel 920, marker 922 may be displayed to be 30% of the length of second path 918 away from a first endpoint (e.g., a left side endpoint) of second path 918.

Figure 10:
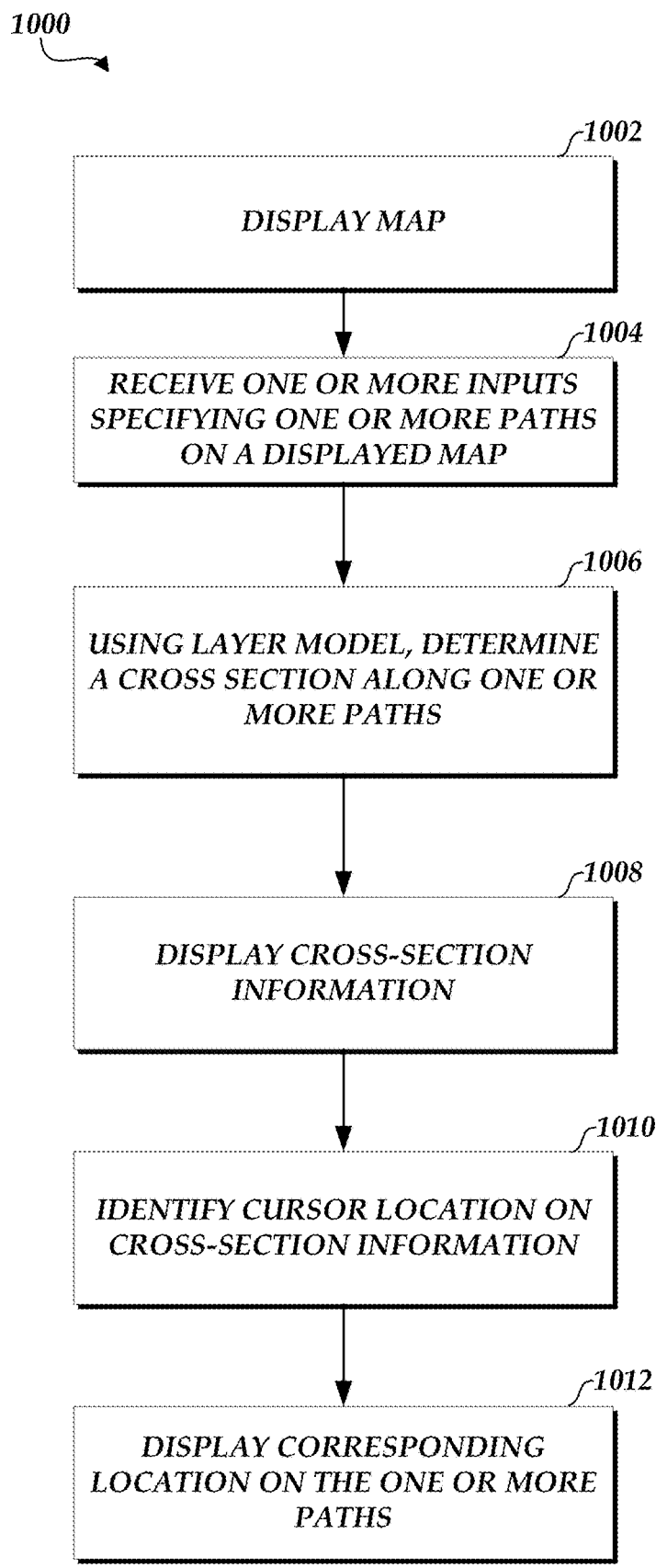
FIG. 10 illustrates a flowchart of a process for displaying cross-section layer data along paths, in accordance with some embodiments.

FIG. 10 is a flowchart of a process for displaying cross-section layer data along paths, in accordance with some embodiments. Depending on the embodiment, the method of FIG. 10 may be performed by various computing devices, such as by the computing system 1700 described below. At block 1002, a map is displayed to a user. The map may correspond to any geographic area that is of interest to the user. In some embodiments, objects having location information that are of interest to the user (such as oil wells) may be displayed on the map.

At block 1004, one or more inputs specifying one or more paths on the displayed map may be received. In some embodiments, the inputs may comprise two or more endpoint locations, wherein the specified path comprises one or more straight lines connecting the endpoints. In some embodiments, the inputs may comprise one or more drawn paths. A path may comprise a straight line, one or more connected straight lines, a curved line, and/or any combination thereof.

At block 1006, a layer model of the map may be accessed and used to determine cross-section layer data along the one or more paths. In some embodiments, the layer model may comprise a 3-D layer cake model that indicates depths for various geological layers or zones at various locations, and may be generated based upon seismic surveys, drilling data, satellite imaging data, data from other types of sensors, prediction models, and/or the like. In some embodiments, cross-section layer data is generated for each path specified by the one or more inputs.

At block 1008, the determined cross-section layer data may be displayed to the user. In some embodiments, the cross-section layer data may be displayed as a panel (e.g., cross-section panel 914 and/or 920, as illustrated in FIGS. 9B and 9C). In some embodiments, a separate cross-section panel may be displayed for each path. In some embodiments, the panel may comprise a two-dimensional plane, even if a path that the cross-section panel corresponds to comprises multiple lines or curved lines that are not all in the same plane.

At block 1010, a location of a cursor on the displayed cross-section layer data may be identified. For example, a user may move a cursor (e.g., a mouse pointer) over a displayed cross-section panel.

At block 1012, a location on the one or more paths corresponding to the identified cursor location may be displayed. For example, a marker may be displayed on a path corresponding to the cross-section panel that the cursor is currently over, wherein the location of the marker along the path corresponds to a horizontal position of the cursor relative to the cross-section panel.

Heatmaps

In some embodiments, heatmaps may be used to view properties or attributes across large areas of a displayed map, and to analyze the distribution of attribute values over a geographic area. In some embodiments, different attributes may be used to generate heatmaps. For example, in the context of geological layers, attributes for which it may be desirable to be able to generate heatmaps may include layer depth and layer thickness. In addition, other attributes, such as rock type, layer hardness, GIIP (gas initially in place) density, permeability, and/or the like, may also be used to generate heatmaps. In some embodiments, certain types of attributes may be associated with specific geographic points on the map instead of being modelled across the entire map. For example, a particular attribute may be measured at specific locations using one or more sensors, or may correspond to an operation performed at one or more specific locations (e.g., an ROP (rate of penetration) attribute may indicate a rate at which a drill bit was able to penetrate through a particular rock layer, as measured by actual drilling data at particular locations). These types of attributes may be referred to as "metrics." In some embodiments, different attributes may also be combined or aggregated. For example, a first attribute and a second attribute may be combined to form an aggregate attribute, and a heatmap created over the map based upon the aggregate attribute.

Figure 11A:
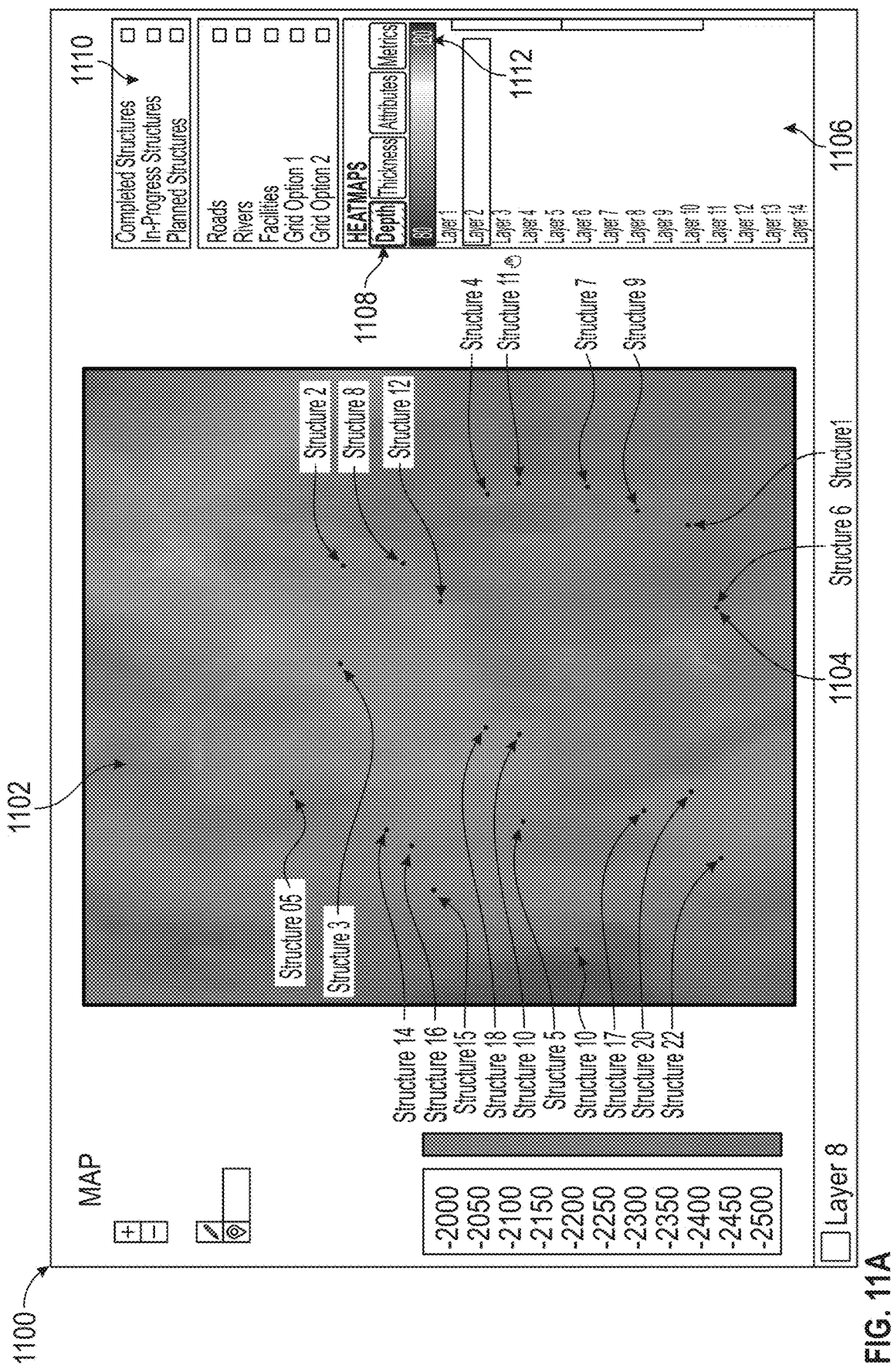
FIGS. 11A-11C illustrate a user interface that may be used to display heatmaps, in accordance with some embodiments.

FIG. 11A illustrates a user interface 1100 that may be used to display heatmaps, in accordance with some embodiments. User interface 1100 may comprise a map 1102, which may contain icons or markers 1104 corresponding to objects of interest (e.g. oil wells, mines, or other physical or geographical structures). In order to select an attribute for which to generate a heatmap, a user may first select a tab of a plurality of tabs 1108 corresponding to attribute categories. For example, available tabs 1108 include "Depth," "Thickness," "Attributes," and "Metrics," In the illustrated embodiment, the user has selected the "Depth" tab. Once an attribute category tab 1108 has been selected, a list 1106 or other type of user interface element may be displayed allowing the user to select a specific attribute to heatmap. For example, under the "Depth" tab, attributes may correspond to particular layers. For example, the user may select a layer from list 1106 to create a heatmap indicating the depth of that layer over the area of map 1102. In some embodiments, the layer depth attribute may correspond to an average depth of the layer, a top depth of the layer, or a bottom depth of the layer.

Once the user has selected a particular attribute, a heatmap corresponding to the selected attribute may be displayed on map 1102. In some embodiments, a three-dimensional layer model is used to determine the value of the selected attribute across the area of map 1102. In some embodiments, the heatmap may be divided into a plurality of sub-units. Each sub-unit may correspond to a pixel, a block, and/or any other type of subset of the heatmap. An attribute value (e.g., depth of the selected layer) may be calculated for each sub-unit of the heatmap, which may then be converted to a color value and displayed to the user.

In some embodiments, a heatmap bar 1112 may be displayed, which indicates to the user the range of depths that the colors of the heatmap signify. For example, in the illustrated embodiment, the minimum depth of the selected layer is 80 m (represented by a first color, such as blue), while the maximum depth is 120 m (represented by a second color, such as red). In some embodiments, the values shown in heatmap bar 1112 may change based upon the specific attribute (e.g., layer) that has been selected.

In some embodiments, additional layers or objects may be displayed on map 1102. A toolbar 1110 may be used to allow the user to select types of additional layers or objects to be displayed. For example, objects such as structures may be displayed on the map or removed from the map using toolbar 1102. In some embodiments, which objects are displayed on the map may be based upon an attribute of the objects, such as structure type, structure status (e.g., operational, non-operational, under construction, and/or the like), etc. In addition, additional layers (e.g., overlays) may be displayed on the map. These may include a road overlay, a rivers or terrain overlay, a facilities overlay, one or more grids, and/or the like.

Figure 11B:
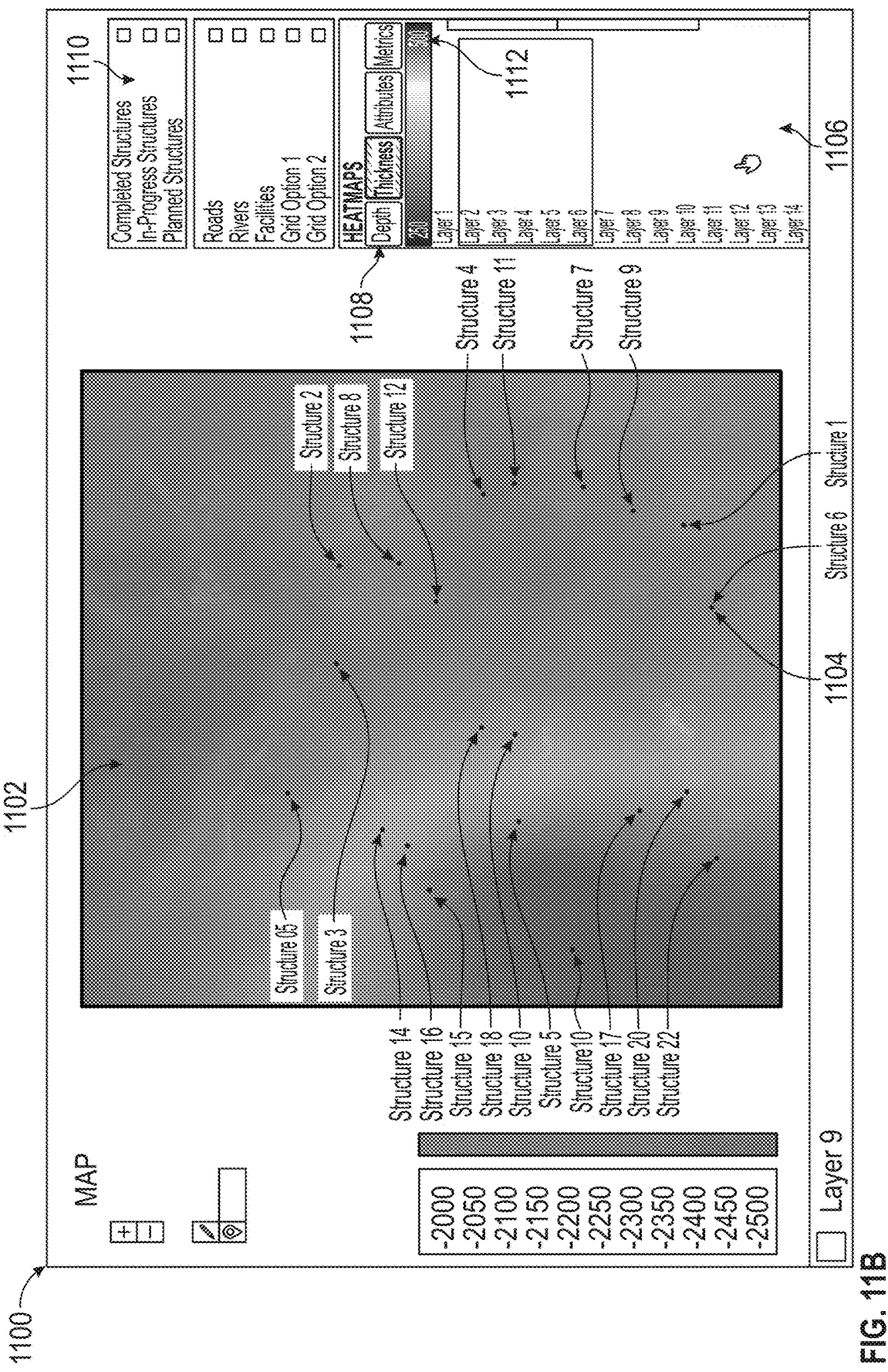

FIG. 11B illustrates the user interface 1100 used to display a heatmap based upon a "thickness" attribute, in accordance with some embodiments. In some embodiments, a user may select multiple attributes within a category when generating a heatmap. For example, the user may select a single layer from list 1106 to generate a heatmap indicating a thickness of the selected layer over the area of map 1102, or may select multiple layers to generate a heatmap that indicates a combined thickness of the selected layers. In some embodiments, restrictions may exist on how multiple attributes may be selected. For example, in some embodiments, with respect to the "thickness" attribute category, only adjacent layers may be selected, while in other embodiments, any layers may be selected.

Figure 11C:
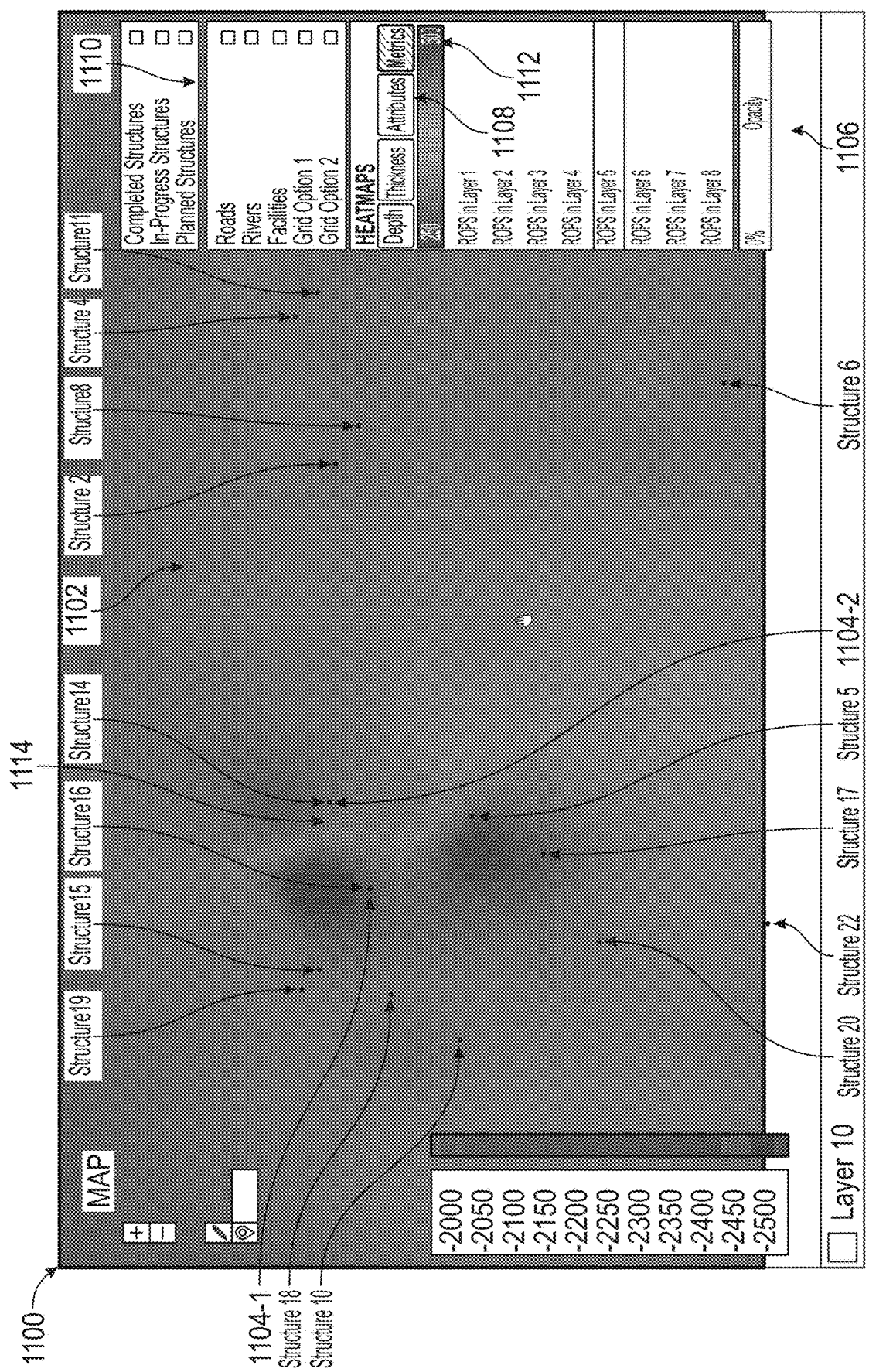

FIG. 11C illustrates user interface 1100 used to generate a heatmap based upon a selected metric, in accordance with some embodiments. As described above, metrics may refer to a type of attribute that are associated with specific geographic points on the map instead of being modeled across the entire map. These geographic points may correspond to objects on the map, such as physical structures (e.g., mines, wells, buildings, and/or the like). For example, in the illustrated embodiment, the user has selected a ROP metric for a specified layer. The ROP value for the layer is measured at specific points in the map (e.g., at specific structures where drilling has been performed in the layer), instead of across the entire map. As such, many locations in map 1102 will not be associated with a ROP value for the specified layer.

In some embodiments, in order to display the heatmap, the metric values are determined for the geographic points on the map for which they are available (e.g., at the locations of particular structures). The metric values may then be converted into color values at those locations and displayed to the user. In some embodiments, predicted attribute values may be calculated for areas of the map that do not correspond to a measured value (e.g., locations on the map that do not correspond to a specific structure). The predicted attribute values may then be converted into colors values at those locations of the map. In some embodiments, the predicted attribute values for a particular location may be based at least in part upon a distance from the location to one or more structures for which metric values are available. In addition, the predicted attribute values may also be based upon the metric values associated with the one or more structures. For example, a location that is close to a structure having a metric value represented by a color (e.g., blue) may be colored substantially the same color, while a location that is further away from the structure may be colored a lighter color due to the greater distance between it and the structure, forming a gradient of heatmap colors. In some embodiments, a steepness of the gradient may be based at least in part upon a metric value associated with one or more nearby structures. For example, the predicted color values near a location having a high metric value may fade at a slower rate with increasing distance, as compared to the predicted color value of locations near a location having a lower metric value.

For example, the heatmap illustrated in FIG. 11C comprises at least a first area of a first color around a first structure 1104-1, and a second area of a second color around a second structure 1104-2. Locations near first structure 1104-1 and second structure 1104-2 are displayed in substantially the same color as the respective structures, which may fade as the distance between the heatmap location and the structure increases. For a location 1114 between first structure 1104-1 and second structure 1104-2, the predicted attribute value may be an intermediate value between the attribute values for first structure 1104-1 and second structure 1104-2, and be based at least in part upon a distance between location 1114 and first structure 1104-1 and a distance between location 1114 and second structure 1104-2. As such, the heatmap color for location 1114 may comprise an intermediate color between the first color and second color, the gradient between the first and second color being indicated on heatmap bar 1112.

Figure 12:
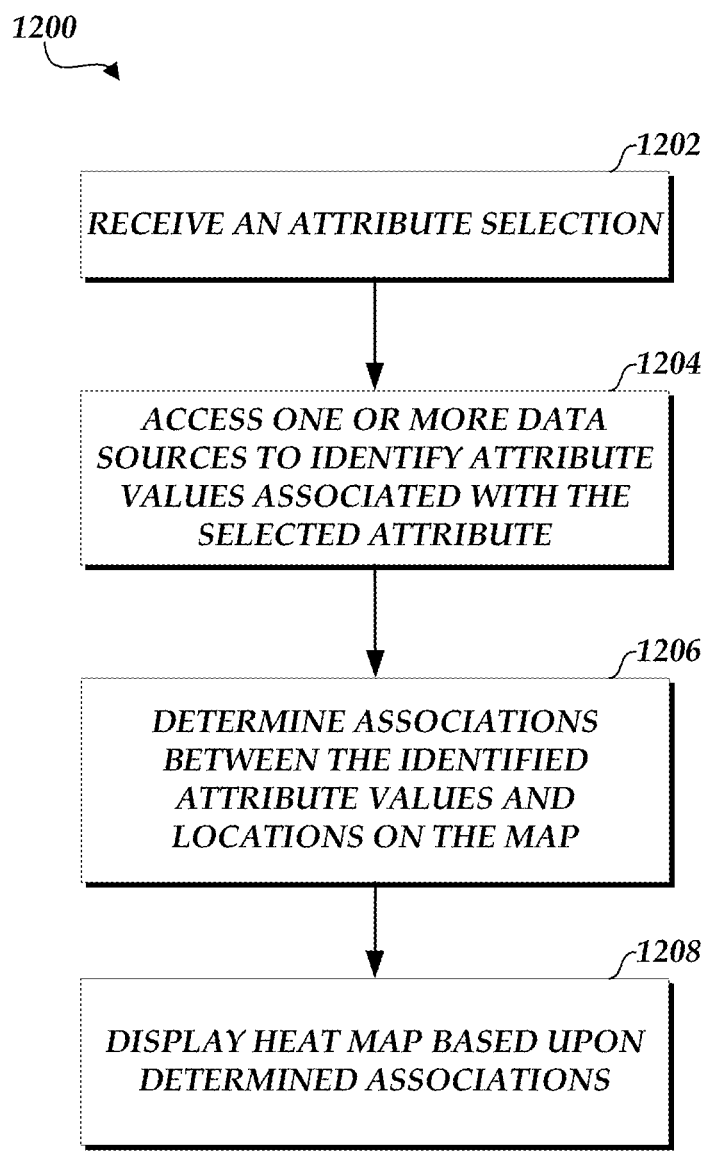
FIG. 12 illustrates a flowchart of a process for generating heatmaps, in accordance with some embodiments.

FIG. 12 illustrates a flowchart of a process for generating heatmaps, in accordance with some embodiments. Depending on the embodiment, the method of FIG. 12 may be performed by various computing devices, such as by the computing system 1700 described below. At block 1202, an attribute selection is received. In some embodiments, this may comprise a user selecting an attribute category, and then selecting an attribute within the selected category. In some embodiments, the selection may comprise multiple attributes that may be aggregated. For example, a user may select a plurality of adjacent layers in a "thickness" category, wherein the aggregate attribute may comprise a sum of the thicknesses of the selected layers. In some embodiments, a selected attribute may comprise a user-defined aggregation or combination of a plurality of other attributes.

At block 1204, one or more data sources may be accessed to identify attribute values that are associated with the selected attribute. For example, in some embodiments a three-dimensional layer model may be used to identify attribute values such as layer depth, layer thickness, and/or the like. In some embodiments, attribute data may be stored in one or more databases (e.g., a relational data store). In some embodiments, attribute data may be associated with particular objects that may be displayed on the map (e.g., oil wells, sensor stations, and/or the like).

At block 1206, associations between the identified attribute values and location on the displayed map are determined. In some embodiments, the associations may be determined using the three-dimensional layer model. In some embodiments, an attribute value may be associated with an object such structure having geographic location data. In some embodiments, the map is divided into a plurality of sub-units (e.g., pixels, blocks, grid spaces, and/or the like). Attribute values associated with each sub-unit of the map may be aggregated into an aggregate value and converted into a color value to be displayed. In some embodiments where attribute values (e.g., metric values) are associated with particular objects or locations on the map, color values for other locations on the map may be associated with a predicted attribute value based at least in part upon a distance between the location and map locations having attribute values.

At block 1208, a heatmap is displayed based upon the determined associations between the attribute values and the map locations.

Depth View Cross-Section

In some embodiments, cross-section paths may be used to analyze the cross-section composition of the terrain between existing well locations. For instance, as illustrated in FIGS. 7A-7C, depth information for a plurality of different structures may be displayed side by side for easy comparison. However, no information is provided regarding the cross-section layer data for locations between the different structures, or how the layers that make up the cross section may change with location between the structures. By using depth view cross-sections, information pertaining to the cross-section composition of geological layers at locations between existing structures locations may be obtained and viewed by the user.

Figure 13A:
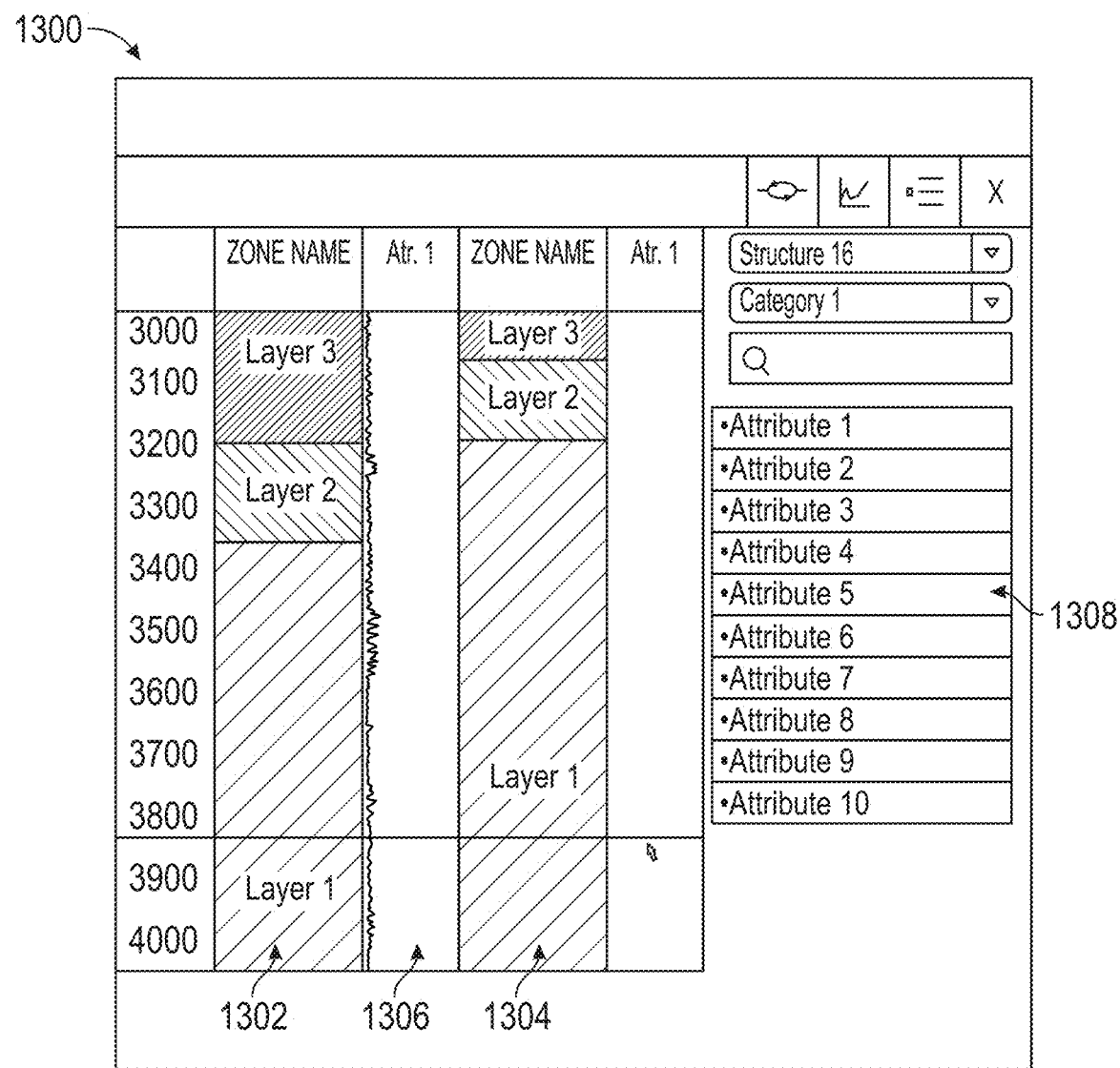
FIGS. 13A-13B illustrate a user interface for displaying depth information and depth view cross-section information, in accordance with some embodiments.

FIG. 13A illustrates a user interface 1300 for displaying well depth information, in accordance with some embodiments. Interface 1300 comprises a first depth graph 1302 corresponding to a first structure, and a second depth graph 1304 corresponding to a second structure. In some embodiments, graphs for additional attributes may also be displayed. For example, an attribute graph 1306 may be used to display values of a selected attribute corresponding to the first structure.

In addition, in some embodiments a user may be able to specify additional attributes for display. For example, a sidebar 1308 may be used to allow a user to select a particular structure (e.g., oil well or mine) for which the user wishes to view additional attributes. The user may then select an attribute category, which may cause a list of attributes within that category to be displayed for selection. In some embodiments, the user may also be able to move the locations of currently displayed graphs. For example, a user may be able to drag and drop attribute graph 1306 to a different location for easier viewing (e.g., to the left of first depth graph 1302, to the right of second depth graph 1304, and/or the like).

Figure 13B:
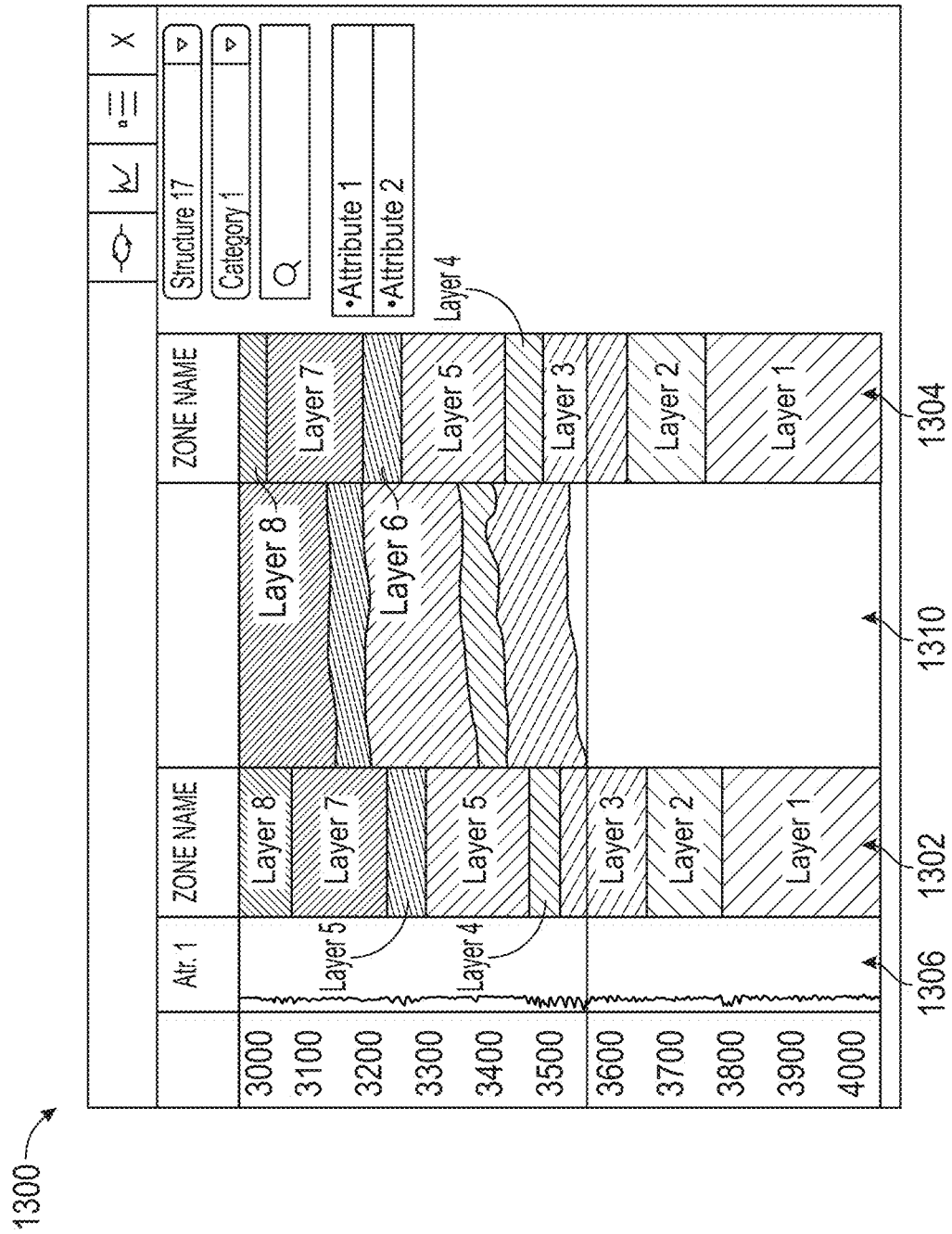

FIG. 13B illustrates user interface 1300 being used to display depth view cross-section data, in accordance with some embodiments. As illustrated in the figure, a cross-section graph 1310 may be displayed between first depth graph 1302 and second depth graph 1304 containing cross-section layer data. In some embodiments, the cross-section layer data displayed in cross-section graph 1310 may comprise the equivalent of a path being drawn on the map between the first well and the second well. As such, the user will be able to view and analyze how the different layers of the well change in depth and thickness between the first well and the second well.

In some embodiments, the depth data used to generate first and second depth graphs 1302 and 1304 may be generated using actual depth measurements during the drilling associated with a particular structure. On the other hand, the cross-section layer data of cross-section graph 1310 may be generated from a model (e.g., a layer cake model). As such, there may sometimes be a mismatch between the data shown in depth graphs 1302 and 1304 and cross-section graph 1310 (e.g., the left edge of cross-section graph 1310 may not match with first depth graph 1302, or the right edge of the cross-section graph 1310 may not match with second depth graph 1304). In some embodiments, this may be simply due to an offset between the axes of the depth graphs and the cross-section graph. In some embodiments, this mismatch may be used to revise or adjust the model used to generate cross-section graph 1310, in order to create a more accurate model.

Event Timelines

Figure 14:
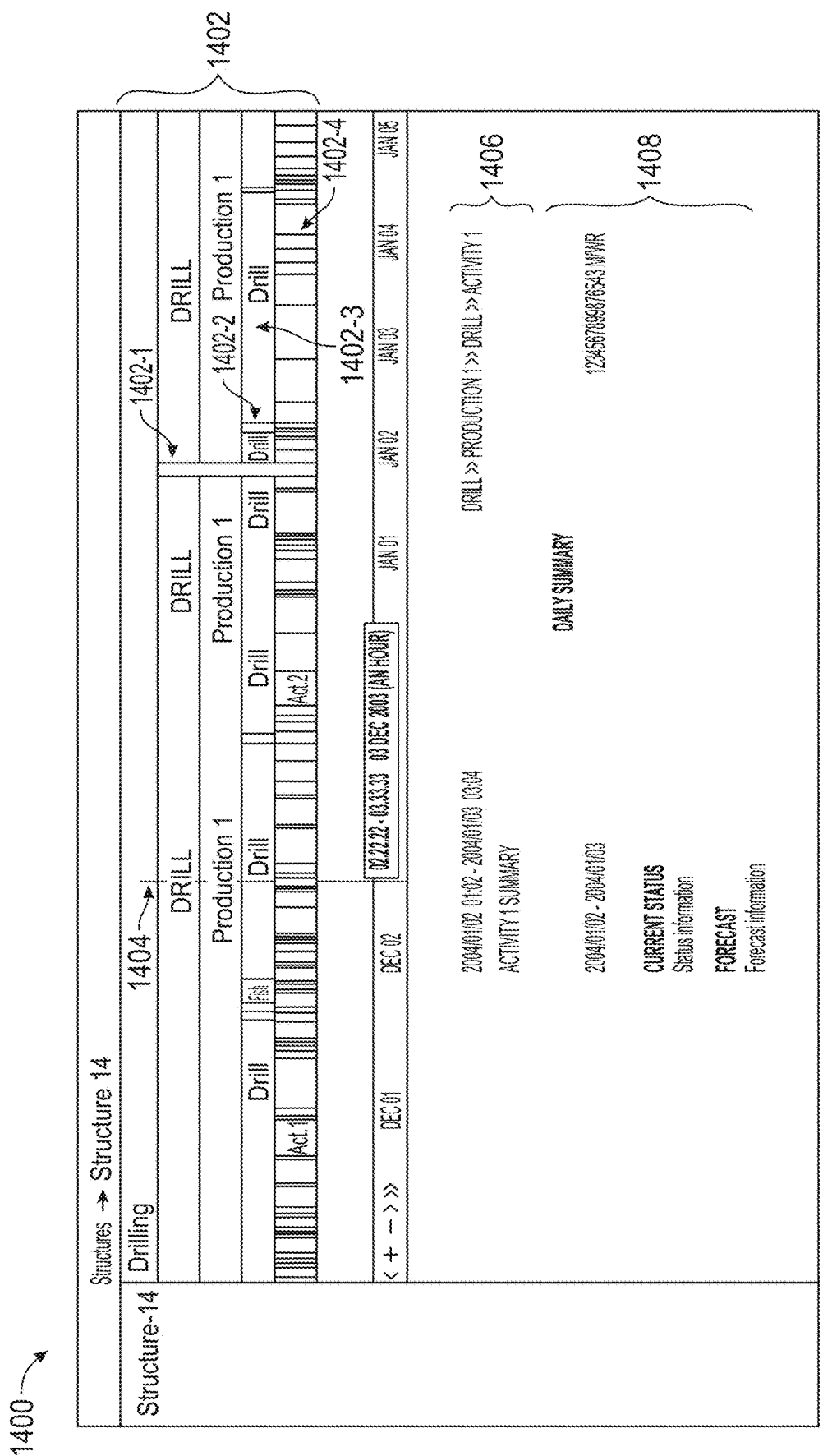
FIG. 14 illustrates a user interface containing an event timeline, in accordance with some embodiments.

Operations performed on a structure may require the performance of a large number of different events and tasks. For example, because of the time and expense associated with drilling structures such as oil wells, it is often important to be able to view and analyze the progress of drilling over time, and the various tasks that are being performed. FIG. 14 illustrates a user interface 1400 containing an event timeline, in accordance with some embodiments. Timeline 1402 may organized into a plurality of different levels or tiers having hierarchical or parent-child relationship. In the illustrated embodiment, timeline 1402 comprises four different levels: events 1402-1, phases 1402-2, tasks 1402-3, and activities 1402-4. Each event may comprise one or more phases. Each phase may in turn comprise one or more tasks. Each task may comprise one or more activities. For example, a drill event (DRILL) may comprise a production phase. A production phase may in turn comprise a plurality of different tasks, such as drill tasks, fish tasks (corresponding to a task where an object has been dropped down a drill hole and must be fished out), and evaluation tasks. Each task (e.g. a drill task) may comprise a plurality of different activities, which may include RIH (run in hole) activities, POOH (pull out of hole) activities, rig service activities, and/or the like.

In some embodiments, a user may select a particular time on timeline 1402 (e.g., at time 1404). In response to the user selection, information pertaining to the events/phases/tasks/activities occurring at the selected time may be displayed at display area 1406. For example, in the illustrated embodiment, time 1404 on timeline 1402 corresponds to a particular activity ("Activity 1") of a drill event of a production phase of an onshore drill event. Display area 1406 may contain information pertaining to the activity at the selected time. The information may comprise one or more attributes corresponding to the activity, such as a status of equipment (e.g., a motor assembly) used in the activity, a speed of the activity, a hole condition at the time of the activity, and/or the like. In some embodiments, the attributes shown in the information may be based upon a type of activity associated with the selected time. In addition, display area 1406 may display a time range corresponding to the activity (e.g., a start time and an end time), as well as a breadcrumb trail indicating a hierarchy of levels associated with the selected time.

In some embodiments, the user may be able to select a specific level (e.g., the task level) when selecting a time 1404 in timeline 1402. For example, instead of displaying information corresponding to the RIH activity at the selected time, display area 1406 may instead display information associated with a higher level associated with the selected time (e.g., a drill task, production phase, or drill event). In some embodiments, the displayed information may comprise an aggregation of attributes associated with lower levels (e.g., information displayed for a drill task may comprise aggregated attributes of one or more activities associated with the drill task).

In some embodiments, a second display area 1408 may be used to display information for a particular time period associated with the selected time 1404 (e.g. the day corresponding to the selected time 1404). For example, the information may comprise a current status of the well, a forecast for the well, and/or the like. In some embodiments, the information may comprise aggregated attributes of activities/tasks/phases/events that took place during the time period.

Path Trajectories

In some embodiments, it may not only be important to be able to analyze the progress of events occurring over time, but also how these events are associated with different locations. Understanding where events are occurring may be just as important as knowing when they are occurring. For example, in the context of drilling, certain events may be correlated with certain drill depths, drill trajectories, or the suspected interface between different geological layers. By viewing where these events occur on the path or trajectory, these correlations may be identified.

Figure 15A:
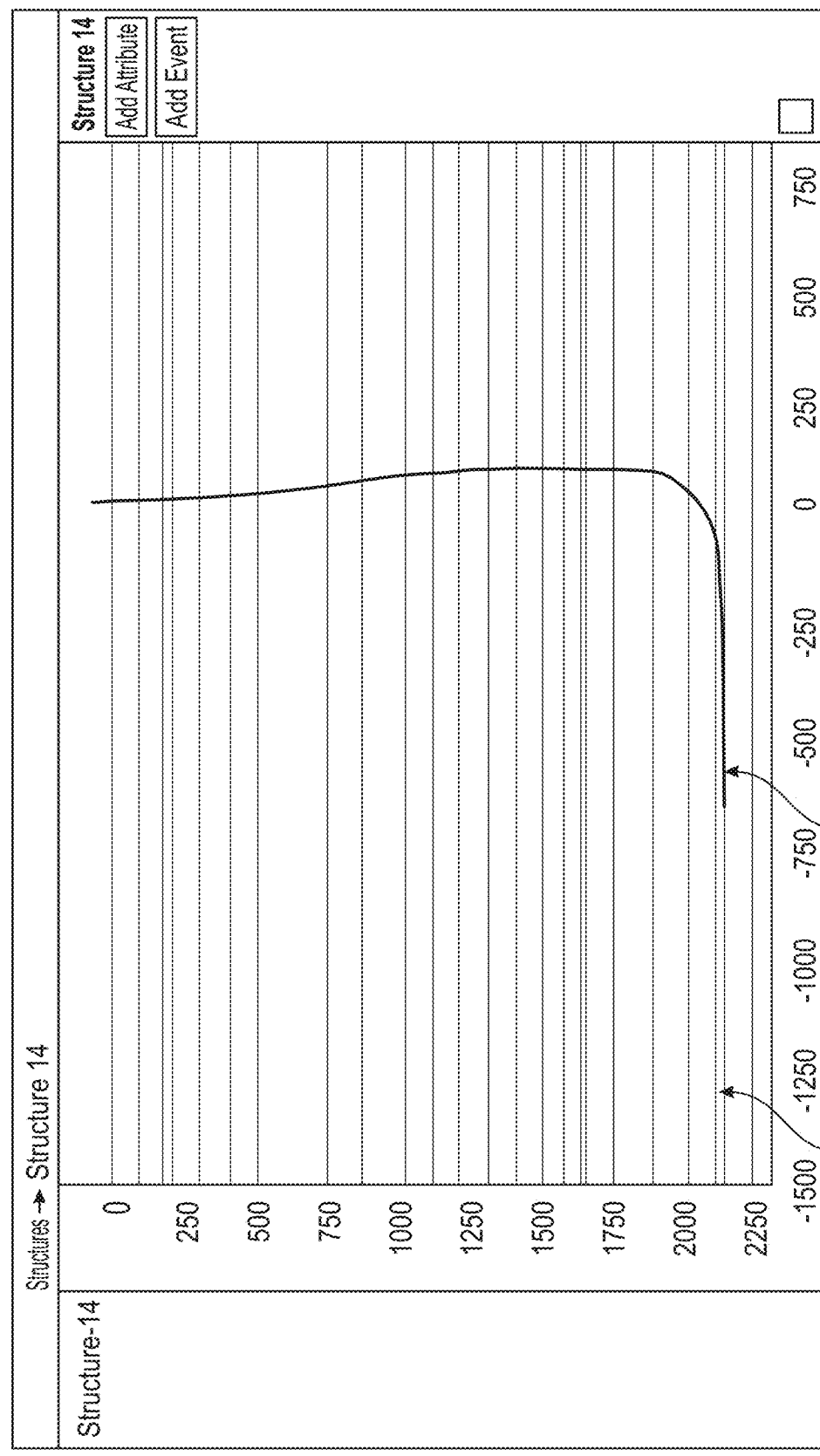
FIGS. 15A-15C illustrate a projection of a path or trajectory, in accordance with some embodiments.

FIG. 15A illustrates user interface 1500 displaying a projection of a drill path or trajectory (hereinafter referred to collectively as a path), in accordance with some embodiments. A path may correspond to any type of path or trajectory in physical space. For example, the path may correspond to a path taken by a drill when drilling a well. In some embodiments, a path is projected onto a two-dimensional plane (represented by graph 1502) to form a path projection 1504. In other embodiments, instead of projecting the path onto a two-dimensional plane, the path may be represented by a three-dimensional model.

Figure 15B:
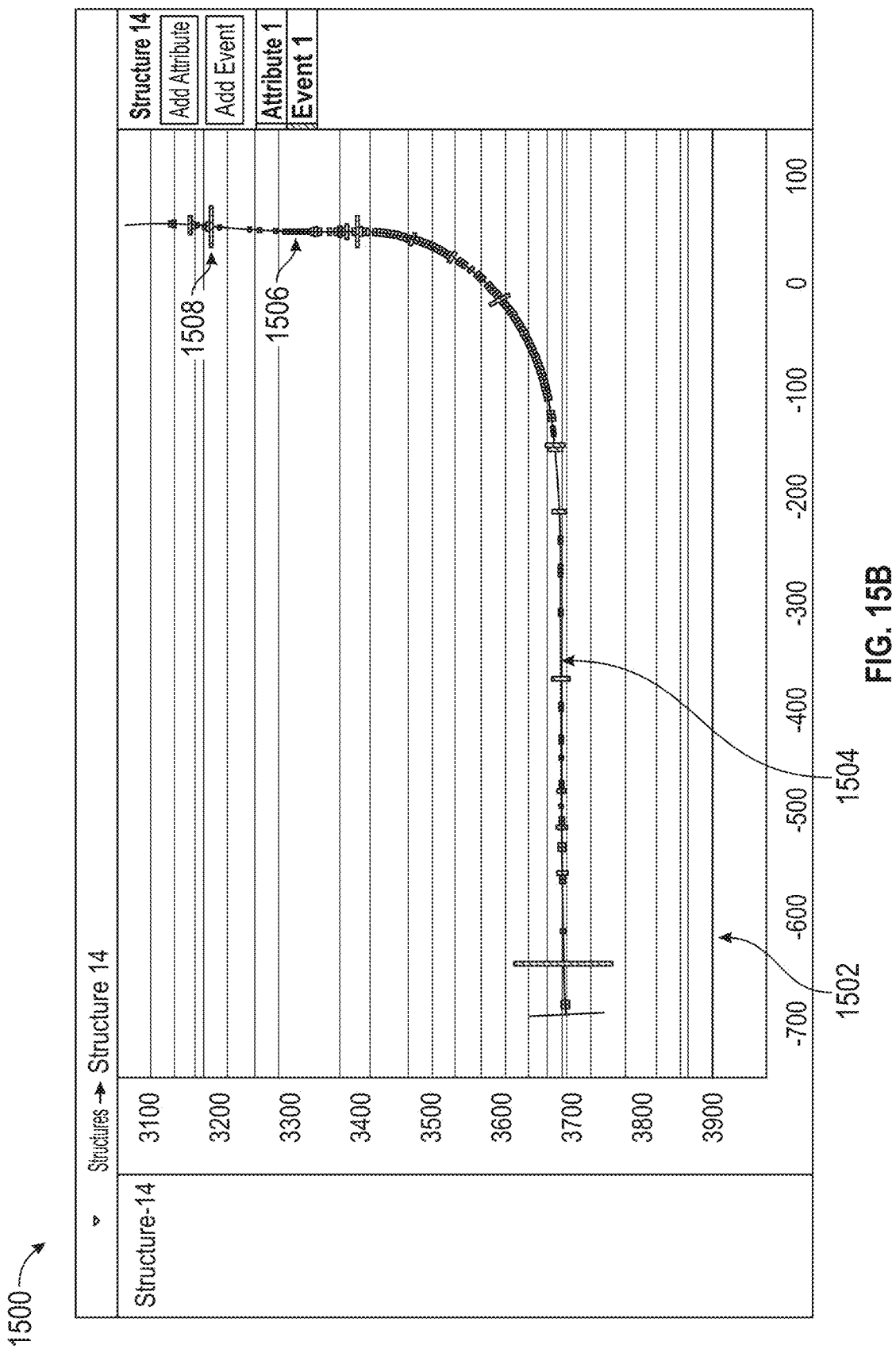

FIG. 15B illustrates events and/or attributes displayed on a path, in accordance with some embodiments. Path projection 1504 in graph 1502 may be overlaid with attribute data 1506 and/or event data 1508. The attribute data 1506 may corresponds to measurements taken at different locations along the path. For example, to measure a GR (gamma radiation) attribute, which measures a level of gamma radiation at different locations along the path, gamma radiation sensors may be installed along different locations of the path, or a gamma radiation sensor may be moved along the path, in order to measure gamma radiation levels various locations along the path. Event data 1508 corresponds to an event type that may be associated with different locations along the path (e.g., NPT (non-productive time) events, indicating an amount of non-productive time that occurred during the drilling of the well). For example, events (such as NPT events) may be recorded as they occur. In addition to recording the time of the event, a location associated with the event may also be recorded and associated with the event. In some embodiments, a toolbar 1510 may be used by the user to specify the attributes and/or events to be overlaid on path projection 1504. In some embodiments, any combination of different attributes and/or events may be selected.

As such, in some embodiments, attribute values and/or events may be associated with particular locations along the path (e.g., an attribute value may be associated with a location where it was measured, while an event may be associated with a location where it occurred). Locations along the three-dimensional model of the path may be mapped to locations on the two-dimensional projection of the path. Thus, each attribute value and/or event may be associated a particular location on the two-dimensional path projection.

In some embodiments, the attribute and/or event data may be displayed as one or more bars extending from various locations along path projection 1504, wherein a length of a bar at a given location on the path projection indicates a particular magnitude or measure of the attribute or event corresponding to the location. For example, the bars that comprise attribute data 1506 may indicate an amount of gamma radiation that is measured at various locations along path projection 1504. Similarly, the bars that comprise event data 1508 may indicate how many hours of non-productive time occurred at particular locations of the path projection 1504. In some embodiments, an event type may be associated with a plurality of different attributes. In such cases, the length of the bars corresponding to the events may be based upon a particular attribute associated with the event or an aggregation of one or more particular attributes associated with the event. For example, for NPT events, the length of a bar at a particular location along the path projection may indicate a length of time associated with NPT events at that location. In some embodiments, a bar at a particular location of the path may be displayed such that it is substantially perpendicular to a tangent of the path at the particular location.

In some embodiments, bars associated with different attributes and/or event types may be overlaid on top of each other. The bars associated with different attributes and/or event types may be rendered with different colors or shadings for visual clarity. In some embodiments, in order to improve visibility for bars associated with a particular attribute and/or event type, the user may be able to change the order in which the bars associated with different event types and/or attributes are overlaid. For example, in some embodiments the user may select an event or attribute at toolbar 1510 in order to display the bars corresponding to the selected attribute or event type may be displayed in front.

Figure 15C:
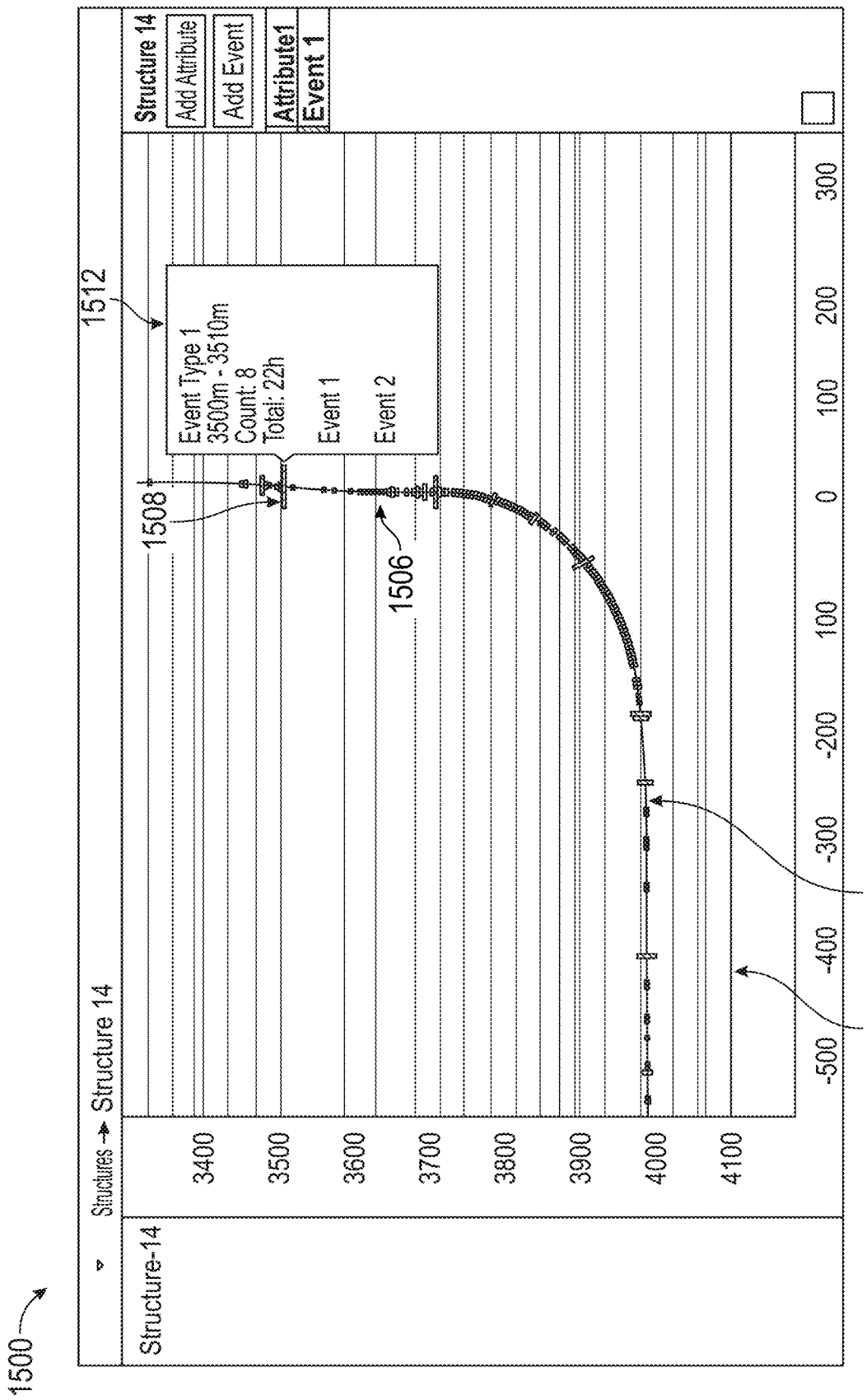

FIG. 15C illustrates events and/or attributes displayed on a path, in accordance with some embodiments. In some embodiments, a user may select a bar associated with attribute data 1506 or event data 1508 (e.g., by hovering the cursor over a particular bar, or clicking on the particular bar). In response to the selection, a pop-up 1512 or other interface element may be displayed that indicates a measurement or value of the attribute or event associated with the selected bar. For example, for bars corresponding to attribute data, the value of the attribute (e.g., gamma radiation measurement) for the selected bar may be displayed in response to a selection of the bar. In some embodiments, for bars corresponding to event data, additional event data may also be displayed. For example, the length of a bar corresponding to NPT event data may be based upon a length of time associated with the NPT event. However, pop-up 1512 may display, in addition to the length of time value associated with the NPT event, other attributes and information associated with the NPT event. In some embodiments, pop-up 1512, in addition to attribute or event data, may also display data pertaining to the location on the path projection 1502 of the selected bar (e.g., depth information, coordinate information, and/or the like).

In some embodiments, a particular bar may correspond to multiple events. For example, multiple NPT events may have occurred at a particular location in the path. In some embodiments, when a user selects a particular bar associated with NPT events, pop-up 1512 may indicate the one or more NPT events that are the particular bar at the particular location of the path projection 1504. In some embodiments, attribute values (e.g., length of time and/or other attributes) may be displayed separately for each event. In addition, aggregate information for the events associated with the bar (e.g., number of events associated with the selected bar, aggregated attribute values such as total length of time, and/or the like) may also be displayed.

By being able to view attribute data and event data as it relates to different locations, correlations between different attributes, events, and/or path shape may be more easily identified. For example, by examining NPT events with respect to the path projection, correlations may potentially be identified between where non-productive time occurred and changes in the direction or curvature of the path, the depth of the path, and/or various attribute values such as gamma radiation. For instance, it may be found that a large amount of non-productive time occurs near a location where the path changes direction, or where there is a high amount of gamma radiation.

Figure 16:
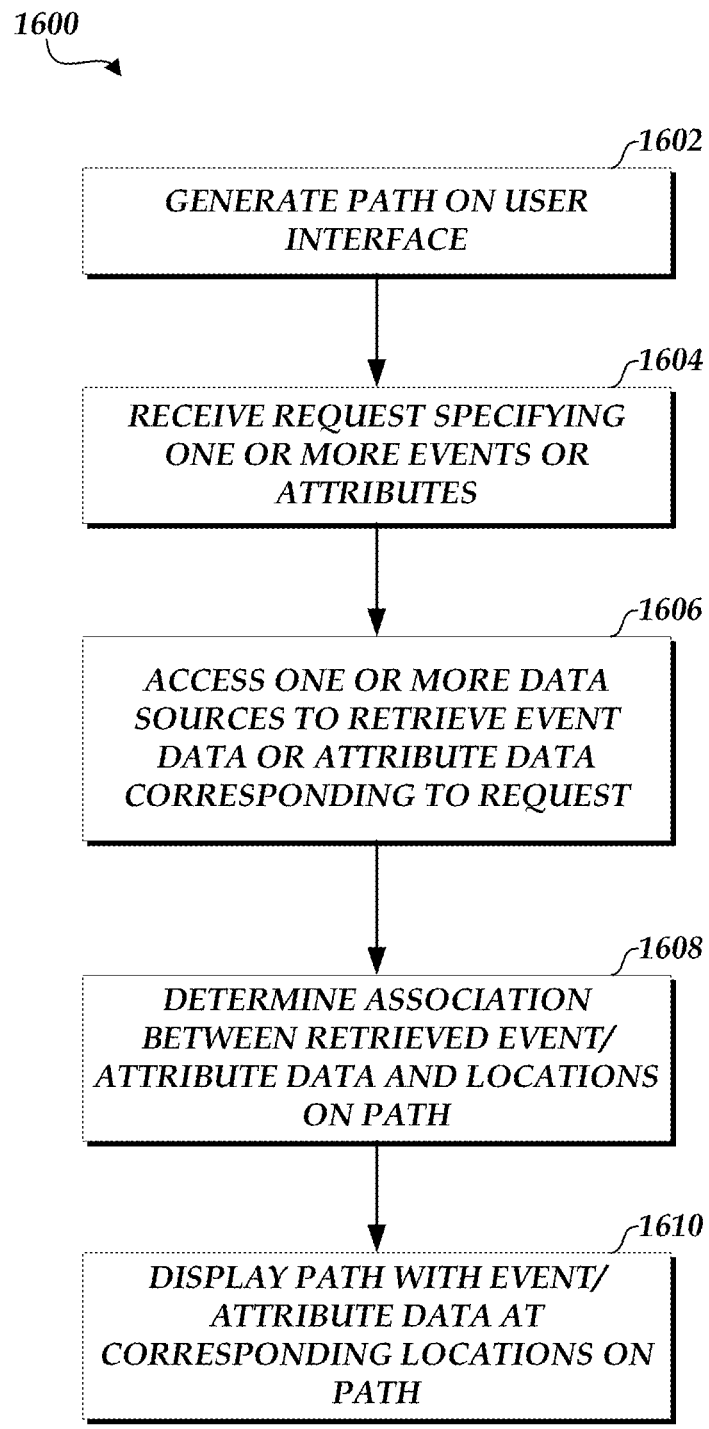
FIG. 16 illustrates a flowchart of a process for displaying attribute and/or event data in conjunction with a path or path projection, in accordance with some embodiments.

FIG. 16 illustrates a flowchart of a process for displaying attribute and/or event data in conjunction with a path or path projection, in accordance with some embodiments. At block 1602, a path (e.g., well path or trajectory) is generated on an interactive user interface. In some embodiments, the path is projected onto a two-dimensional plane. Alternatively, in other embodiments, the path may be modeled as a three-dimensional model. In some embodiments, a user may view a three-dimensional model of the path, and select a desired two-dimensional plane for which to project the path. In some embodiments, when a user is viewing a two-dimensional projection, a three-dimensional model may also be displayed in the user interface, showing the two-dimensional projection plane relative to the three-dimensional model.

At block 1604, a request is received specifying one or more attributes or events. The request may comprise any combination of attributes or events that can be associated with locations on the path. For example, a requested attribute may be associated with data measured by one or more sensors at various locations on the path. At block 1606, one or more data sources are accessed in order to retrieve event and/or attribute data corresponding to the received request.

At block 1608, one or more associations between the retrieved data (event and/or attribute data) and locations on the displayed trajectory are determined. For example, attribute data obtained from a particular sensor at a particular location on the path may be associated with the location. Similarly, event data may be associated with path locations at which the event(s) occurred. In some embodiments, determining the associations between the retrieved data and locations on the displayed trajectory may comprise determining associations between the retrieved data and respective locations on the three-dimensional path, and determining associations between the locations on the three-dimensional path and respective locations on the two-dimensional projection of the path.

At block 1610, the trajectory is displayed with indications of the event and/or attribute data at corresponding locations on the trajectory. For example, in some embodiments, the event and/or attribute data may be displayed as one or more bars located at corresponding locations on the path, wherein a length of the bar corresponds to a value associated with the attribute or event. In some embodiments, each attribute and/or event type may be displayed as a different set of bars on the path that are overlaid on top of each other.

In some embodiments, multiple events associated with the same location on the path may be aggregated into a single bar, wherein a length of the bar corresponds to an aggregated value associated with the events. In some embodiments, a displayed bar may be selected by the user to view the underlying attribute or event data associated with the selected bar.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 17:
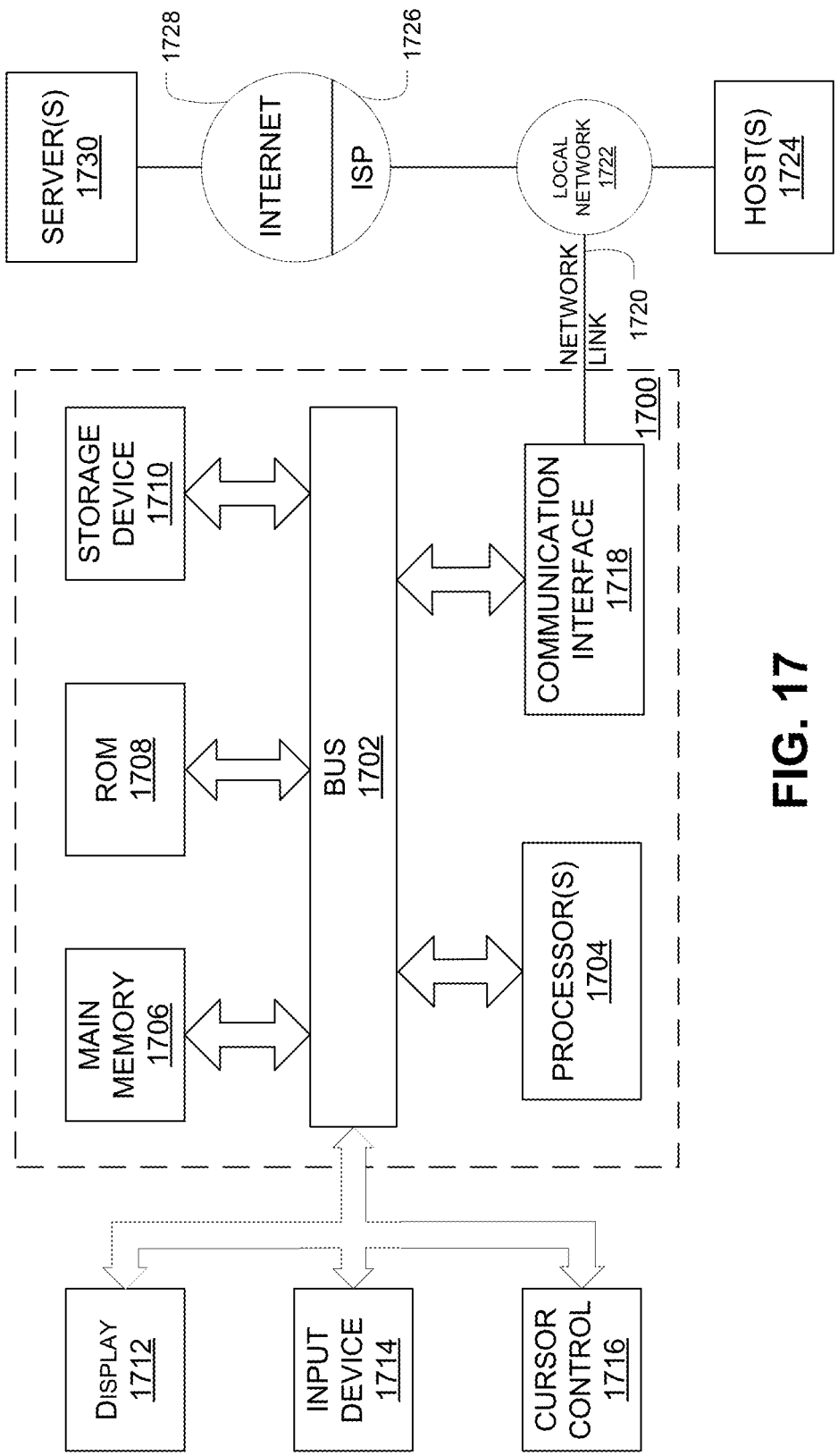
FIG. 17 illustrates a computer system with which certain methods discussed herein may be implemented, according to one embodiment.

For example, FIG. 17 is a block diagram that illustrates a computer system 900 upon which an embodiment may be implemented. For example, any of the computing devices discussed herein may include some or all of the components and/or functionality of the computer system 1700.

Computer system 1700 includes a bus 1702 or other communication mechanism for communicating information, and a hardware processor, or multiple processors, 1704 coupled with bus 1702 for processing information. Hardware processor(s) 1704 may be, for example, one or more general purpose microprocessors.

Computer system 1700 also includes a main memory 1706, such as a random access memory (RAM), cache and/or other dynamic storage devices, coupled to bus 1702 for storing information and instructions to be executed by processor 1704. Main memory 1706 also may be used for storing temporary variables or other intermediate information during execution of instructions to be executed by processor 1704. Such instructions, when stored in storage media accessible to processor 1704, render computer system 1700 into a special-purpose machine that is customized to perform the operations specified in the instructions. Main memory 1706 may also store cached data, such as zoom levels and maximum and minimum sensor values at each zoom level.

Computer system 1700 further includes a read only memory (ROM) 1708 or other static storage device coupled to bus 1702 for storing static information and instructions for processor 1704. A storage device 1710, such as a magnetic disk, optical disk, or USB thumb drive (Flash drive), etc., is provided and coupled to bus 1702 for storing information and instructions. For example, the storage device 1710 may store measurement data obtained from a plurality of sensors.

Computer system 1700 may be coupled via bus 1702 to a display 1712, such as a cathode ray tube (CRT) or LCD display (or touch screen), for displaying information to a computer user. For example, the display 1712 can be used to display any of the user interfaces described herein with respect to FIGS. 1 through 11D. An input device 1714, including alphanumeric and other keys, is coupled to bus 1702 for communicating information and command selections to processor 1704. Another type of user input device is cursor control 416, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor(s) 1704 executing one or more sequences of one or more instructions contained in main memory 1706. Such instructions may be read into main memory 1706 from another storage medium, such as storage device 1710. Execution of the sequences of instructions contained in main memory 1706 causes processor(s) 1704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1710. Volatile media includes dynamic memory, such as main memory 1706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may retrieve and execute the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN (or WAN component to communicated with a WAN). Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
one or more computer processors;
one or more databases storing attribute data associated with a plurality of physical structures; and
one or more computer readable storage mediums storing program instructions configured for execution by the one or more computer processors to cause the computing system to:
generate user interface data useable for rendering an interactive user interface on a computing device, the interactive user interface including a geographic map depicting respective locations of the plurality of physical structures;
receive, from a user, a selection of a first attribute;
receive, from the user and via the geographic map, a selection of a first physical structure of the plurality of physical structures;
in response to receiving the selection of the first physical structure:
determine values of the selected first attribute at various depths at the location of the selected first physical structure; and
update the user interface data such that the interactive user interface includes a first depth cross-section view of the determined values of the selected first attribute at various depths at the location of the selected first physical structure, wherein the first depth cross-section view comprises a visualization of a cross-section in depth at the location;
receive, from the user and via the geographic map, a user input comprising a selection of a second physical structure of the plurality of physical structures;
in response to receiving the selection of the second physical structure:
determine values of the selected first attribute at various depths at the location of the selected second physical structure; and
update the user interface data such that the interactive user interface includes a second depth cross-section view of the determined values of the selected first attribute at various depths at the location of the selected second physical structure, wherein the first depth cross-section view and the second depth cross-section view are horizontally aligned with one another; and
update the user interface data such that the interactive user interface includes a third depth cross-section view of values of the selected first attribute at various depths and along a path between the location of the selected first physical structure and the location of the selected second physical structure.

2. The computing system of claim 1, wherein the one or more computer readable storage mediums further store program instructions configured for execution by the one or more computer processors to cause the computing system to:
update the user interface data such that icons representing the locations of the plurality of physical structures are shaded colors that correspond with attribute values associated with the respective physical structures.

3. The computing system of claim 1, wherein the selection of the first physical structure comprises a selection of a first icon in the geographic map representing the location of the first physical structure, and wherein the selection of the second physical structure comprises a selection of a map icon in the geographic map representing the location of the map physical structure.

4. The computing system of claim 1, wherein the first depth cross-section view is located to a left of the second depth cross-section view in the interactive user interface.

5. The computing system of claim 1, wherein the first depth cross-section view comprises a geological layer at a first depth level and the second depth cross-section view comprises a geological layer at a second depth level that is different than the first depth level such that the geological layer in the first depth cross-section view and the geological layer in the second depth cross-section view are depicted in a different horizontal plane in the interactive user interface.

6. The computing system of claim 5, wherein the one or more computer readable storage mediums further store program instructions configured for execution by the one or more computer processors to cause the computing system to:
receive a selection of the geological layer in the first depth cross-section view; and
update the user interface data such that the geological layer in the first depth cross-section view and the geological layer in the second depth cross-section view are depicted in a same horizontal plane in the interactive user interface.

7. The computing system of claim 1, wherein the one or more computer readable storage mediums further store program instructions configured for execution by the one or more computer processors to cause the computing system to:
receive, from the user, a selection of a second attribute; and
update the user interface data such that the first depth cross-section view in the interactive user interface further includes values of the selected second attribute at the location of the selected first physical structure, wherein the values of the second attribute are adjacent to and aligned with the values of the first attribute.

8. The computing system of claim 7, wherein the one or more computer readable storage mediums further store program instructions configured for execution by the one or more computer processors to cause the computing system to:
receive an indication that a plot of the values of the selected second attribute is dragged over a plot of the values of the selected first attribute; and
update the user interface data such that the values of the selected first attribute and the values of the selected second attribute are shown in a same plot.

9. The computing system of claim 8, wherein the selected first attribute comprises readings from a first sensor, wherein the selected second attribute comprises readings from a second sensor.

10. The computing system of claim 1, wherein the one or more computer readable storage mediums further store program instructions configured for execution by the one or more computer processors to cause the computing system to:
receive, from the user and via the geographic map, a user input comprising a selection of a path on the geographic map; and in response to receiving the selection of the path, update the user interface data such that the interactive user interface includes a fourth depth cross-section view of values of the selected first attribute along the selected path.

11. A computer-implemented method comprising, by one or more processors executing program instructions:

generating user interface data useable for rendering an interactive user interface on a computing device, the interactive user interface including a geographic map depicting respective locations of a plurality of physical structures;

receiving, from a user, a selection of a first attribute;

receiving, from the user and via the geographic map, a selection of a first physical structure of the plurality of physical structures;

in response to receiving the selection of the first physical structure:

determining values of the selected first attribute at various depths at the location of the selected first physical structure; and updating the user interface data such that the interactive user interface includes a first depth cross-section view of the determined values of the selected first attribute at various depths at the location of the selected first physical structure, wherein the first depth cross-section view comprises a visualization of a cross-section in depth at the location;

receiving, from the user and via the geographic map, a user input comprising a selection of a second physical structure of the plurality of physical structures;

in response to receiving the selection of the second physical structure:

determining values of the selected first attribute at various depths at the location of the selected second physical structure; and updating the user interface data such that the interactive user interface includes a second depth cross-section view of the determined values of the selected first attribute at various depths at the location of the selected second physical structure, wherein the first depth cross-section view and the second depth cross-section view are horizontally aligned with one another; and updating the user interface data such that the interactive user interface includes a third depth cross-section view of values of the selected first attribute at various depths and along a path between the location of the selected first physical structure and the location of the selected second physical structure.

12. The computer-implemented method of claim 11 further comprising, by the one or more processors executing program instructions:

updating the user interface data such that icons representing the locations of the plurality of physical structures are shaded colors that correspond with attribute values associated with the respective physical structures.

13. The computer-implemented method of claim 11, wherein the selection of the first physical structure comprises a selection of a first icon in the geographic map representing the location of the first physical structure, and wherein the selection of the second physical structure comprises a selection of a map icon in the geographic map representing the location of the map physical structure.

14. The computer-implemented method of claim 11 further comprising, by the one or more processors executing program instructions:

receiving, from the user and via the geographic map, a user input comprising a selection of a path on the geographic map; and in response to receiving the selection of the path, updating the user interface data such that the interactive user interface includes a fourth depth cross-section view of values of the selected first attribute along the selected path.

* * * * *